(12) United States Patent
Leu et al.

(10) Patent No.: US 10,726,192 B2
(45) Date of Patent: Jul. 28, 2020

(54) SEMICONDUCTOR FAB'S DEFECT OPERATING SYSTEM AND METHOD THEREOF

(71) Applicant: ELITE SEMICONDUCTOR INC., Hsinchu County (TW)

(72) Inventors: Iyun Leu, Hsinchu County (TW); Ray Jenn Tsay, Taoyuan (TW)

(73) Assignee: ELITE SEMICONDUCTOR INC., Hsinchu County (TW)

( * ) Notice: Subject to any disclaimer, the term of this patent is extended or adjusted under 35 U.S.C. 154(b) by 0 days.

(21) Appl. No.: 16/514,547

(22) Filed: Jul. 17, 2019

(65) Prior Publication Data
US 2020/0026819 A1    Jan. 23, 2020

(30) Foreign Application Priority Data

Jul. 17, 2018   (TW) .............................. 107124634 A

(51) Int. Cl.
*G06F 17/50*    (2006.01)
*G06F 30/398*   (2020.01)

(52) U.S. Cl.
CPC ................. *G06F 30/398* (2020.01)

(58) Field of Classification Search
CPC .................................................. G06F 30/398
USPC .......................................................... 716/112
See application file for complete search history.

(56) References Cited

U.S. PATENT DOCUMENTS

| | | | | |
|---|---|---|---|---|
| 6,566,885 B1* | 5/2003 | Pinto | ...................... | G01N 21/66 324/501 |
| 2005/0132322 A1* | 6/2005 | Inoue | ....................... | G03F 1/84 716/52 |
| 2007/0111342 A1* | 5/2007 | Satya | .................. | H01L 23/5226 438/17 |
| 2009/0041332 A1* | 2/2009 | Bhaskar | ................. | G01N 21/93 382/145 |
| 2013/0170733 A1* | 7/2013 | Leu | ..................... | G01N 21/9501 382/149 |
| 2017/0212168 A1* | 7/2017 | Leu | .................. | G01R 31/31703 |
| 2019/0026419 A1* | 1/2019 | Leu | ....................... | G06F 30/398 |
| 2019/0086340 A1* | 3/2019 | Leu | .................... | G01N 21/8851 |

* cited by examiner

*Primary Examiner* — Suchin Parihar
(74) *Attorney, Agent, or Firm* — Muncy, Geissler, Olds & Lowe, P.C.

(57) ABSTRACT

The present invention relates to "an Innovative Semiconductor Fab's Defect Operating System" thereof for design house and manufacturing Fab is provided. The Innovative Semiconductor Fab's Defect Operating System comprises: receiving pluralities of defect data, IC design layout data; analyzing the defect data, design layouts, by a Critical Area Analysis (CAA) method via a Defect Operating System located inside the Fab site; identify a killer or non-killer defect based on the open or short failure probability; sending the killer defect data to the design house via internet, FTP, etc. The design house receives the wafer testing yield data; pick the bad die information and the killer defect information for failure analysis; correlate the corresponding defect data with the wafer test data; sending the failure killer defect data to the Fab via internet, FTP, etc.; and improve the wafer yield through feed forward defect data and feedback of failure killer defect data which is an innovative "Defect Operation Platform" implementation between design house and Fab.

16 Claims, 42 Drawing Sheets

1150

| Calibration test ID | X coordinate deviation | Y coordinate deviation |
|---|---|---|
| 1 | 0.1 | 0.2 |
| 2 | 0.14 | 0.23 |
| 3 | 0.09 | 0.18 |
| 4 | 0.11 | 0.19 |
| 5 | 0.15 | 0.27 |
| 6 | 0.07 | 0.19 |
| 7 | 0.16 | 0.26 |
| 8 | 0.12 | 0.22 |
| 9 | 0.13 | 0.26 |
| 10 | 0.06 | 0.19 |
| Average | 0.113 | 0.219 |
| std. dev. | 0.033 | 0.034 |

| Product name | A0001 | | | | | | | |
|---|---|---|---|---|---|---|---|---|
| Layer | poly1 | | | | | | | |
| Process step | poly1 photo | | | | | | | |
| Lot ID | lot001 | | | | | | | |
| Wafer ID | 12 | | | | | | | |

| Defect ID | Die index | Defect coordinate (x1, y1) | Defect size (x direction) (nm) | Defect size (y direction) (nm) | Layout pattern coordinate (x2, y2) | Calibrated defect size (x direction) (nm) | Calibrated defect size (y direction) (nm) | systematic defect pattern group no. | OA value |
|---|---|---|---|---|---|---|---|---|---|
| 1 | (0, 1) | (502, 5867) | 100 | 100 | (472, 5842) | 65 | 55 | 1 | 0.95 |
| 2 | (1, 0) | (1159, 396) | 50 | 50 | (1129, 371) | 35 | 35 | 2 | 0.92 |
| 3 | (2, 2) | (4354, 5555) | 75 | 75 | (4324, 5530) | 45 | 45 | 3 | 0.87 |
| 4 | (1, -1) | (502, 5867) | 100 | 100 | (472, 5842) | 65 | 55 | 1 | 0.95 |
| 5 | (2, -1) | (502, 5867) | 100 | 100 | (472, 5842) | 65 | 55 | 1 | 0.95 |
| 6 | (3, -1) | (502, 5867) | 100 | 100 | (472, 5842) | 65 | 55 | 1 | 0.95 |
| 7 | (4, -1) | (502, 5867) | 100 | 100 | (472, 5842) | 65 | 55 | 1 | 0.95 |
| 8 | (2, 0) | (1159, 396) | 50 | 50 | (1129, 371) | 35 | 35 | 2 | 0.92 |
| 9 | (3, 0) | (1159, 396) | 50 | 50 | (1129, 371) | 35 | 35 | 2 | 0.92 |
| 10 | (4, 0) | (1159, 396) | 50 | 50 | (1129, 371) | 35 | 35 | 2 | 0.92 |
| 11 | (3, 2) | (4354, 5555) | 75 | 75 | (4324, 5530) | 45 | 45 | 3 | 0.87 |
| 12 | (4, 2) | (4354, 5555) | 75 | 75 | (4324, 5530) | 45 | 45 | 3 | 0.87 |
| 13 | (5, 2) | (4354, 5555) | 75 | 75 | (4324, 5530) | 45 | 45 | 3 | 0.87 |
| ... | ... | ... | ... | ... | ... | ... | ... | ... | ... |

| Product name | | 40001 | | | | | |
|---|---|---|---|---|---|---|---|
| Layer | | poly1 | | | | | |
| Defect inspection step | | poly1 after etch inspection | | | | | |
| Lot ID | | lot002 | | | | | |
| Wafer ID | | 15 | | | | | |
| Defect ID | Die index | Defect coordinate (x1, y1) | Defect size (x direction) (nm) | Defect size (y direction) (nm) | Layout pattern coordinate (x2, y2) | Calibrated defect size (x direction) (nm) | Calibrated defect size (y direction) (nm) | CAA value |
| 1 | (0, -1) | (902, 5867) | 100 | 100 | (472, 5842) | 65 | 58 | 0.6 |
| 2 | (0, -1) | (1065, 4279) | 150 | 200 | (1035, 4264) | 101 | 112 | 0.8 |
| 3 | (1, 0) | (1159, 386) | 50 | 50 | (1129, 371) | 35 | 35 | 0.3 |
| 4 | (0, -1) | (2254, 1355) | 150 | 150 | (2224, 1330) | 100 | 120 | 0.81 |
| 5 | (0, -1) | (3229, 2208) | 250 | 200 | (3209, 2183) | 161 | 102 | 1 |
| 6 | (0, -1) | (5407, 782) | 100 | 300 | (5377, 757) | 52 | 165 | 0.99 |
| 7 | (0, -1) | (4905, 4722) | 300 | 350 | (4875, 4715) | 180 | 21 | 0.87 |
| 8 | (0, 0) | (3052, 2726) | 200 | 200 | (3022, 2711) | 104 | 121 | 1 |

| Product name | | 8f003 | | | | | | |
|---|---|---|---|---|---|---|---|---|
| Lot ID | | lot002 | | | | | | |
| Wafer ID | | 15 | | | | | | |
| Defect ID | Layer | Process defect inspection step | Defect coordinate (x1, y1) | Defect size (x direction) (nm) | Defect size (y direction) (nm) | Layout pattern coordinate (x2, y2) | Calibrated defect size (x direction) (nm) | Calibrated defect size (y direction) (nm) | CtA value |
| 1 | active | active after etch inspection | (4, 4) | (2760, 2168) | 200 | 200 | (2729, 2143) | 101 | 128 | 0.95 |
| 2 | poly1 | poly1 after etch inspection | (0, -1) | (502, 5867) | 100 | 100 | (472, 5842) | 66 | 58 | 0.6 |
| 3 | poly1 | poly1 after etch inspection | (0, -1) | (1065, 4279) | 150 | 200 | (1035, 4254) | 101 | 112 | 0.8 |
| 4 | poly1 | poly1 after etch inspection | (0, -1) | (2254, 1355) | 150 | 150 | (2224, 1330) | 100 | 120 | 0.83 |
| 5 | poly1 | poly1 after etch inspection | (0, -1) | (3239, 2208) | 250 | 200 | (3209, 2183) | 161 | 165 | 1 |
| 6 | poly1 | poly1 after etch inspection | (0, -1) | (5407, 782) | 100 | 200 | (5377, 757) | 53 | 21 | 0.93 |
| 7 | poly1 | poly1 after etch inspection | (0, 0) | (4905, 4735) | 200 | 300 | (4875, 4705) | 102 | 121 | 0.97 |
| 8 | poly1 | poly1 after etch inspection | (0, 0) | (3052, 2738) | 200 | 350 | (3022, 2711) | 104 | 172 | 1 |
| 9 | poly1 | poly1 after etch inspection | (4, -5) | (2981, 2679) | 300 | 250 | (2951, 2654) | 170 | 122 | 1 |
| 10 | poly1 | poly1 after etch inspection | (4, -4) | (1084, 76) | 300 | 250 | (1054, 2118) | 100 | 126 | 0.98 |
| 11 | metal | metal after etch inspection | (-9, -4) | (4118, 5922) | 150 | 250 | (4088, 5897) | 90 | 171 | 0.92 |
| 12 | metal | metal after etch inspection | (-1, -3) | (2270, 2928) | 300 | 200 | (2240, 2923) | 198 | 145 | 1 |
| 13 | metal | metal after etch inspection | (1, 3) | (1285, 3129) | 400 | 200 | (1255, 3104) | 207 | 179 | 0.94 |
| 14 | metal | metal after etch inspection | (0, 7) | (2630, 3891) | 200 | 200 | (2600, 3866) | 100 | 99 | 0.9 |
| 15 | metal | metal after etch inspection | (6, 3) | (3483, 2245) | 200 | 200 | (3453, 2220) | 104 | 202 | 1 |
| 16 | metal | metal after etch inspection | (4, 6) | (3726, 1792) | 250 | 300 | (3696, 1768) | 163 | | 0.9 |
| 17 | metal | metal after etch inspection | (-5, 4) | (3994, 4551) | 150 | 150 | (3564, 4526) | 96 | 92 | 0.83 |
| ... | ... | ... | ... | ... | ... | ... | ... | ... | ... |

SEMICONDUCTOR FAB'S DEFECT OPERATING SYSTEM AND METHOD THEREOF

BACKGROUND OF THE INVENTION

1. Field of the Invention

The present invention relates to "an Innovative Semiconductor Fab's Defect Operating System" that is used from the wafer manufacture to functional chips in a semiconductor Fab thereof for design house and manufacturing Fab is provided. Especially, this Semiconductor Fab's Defect Operating System can be applied to IC design house and semiconductor manufacturing Fab, IC design house and semiconductor assembly Fab, IC design house and PCB Fab, IC design house and mask manufacturing Fab, design house and flat panel display manufacturing Fab, design house and solar cell manufacturing Fab, and design house and LED manufacturing or assembly Fab.

2. Description of the Prior Art

In general, an integrated circuit design house or IC design house finish functional circuit design. Then, IC design house needs to authorize semiconductor Fab to manufacture based on the IC design layout designed by IC design house. Obviously, IC design house authorize semiconductor Fab to manufacture wafer, but IC design house doesn't invest to build Fab or purchase equipment tools. So, IC design house looks like to own a virtual semiconductor Fab Besides, the semiconductor Fab mentioned in this invention is semiconductor Foundry Fab. The semiconductor Fab is used as a brief name in following description.

Furthermore, the semiconductor Fab used in this invention is not limited to foundry Fab, but depends on the need of product application. It can be applied further to semiconductor Fab, assembly Fab (for example: wafer bump, 3D IC, 2.5D IC, or Fan-out wafer assembly Fab, etc.), PC Board Fab, Flat panel display Fab, LED Fab (for example: OLED, LED, mini LED, or Micro LED Fab), and Solar energy Fab. When wafer manufacturing is completed, the wafers are sent to wafer sort Fab to conduct wafer yield sorting. Those good die or pass die during wafer sort will be delivered to Assembly Fab to conduct packaging and final test. Only those good die passing final test will be delivered to customer. In the manufacturing Integrated Circuit (IC) process, semiconductor Fab must run through mask, lithography, etch, film deposition, Cu process, chemical mechanical polishing, and multiple exposure, equipment and processes, etc. Then, wafer chip with designed circuit function is produced. In the manufacturing procedure, random defect and systematic defect are produced probably because of resolution deviation of equipment itself, abnormal incidence, particle induced in a process, pattern defect in the design layout pattern, and insufficient lithography process window. Those defects will cause open or short failure die. So, wafer yield is reduced.

In current manufacturing process, semiconductor Fab is responsible for yield issue, no matter equipment tool problem, process recipe parameter adjustment, looking for defect root cause, etc. C design house can only rely upon semiconductor Fab's experience to eliminate short or open failure yield problem. If the engineering department resource and experience are insufficient, semiconductor Fab cannot achieve the expected wafer yield target. Then, it could delay the pilot production or the schedule to be on the market. IC design house will also invest a lot of money and resource to solve the wafer yield issue. Based on current manufacturing procedure, the semiconductor Fab and IC design house might not be able to increase revenue and profit earlier when the capability to resolve defect issue in a semiconductor Fab is insufficient.

Semiconductor Fab will provide data to IC design house. For circuit design area, there are design rule, spice model, design for manufacturing guideline (DFM), and IP cell, etc. For manufacturing area, the data only includes process step information during the wafer manufacturing, i.e. Wafer In Production (WIP) data. WIP data format only display date, time, lot ID, and wafer quantities, process step name (like poly1 lithography and contact etch, etc. process step name), expected delivery date information. Any other manufacturing metrology, incidence information is not included. For example: When the metrology data is out of spec, then this specific wafer lot will be sent to rework process and redo the specific process steps. Or some wafer lot was processed inside an equipment tool when Fab suffered power outage and turned on power again. Normally, engineer will review the wafer first and released the wafer lot if the wafer lot's data passed spec. But, Fab did not release this potential wafer risk information or various metrology information o customers (IC design houses).

Fab will perform electrical test on wafer. For example: Wafers must pass wafer acceptance test (WAT) or electrical test (E-test) spec, then only those good wafers can be delivered to customers. The electrical test spec include Vt(Threshold voltage) Idsat(Saturation current), Bvdss (Breakdown voltage), Rs_Cont (Contact resistance) and Rs_Metal1 (Metal1 resistance), etc. Customers (IC design houses) will receive electrical test data from Fab. But, those information impacting wafer yield, like defect data, line width, thickness data are not provided to IC design houses. Only after wafer delivery and wafer yield sorting, then IC design houses know whether there is low yield wafer problem. For example: Abnormal equipment problem leads to low wafer yield problem. However, this low wafer yield problem impacts on-time delivery to design house's customer after the incidence happened a few weeks ago. This also will impact future business.

Currently, the management of semiconductor Fab by an IC design house is only limited to trace wafer progress. In term of on-time wafer delivery, design house lacks a real-time monitor apparatus to monitor defect data and abnormal wafer lot. But, there is no method or system available. It becomes worse especially when semiconductor technology migrates to nanometer scale. IC design houses spend at least multi ten-million US dollars to develop circuit design, design layout, wafer manufacturing stage. But, the management of semiconductor Fab still stay at the micrometer stage. After migrating to nanometer scale, the lithography exposure resolution already reaches optical resolution limit. The immersion scanner, multi-exposure techniques, and process, optical proximity correction, layout pattern interaction makes the systematic defect and random defect failure much more complex. Obviously, if the management of semiconductor Fab by IC design house is still the same as before (semiconductor Fab in charge of all the defect issue) and not involved on the defect problem solution, then the time to improve wafer yield cannot be shortened. It will delay the delivery time of product from an advanced process Fab.

Following the shrinked geometry size toward advanced semiconductor process, systematic defect issue becomes a more and more severe problem. Take a 14 nanometer practice example. On a wafer, perform poly1 layer's lithography process systematic defect experiment, i.e. exposure energy/defocus process window experiment. Then, execute defect scan and inspection on this exposure energy/defocus process window experiment wafer. In general, the systematic defect counts will reach a million defect count scale. In addition, the characteristic of systematic defect is that the systematic defects will happen at various repeated defect pattern locations. So, there are many systematic defect patterns happen at various design layout pattern groups. System can classify all the same defect design layout pattern defects into the same design layout pattern group through pattern grouping method. For example: a million systematic defects are classified into ten thousand defect design layout pattern groups through pattern grouping step. Because of the slow imaging throughput of Scanning Electron Microscope (SEM), SEM throughput limitation leads to defect sample selection in a semiconductor Fab. Out of previous ten thousand defect design layout pattern groups, only a few hundred defect design layout pattern groups can be selected to take SEM images. In each defect design layout pattern group, probably ten defects within the defect design layout pattern group can be sampled to take SEM images. For each systematic defect, there are top view and side view SEM images. For example: Select 500 defect design layout pattern groups. Then, there will be ten thousand SEM images. Obviously, it is very difficult to find the real open or short failure systematic defect through such defect sample selection procedure. If the real systematic defect is not inside the 500 defect design layout pattern groups, then semiconductor Fab cannot immediately provide accurate systematic defect SEM images to process engineer. Based on those SEM images, there is no way Fab can judge root cause of systematic defect, either from process, optical proximity correction, or layout pattern problem. This will delay the time to improve systematic defect yield problem. In the end, this raises cost of semiconductor Fab and IC design house.

In the random defect inspection, random defect count increases enormously toward shrinked geometry size following the semiconductor process dimension shrinkage trend. Each time, several thousand to several ten thousand defect counts are detected. Similarly, the slow SEM imaging throughput of SEM limits the defect sample selection quantities, i.e. only several tens to several hundred defect samples will be selected for SEM imaging.

In the semiconductor Fab's practice, data analysis of real-time defect and image classification result is a very important method used to improve yield in micron scale process. But, that method can hardly find failure killer random defect in the defect analysis of nanometer scale semiconductor process. This invention "The Innovative Semiconductor Fab's Defect Operating System" comprises: receiving pluralities of defect data, IC design layout data, superpose defect pattern onto design layout, coordinate conversion, defect size metrology calibration, and Critical Area Analysis (CAA) method, etc. Assign or install into a "Defect Operating System" 50. Through "Defect Operating System" 50, map the failure die in a wafer yield sorting with every killer defect through a CAA analysis. Then, execute failure analysis on those mapped killer defects. This invention will quickly diagnose the failure killer random defect and fix. So, process yield will be raised quickly.

SUMMARY OF THE INVENTION

In this invention's business model: One of the main purposes is to execute systematic defect screen through a "Semiconductor Fab's Defect Operating System". IC design house have the "Defect Operating System" and apparatus to be installed inside semiconductor Fab. In this way, IC design house can involve to improve systematic defect pattern layout optimization in a wafer manufacturing procedure. Through business model of this invention, IC design house begin design layout pattern after joining wafer shuttle program. Then, IC design house co-work with semiconductor Fab to solve systematic defect problem. So, both sides can migrate to pilot production stage earlier. Besides, every IC design house involve to solve systematic defect problem. Semiconductor Fab can benefit with early pilot production, market share gain, revenue increase, and return of investment from the contribution of multiple IC design houses.

In this invention's business model: Another one of the main purposes is to execute random defect screen through a "Semiconductor Fab's Defect Operating System". IC design house have the "Defect Operating System" and apparatus to be installed inside semiconductor Fab. In this way, IC design house can involve to improve random defect yield in a wafer manufacturing procedure. For example: the random defect scan and inspection analysis result is executed at different process layer. The wafer yield level is determined by combining all the process layer's killer random defect or high risk killer random defect together. Through the processing and screen of this invention "Semiconductor Fab's Defect Operating System", IC design house can monitor all the process layers' random defects and defect type information of their own products. Then, combine with internal wafer sort yield data and failure analysis data. IC design house can find all layer's failure random defect and defect type information which are not obtained from the failure random defect data in the inline wafer defect inspection. The failure killer random defect and wafer yield data can be setup together. It is very important information to be provided to semiconductor Fab wafer yield improvement. The cooperation between semiconductor Fab and IC design house can improve wafer yield quickly.

Data processing unit: The systematic defect inspection data generated from each process layer is processed through coordinate conversion and coordinate calibration. That means each systematic defect coordinate is converted to design layout pattern coordinate. Execute the systematic defect layout pattern grouping analysis to create pluralities of systematic defect layout pattern groups. Finally, obtain file information that contains every systematic defect layout pattern group in the design layout pattern coordinate region.

Data processing unit: Execute defect size calibration for each systematic defect. Then, perform critical area analysis on each systematic defect that was after the defect size calibration procedure. Filter nuisance defect layout pattern groups and obtain the systematic defect layout pattern groups file information that belong to killer systematic defect layout pattern groups in the design layout pattern coordinate region.

Data processing unit: The killer systematic defect layout pattern groups file information in the design layout pattern coordinate regions are converted to systematic defect text and image data file.

Based on the purpose mentioned above, this invention first offers a "Semiconductor Fab's Defect Operating System". It is constructed through memory units and data processing units. Memory unit can store every process layer's systematic defect inspection data imported from semiconductor Fab and IC design layout pattern imported from IC design house and wafer sort yield data. The characteristic is:

Data processing unit: The systematic defect inspection data generated from each process layer is processed through coordinate conversion and coordinate calibration. That means each systematic defect coordinate is converted to design layout pattern coordinate. Execute the systematic defect layout pattern grouping analysis to create pluralities of systematic defect layout pattern groups. Finally, obtain file information that contains every systematic defect layout pattern group in the design layout pattern coordinate region.

Data processing unit: Execute defect size calibration for each systematic defect. Then, perform critical area analysis on each systematic defect that was after the defect size calibration procedure filter nuisance defect layout pattern groups and obtain the systematic defect layout pattern groups file information that belong to killer systematic defect layout pattern groups in the design layout pattern coordinate region.

Data processing unit: Perform analysis on the test failure item of the bad die based on the wafer yield sorting result. Obtain the killer systematic defect corresponding to the test failure item of the bad die that should fall into the design layout pattern coordinate region.

Data processing unit: Compare and perform matching between the killer systematic defect after critical area analysis and the test failure item's analysis data. Make sure that the killer systematic defect indeed falls on the right design layout pattern layer and region.

Data processing unit: The killer systematic defect layout pattern groups file information in the design layout pattern coordinate regions are converted to systematic defect text and image data file.

Based on the purpose mentioned above, this invention first offers a "Semiconductor Fab's Defect Operating System". It is constructed through memory units and data processing units. Memory unit can store every process layer's random defect inspection data imported from semiconductor Fab and IC design layout pattern imported from IC design house and wafer sort yield data. The characteristic is:

Data processing unit: The random defect inspection data generated from each process layer is processed through coordinate conversion and coordinate calibration. That means each random defect coordinate is converted to design layout pattern coordinate. Execute defect size calibration of each random defect. Finally, obtain file information that contains every random defect layout pattern in the design layout pattern coordinate region.

Data processing unit: Execute defect size calibration for each random defect. Then, perform critical area analysis on each random defect that was after the defect size calibration procedure. Filter nuisance defect layout patterns and obtain the random defect layout pattern file information that belongs to killer random defect layout pattern in the design layout pattern coordinate region.

Data processing unit: The killer random defect layout pattern file information in the design layout pattern coordinate regions are converted to random defect text and image data file.

Based on the purpose mentioned above, this invention first offers a "Semiconductor Fab's Defect Operating System". It is constructed through memory units and data processing units. Memory unit can store every process layer's random defect inspection data imported from semiconductor Fab and IC design layout pattern imported from IC design house The characteristics is:

Based on the purpose mentioned above, this invention first offers a "Semiconductor Fab's Defect Operating System". It is constructed through memory units and data processing units. Memory unit can store every process layer's random defect inspection data imported from semiconductor Fab and IC design layout pattern imported from IC design house and wafer sort yield data. The characteristic is:

Data processing unit: Execute defect size calibration for each random defect. Then, perform critical area analysis on each random defect that was after the defect size calibration procedure. Perform defect size calibration for each random defect. Obtain the random defect layout pattern file information that belongs to killer random defect layout pattern in the design layout pattern coordinate region.

Data processing unit: Execute defect size calibration for each random defect. Then, perform critical area analysis on each random defect that was after the defect size calibration procedure. Filter nuisance defect layout patterns and obtain the random defect layout pattern file information that belongs to killer random defect layout pattern in the design layout pattern coordinate region.

Data processing unit: From wafer yield sorting result, pick bad die and perform analysis on the test failure item. The killer random defect that causes this test failure should fall onto the design layout pattern coordinate region. Obtain the data file information.

Data processing unit: Obtain those defect data file information that those killer random defects with critical area analysis map to design layout pattern coordinate regions. Also, obtain the defect file information that the killer random defect with corresponding test failure item should fall into the design layout pattern coordinate region. Perform coordinate matching to confirm the killer random defect in the design layout pattern coordinate region. Obtain the defect data information.

Data processing unit: The killer random defect layout pattern file information in the design layout pattern coordinate regions are converted to random defect text and image data file.

Based on the purpose mentioned above, this invention first offers a "Semiconductor Fab's Defect Operating System". It is constructed through memory units and data processing units. Memory unit can store every process layer's random defect inspection data imported from semiconductor Fab and IC design layout pattern imported from IC design house and wafer sort yield data. The characteristic is:

Data processing unit: Execute defect size calibration for each random defect. Then, perform critical area analysis on each random defect that was after the defect size calibration procedure. Perform defect size calibration for each random defect. Obtain the random defect layout pattern file information that belongs to killer random defect layout pattern in the design layout pattern coordinate region.

Data processing unit: From wafer yield sorting result, pick bad die and perform analysis on the test failure item. The killer random defect that causes this test failure should fall onto the design layout pattern coordinate region. Obtain the data file information.

Data processing unit: From wafer yield sorting result, pick bad die and perform analysis on the test failure item. The killer random defect that causes this test failure should fall onto the design layout pattern coordinate region. Obtain the data file information.

Data processing unit: Obtain those defect data file information that those killer random defects with critical area analysis map to design layout pattern coordinate regions. Also, obtain the defect file information that the killer random defect with corresponding test failure item should fall into the design layout pattern coordinate region. Perform coordinate matching to confirm the killer random defect in the design layout pattern coordinate region. Obtain the defect data information.

Data processing unit: The killer random defect layout pattern file information in the design layout pattern coordinate regions are converted to random defect text and image data file.

Based on the purpose mentioned above, this invention offers a "Semiconductor Fab's Defect Operating System". It comprises memory units and data process units. Memory unit can store every process layer's random defect inspection data imported from semiconductor Fab and IC design layout pattern imported from IC design house and wafer sort yield data. The characteristics is Data processing unit: Conduct every layer's defect inspection data through coordinate conversion and coordinate calibration. Then, every random defect coordinate is converted to IC design layout pattern coordinate.

Data processing unit: Execute defect size calibration for every process layer's defect. Perform critical area analysis on every defect with calibrated defect size. Screen the killer defects out of the whole defects. Obtain the killer defect data image file with killer defect in the IC design layout pattern area;

Data processing unit: Select bad die from wafer yield sorting data and conduct testing failure item's analysis. Confirm the testing failure item of the bad die falls on the IC design layout pattern zone area;

Data processing unit: Compare 'the testing failure item of the bad die that falls on the IC design layout pattern zone area' with 'the pluralities of layout pattern zone area'. Mark the specific zone that the testing failure item falls on. Display the killer defects inside this specific zone area; and Data processing unit: Execute failure analysis on every killer defect that falls on this specific layout pattern zone area.

Data processing unit: Cut the IC design layout pattern of the bad die into pluralities of layout pattern zone area;

Data processing unit: Compare 'the testing failure item of the bad die that falls on the IC design layout pattern zone area' with 'the pluralities of layout pattern zone area'. Mark the specific zone that the testing failure item falls on. Display the killer defects inside this specific zone area; and Data processing unit: Execute failure analysis on every killer defect that falls on this specific layout pattern zone area.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 14G is this invention's "Semiconductor Fab's Defect Operating System" systematic killer defect text and image data file.

FIG. 15E is this invention's "Semiconductor Fab's Defect Operating System" chart that solves killer random defect screen with bad die's testing analysis data.

DESCRIPTION OF THE PREFERRED EMBODIMENT

In semiconductor Fab, semiconductor assembly Fab, flat panel displayFab, solar cell Fab, printed circuit board Fab, mask Fab, LED Fab or LED assembly, Fab must process mask, lithography, etching, and film deposition, etc. equipment tools and run process to produce functional products. Because too many complex manufacturing, process and equipment parameter control and deviation, material control, or technical bottleneck will create many defects that affect product yield. Those defects cannot be avoided. So, semiconductor Fab will execute defect inspection in the manufacturing process to improve yield and reduce cost.

Besides, this invention's "Semiconductor Fab's Defect Operating System" include: Apply to IC design house and semiconductor fan, IC design house and semiconductor assembly Fab, IC design house and printed circuit board Fab, IC design house and mask Fab, IC design house and flat panel display Fab, IC design house and solar celly Fab, IC design house and LED Fab or LED assembly Fab, etc. A "Semiconductor Fab's Defect Operating System" is used in wafer manufacturing that delivers functional chip. The semiconductor Fab mentioned in this invention is a Foundry Fab. This invention also uses Foundry Fab as a practice example description.

Furthermore, this invention's "Semiconductor Fab's Defect Operating System" can be named as ⌈Defect Operating Platform⌋, ⌈OpenShort Platform⌋, ⌈Defect Management Platform⌋, ⌈Shared Defect Platform⌋ or ⌈Defect Sharing Platform⌋, etc. For example: ⌈Shared Assembly Defect Platform⌋ for assembly Fab is used other than "Semiconductor Fab's Defect Operating System". ⌈Shared Flat Panel Display Defect Platform⌋ for flat panel display Fab is used other than "Semiconductor Fab's Defect Operating System".

Figure 1:
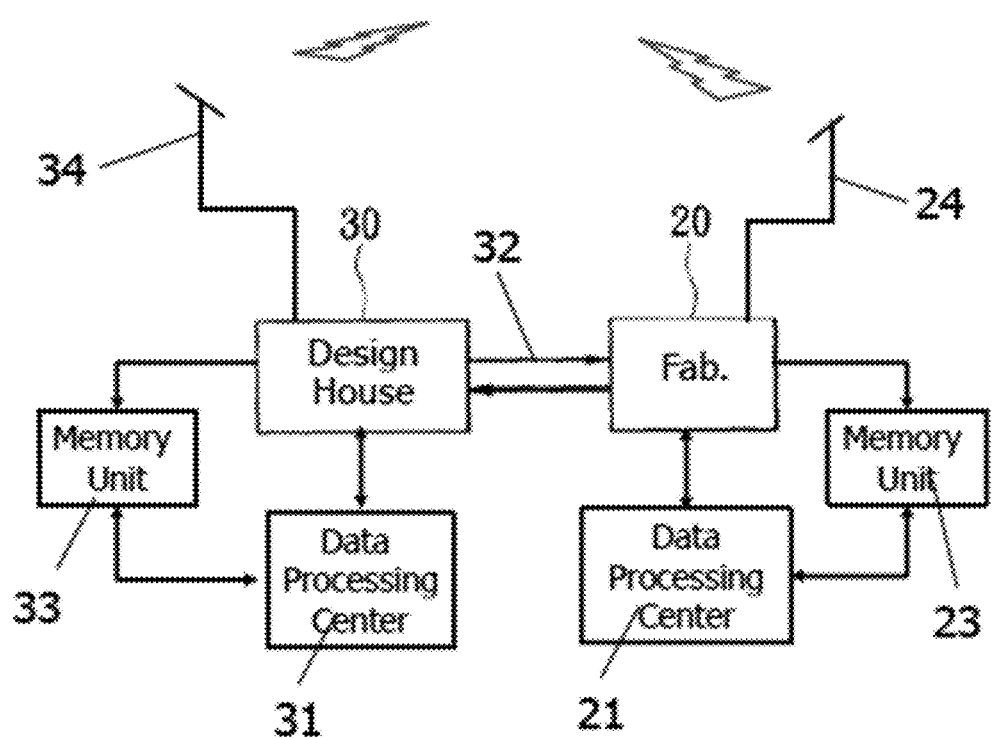
FIG. 1 is the operation architecture drawing chart of the present invention "Smart Semiconductor Defect Calibration, Classification, and Sampling System and The Method Thereof".

First of all, please review FIG. 1. It is an operation architecture chart for the present invention that involves a "Semiconductor Fab's Defect Operating System" Thereof.

As shown in FIG. 1, a practice example of the present invention will take the wafer manufacturing as an example and explain as well. For the description procedure below, we will use ⌈Defect Operating System⌋. Overall, the Defect Operating System can be implemented at wafer foundry Fab 20 (a simple naming as Fab 20). The Defect Operating System can be implemented at IC design house 30 (a simple naming as design house 30). Of course, the Defect Operating System can be implemented through Fab 20 and design house 30 via wired Internet or through antenna 24/34 and wireless Internet to implement.

Figure 3A:
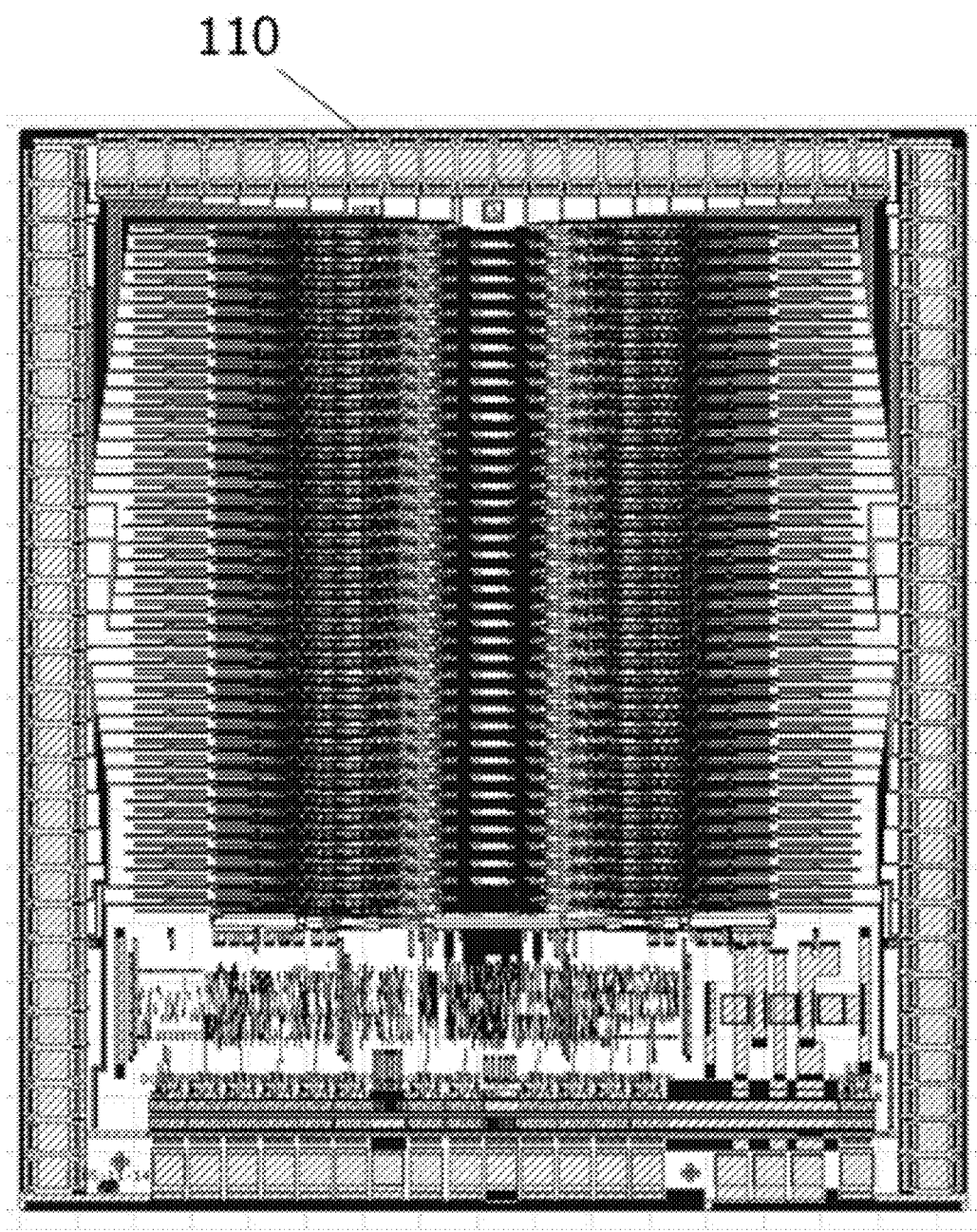
FIG. 3A is the Retrieve design layout drawing chart for the present invention "Smart System".

For example: When a design house 30 completes a specific functioning IC design layout, data processing unit 31 will store the design layout pattern GDS or OASIS file into the memory unit 33. Then, the system will deliver the GDS or OASIS file through wired internet or wireless internet to Fab 20. The design layout pattern 1110 (as shown in FIG. 3A) include plurality of layout pattern (ex. device layout pattern). Each layout pattern polygon always includes layout pattern geometry size, layout pattern coordinate, layout pattern layer, text mark or dimension. In general, design layout pattern 1110 format can be GDS (Graphic Database System) format, GDS-II format, or OASIS (Open Access Same-time Information System) format. Fab 20 retrieve the data file and pass data file to data processing unit 21. Once data processing unit 21 processes the data file, the data will be saved into the memory unit 23. The mask is made based on the design layout file and OPC (Optical Proximity Correction) in mask house. After that, Fab 20 will run semiconductor process using various layer's mask. Then, plurality of repeating die 11 (displayed in FIG. 3D) are made in wafer 10. Usually, Fab 20 will use the design house 30 design layout file to manufacture semiconductor chips.

During the manufacturing procedures of wafer 10, defect will occur in each manufacturing process of wafer 10, such as random defect or systematic defect. That is why Fab 20 will use defect inspection tool to detect defect at any stage or multiple process steps in the manufacturing process. For example: Scanning Electron Microscope (SEM), E-beam inspection tool, optical inspection tool, defect scanner, or camera, etc. The defect inspection tool will run defect scan and inspection on wafer 10 and generate the wafer's raw defect inspection data file. The defect inspection file includes: defect size dimension, shape, area, die index, coordinate, or image, etc. The defect data will be processed in the Data processing unit 21 to be JPG, TIFF, PNG, and pure text spec defect text and image data file 1130 (displayed in FIG. 3B). Then, save into the memory unit 23.

Based on the above information, Fab 20 obviously has saved the design layout file 1110 of a design house 30, defect text and image data file 1130 into memory unit 23. So, ⌈Smart System⌋ of present invention can execute defect calibration, classification, and sampling job at Fab 20. Similarly, ⌈Smart System⌋ of present invention can execute defect calibration, classification, and sampling job at design house 30 if Fab 20 delivers defect text and image file 1130 to design house 30 through wired network or wireless network. Of course, ⌈Smart System⌋ of present invention can execute defect calibration, classification, and sampling job as a real-time analysis for both Fab 20 and design house 30 if both Fab 20 and design house 30 can exchange data files to each other real-time through wired network or wireless network. As to who is in charge to execute defect calibration, classification, and sampling job, the present invention does not limit to either side.

Next, please review FIG. 1. It is an operation architecture chart for the present invention that involves a "Semiconductor Fab's Defect Operating System". A practice example of the present invention will take the semiconductor Fab 20 as an example and explain as well. For the description procedure below, we will use "Defect Operating System" 50 to replace "Semiconductor Fab's Defect Operating System". Overall, the "Defect Operating System" 50 can be implemented at semiconductor Fab 20 (a simple naming as Fab 20). The "Defect Operating System" 50 can be implemented at IC design house 30 (a simple naming as design house 30). Of course, the "Defect Operating System" 50 can be implemented through semiconductor Fab 20 and IC design house 30 via wired internet or through antenna 24/34 and wireless internet to implement. For example: When a IC design house 30 completes a specific functioning IC design layout, data processing center 31 will store the design layout pattern GDS or OASIS file into the memory unit 33. Then, the system will deliver the GDS or OASIS file through wired internet or wireless internet to semiconductor Fab 20. The design layout pattern includes plurality of layout pattern (ex. device layout pattern). Each layout pattern polygon always includes layout pattern geometry size, layout pattern coordinate, layout pattern layer, text mark or dimension. In general, design layout pattern format can be GDS (Graphic Database System) format, GDS-II format, or OASIS (Open Access Same-time Information System) format. Semiconductor Fab 20 retrieve the data file and pass data file to data processing unit 21. Once data processing unit 21 processes the data file, the data will be saved into the memory unit 23. The mask is made based on the design layout file and OPC (Optical Proximity Correction) in mask house. After that, semiconductor Fab 20 will run semiconductor process using various layer's mask. Then, plurality of repeating die 11 are made in wafer 10. Usually, semiconductor Fab 20 will use the IC design house 30 design layout file to manufacture semiconductor chips.

Based on the above information, semiconductor Fab 20 obviously has saved the design layout file of IC design house 30, defect text and image data file 1130 into memory unit 23. So, "Defect Operating System" 50 of present invention can execute defect calibration, classification, and sampling job at semiconductor Fab 20. Similarly, "Defect Operating System" 50 of present invention can execute defect calibration, classification, and sampling job at IC design house 30 if Fab 20 delivers defect text and image file 1130 to IC design house 30 through wired network or wireless network. Of course, "Defect Operating System" 50 of present invention can execute defect calibration, classification, and sampling job as a real-time analysis for both semiconductor Fab 20 and IC design house 30 if both semiconductor Fab 20 and IC design house 30 can exchange data files to each other real-time through wired network or wireless network. As to who is in charge to execute defect calibration, classification, and sampling job, the present invention does not limit to either side.

"Defect Operating System" 50 of present invention can be shared cloud platform between IC design house 30 and semiconductor Fab 20. Both sides use feed forward and feedback loop to share defect information and solve defect problem together. It is for yield improvement and shorten learning curve cycle time. The shared defect information includes: I) After defect analysis, semiconductor Fab 20 can provide every mask's and process layer's defect inspection data, defect SEM images (including defect image classification data, systematic defect exposure energy/defocus process window experiment information, Optical Proximity Correction model update description, re-do mask information, defect improvement plan and record, process and equipment yield improvement information). Upload to "Defect Operating System" 50. Download the defect information that IC design house 30 upload to "Defect Operating System" 50. II) IC design house 30 can analyze systematic defect and random defect inspection defect data to generate killer systematic defect data and killer random defect data. Perform failure analysis on those bad die that were not sampled for SEM imaging by semiconductor Fab 20. Those failure killer random defect SEM images (i.e. IC design house 30 takes SEM images from failure analysis), systematic defect and random defect layout pattern 1111, wafer yield sorting data, systematic defect pattern and finetuned IC design layout pattern 1110 and description will be uploaded to "Defect Operating System" 50 by IC design house 30. Download the systematic defect and random defect information which was uploaded to "Defect Operating System" 50 by semiconductor Fab 20. To operate "Defect Operating System" 50, both sides setup password, user management, and other internet information security management apparatus. So, IC design house 30 and semiconductor Fab 20 can have defect sharing, feed forward and feedback flow, defect issue solution plan and control schedule, trace solution plan's implementation efficiency to improve yield as a win-win goal. Server and storage apparatus can be installed at semiconductor Fab 20, or IC design house 30, or both sides.

Figure 2:
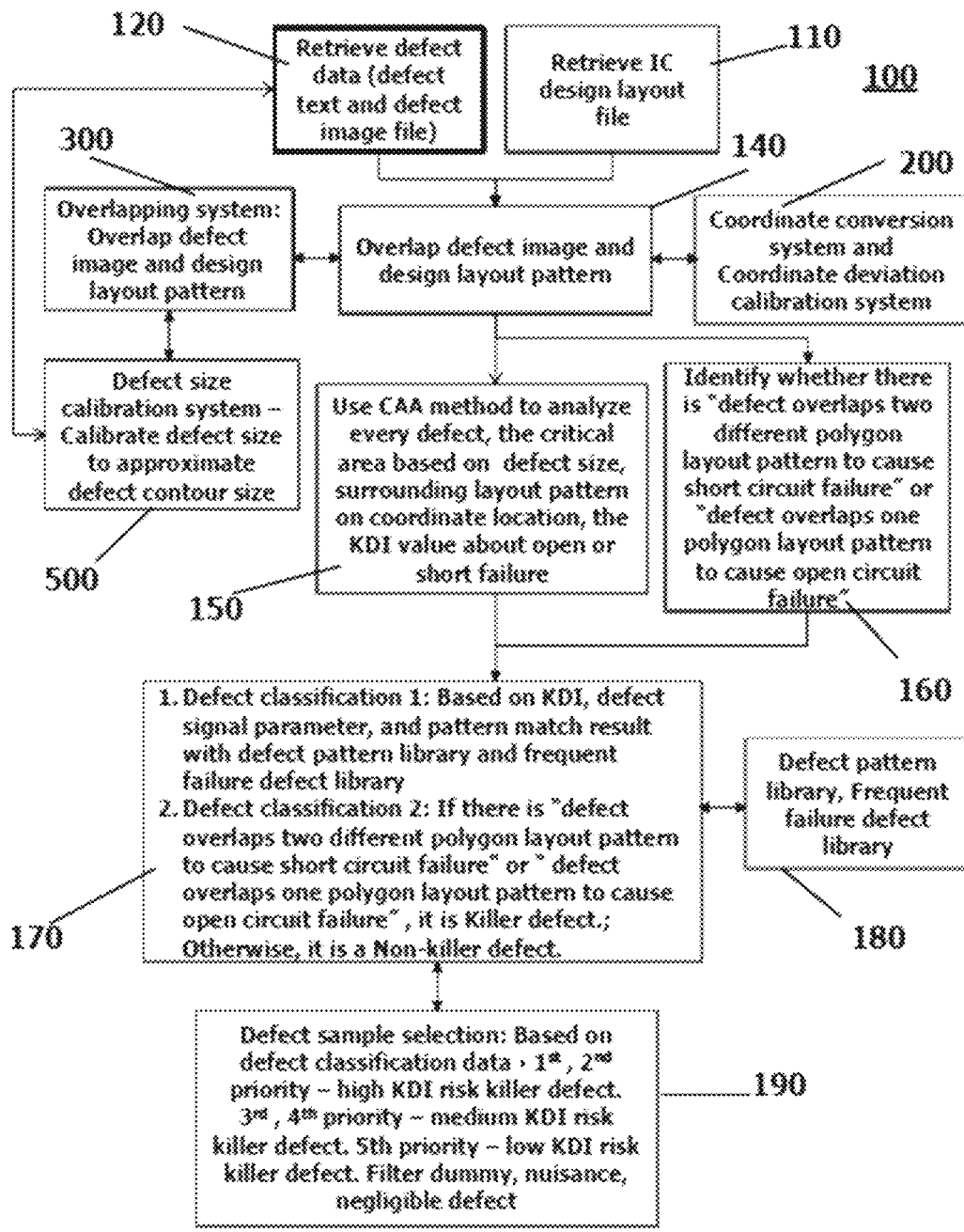
FIG. 2 is the process flowchart of the present invention "Smart System".

Next, please refer to FIG. 2. It is the ⌈Smart System⌋ flowchart of present invention. As shown in FIG. 2, ⌈Smart System⌋ flowchart 100 of present invention begins with data processing unit 21. Data processing unit 21 retrieves design layout pattern file 1110 and defect text and image file 1130 as shown in step 110 and step 120. Then, step 130 performs coordinate conversion and coordinate deviation calibration with the design layout pattern file 1110 and defect text and image file 1130. The defect coordinate location of wafer 10 is converted to the corresponding coordinate location in design layout pattern. It is to decide where the defect image 1101 will fall on the design layout pattern coordinate location. After that, step 140 processes each defect contour of the defect image to be superposed or mapped to design layout pattern 1110 where the superposition or mapping location is the mapping defect layout pattern 1111 coordinate location with coordinate conversion from each defect image 1101 coordinate location. Then, step 150 generates Killer Defect Index (KDI). Killer Defect Index is generated based on step 140 the defect pattern coordinate conversion of each defect image's contour to be superposed or mapped in design layout coordinate location. The Critical Area Analysis method is used to analyze and produce the short and open critical area based on the defect contour dimension and the layout pattern with a coordinate deviation area at the design layout coordinate location. At same time, step 160 can check whether there is overlap of defect image contour with two layout pattern. Step 160 can also check whether there is intersect of defect image contour with one layout pattern. Then, step 170 performs defect classification based on the judgment results of step 150 and step 160. According to the KDI, defect signal parameter, pattern match between defect and defect pattern library, and pattern match between defect and frequent failure defect library, defect classification is performed. The defect pattern library and frequent failure defect library can be obtained from memory unit 23/33 (as shown in step 180), or process defect classification based on the layout pattern interaction with defect, i.e. the short or open failure result. Finally, step 190 performs defect sampling based on the defect classification and defect sampling rule setup in step 170.

Further, real practice way of each step in ⌈Smart System⌋ flowchart 100 is described in detail. First of all, retrieval of design layout pattern in step 110 is mainly processed based on the IC design layout pattern 1110 of a design house 30. Please refer to FIG. 3A. It is a chart about obtaining a design layout pattern in ⌈Smart System⌋ of present invention. As shown in FIG. 3A, user (ex. engineer in design house 30) retrieves design layout pattern 1110 in advance through the data processing unit 31. The design layout pattern 1110 format can be GDS format, GDS-II format, or OASIS format.

Figure 3B:
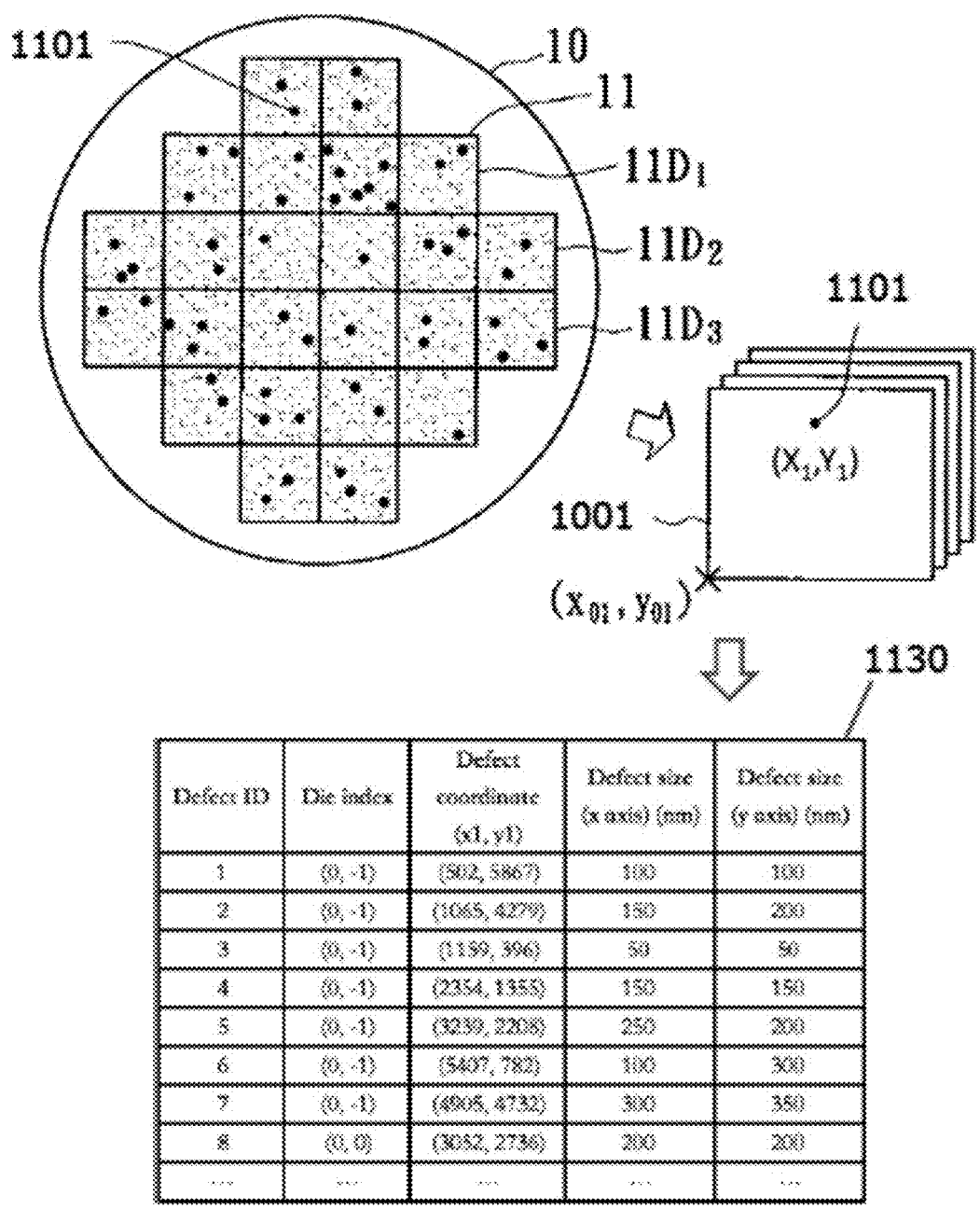
FIG. 3B is the Retrieve defect data drawing chart for the present invention "Smart System".

Then, please see FIG. 3B. It is a chart about obtaining a defect data file in ⌈Smart System⌋ of present invention. As described before, a design layout pattern file 1110 is already completed in design house 30 and delivered to Fab 20. Through manufacturing process, Fab 20 can produce and form full chip layout 11 patterns on wafer 10. In full chip layout 11, include plurality of die. For example, 11D1, 11D2, 11D3. Then, Fab 20 use defect inspection tool to do defect scan and inspection on wafer 10. So, obtain the plurality of defect image 1101 file and defect text data over the full chip layout 11. Then, data processing unit 21 extracts and calculates one or more defect image 1101 generated on which die of wafer 10 and the defect location on that die.

Furthermore, please see FIG. 3B. Data processing unit 21 obtains every defect coordinate $(X_1, Y_1)$ of wafer 10, and obtains defect image 1001 in image file 1001, and the circuit pattern 1102 in the image file 1001. Please continue on FIG. 3B. Out of many die in wafer 10, there are total 7 defect images 1101 detected in die 11. Data processing unit 21 displays defect image coordinate $(X_1, Y_1)$ with reference to the first reference original coordinate $(X_{01}, Y_{01})$. For example, the first reference original coordinate $(X01, Y01)$ is generated from the defect inspection tool's recipe. Normally, first reference original coordinate $(X_{01}, Y_{01})$ is selected at die 11 corner or a very easy recognized location as a reference marker. As to the marker, the present invention does not put a limitation on it. Finally, data processing unit 21 obtains each defect text and image file. Then, use wafer 10 link to the defect text and image file 1130. In defect text and image file 1130, record each defect image's content, including die 11 die index number, defect image 1101 identification number, product name, defect inspection step, lot ID, defect inspection tool ID, defect coordinate $(X_1, Y_1)$, and rough defect image dimension (including the maximum size in X direction and Y direction), etc. Finally, defect text and image file 1130 will be stored in memory unit 23.

Figure 3C:
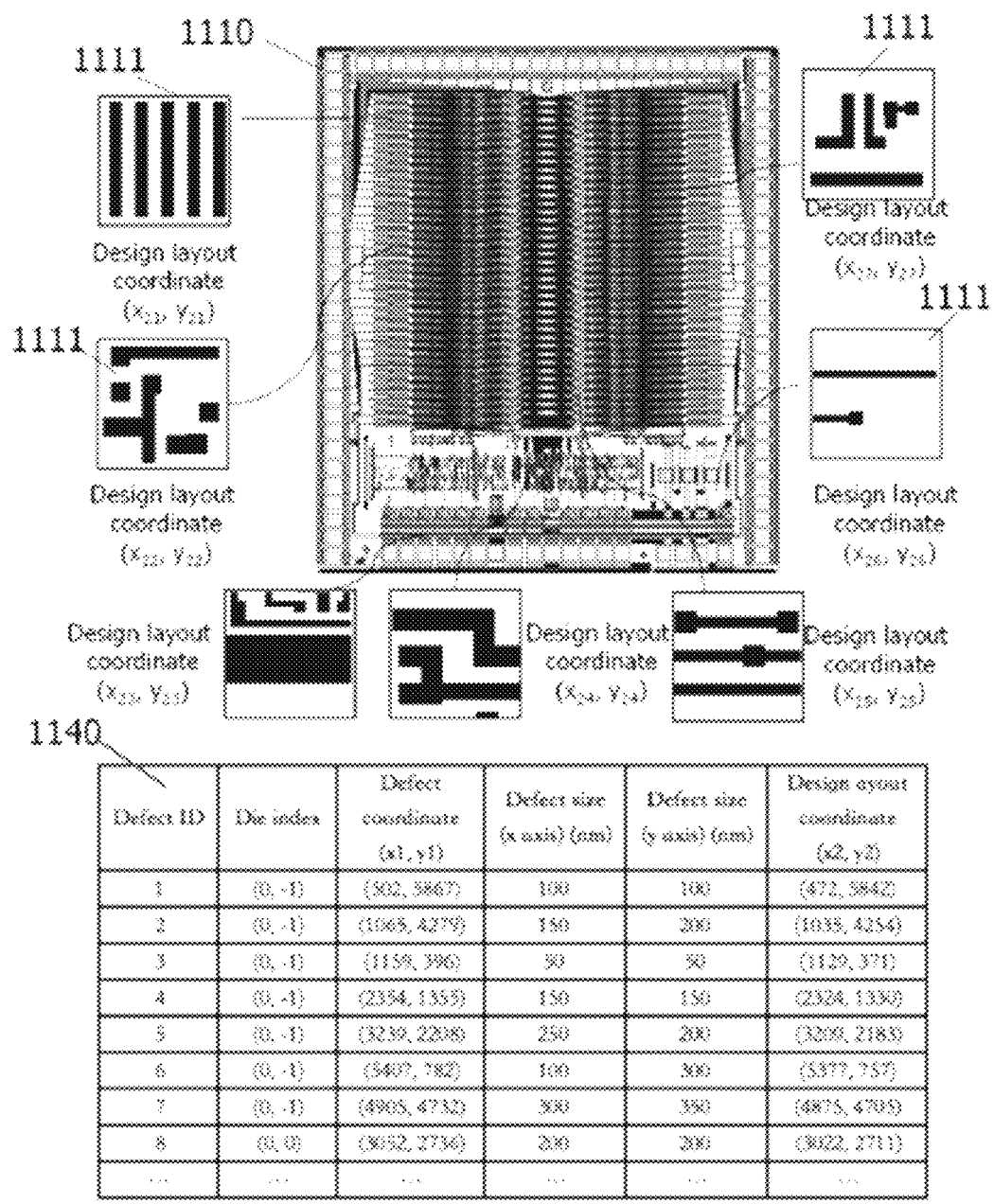
FIG. 3C is the Defect to design layout coordinate conversion drawing chart for the present invention "Smart System".

Then, perform defect data coordinate conversion and coordinate deviation calibration in step 130. Please refer to FIG. 3C, it is a drawing chart in ⌈Smart System⌋ of present invention about the coordinate conversion between design layout pattern and the defect data. As shown in FIG. 3C, data processing unit 21 extracts every defect image 1101 and its coordinate $(X_1, Y_1)$ in die 11 from the defect text and image file 1130. The data processing unit 21 processes the defect to design layout pattern coordinate conversion. For example: Data processing unit 21 handles the defect coordinate $(X_1, Y_1)$ in defect text and image file 1130 through coordinate conversion process and maps to the coordinate $(X_2, Y_2)$ in defect layout pattern 1111 of a design layout pattern 1110. the defect coordinate $(X_1, Y_1)$ in defect text and image file 1130 is converted to design layout coordinate $(X_2, Y_2)$ based on the design layout pattern 1110 reference marker coordinate. As shown in FIG. 3C, the 7 defect image 1101 of those defect ID 1~7 is converted to defect layout pattern 1111 with corresponding defect coordinate $(X_{21}, Y_{22})$ $(X_{21}, Y_{22})$ to $(X_{27}, Y_{27})$. As to the dimension size in defect layout pattern 1111, it is determined by the defect inspection tool's precision level or deviation range. For example: When use an optical defect inspection tool with a deviation range −0.5 µm~±0.5 µm to perform the defect scan and inspection, then the deviation range of the defect layout pattern 1111 is 1 µm×1 µm. In the defect layout pattern, the conductor layout pattern dimension can be 50 nm and the spacing between two conductor layout patterns can be 30 nm.

Besides, the purpose to convert the defect coordinate $(X_1, Y_1)$ to design layout coordinate $(X_2, Y_2)$ in design layout pattern 1110 is to judge whether a defect image 1101 would cause a circuit layout pattern 1102 to be a short circuit defect or open circuit defect. However, defect coordinate $(X_1, Y_1)$ for defect image 1101 is measured from the defect inspection tool. The reference marker coordinate could be die 11 and its first reference original point coordinate $(X_{01}, Y_{01})$ as a center point. Design layout pattern 1110 does have its own reference original point coordinate $(X_{02}, Y_{02})$. Since mask contains both the design layout reference original point coordinate $(X_{02}, Y_{02})$ and reference marker layout pattern coordinate, the relative position of design layout reference original point coordinate to the reference marker layout pattern coordinate is decided. When user select the reference marker layout pattern coordinate $(X_{01}, Y_{01})$ for the defect inspection tool, then relative position of design layout reference original point coordinate to the reference marker layout pattern coordinate $(X_{01}, Y_{01})$ is calculated into the defect coordinate conversion system. In addition, there is coordinate deviation due to optical diffraction effect when inspect wafer 10 in a defect inspection tool. In a drawn design layout pattern, it is a rectangular pattern for the reference marker layout pattern. However, this reference marker layout pattern becomes rounded pattern on wafer because the optical diffraction makes the original drawn rectangular marker pattern to be a curvature rounded pattern. So, there is a deviation between the defect image 1101 coordinate $(X_1, Y_1)$ and the original drawn rectangular marker pattern. Obviously for the same reference marker layout pattern, the deviation exists between reference marker pattern $(X_{01}, Y_{01})$ in wafer 10 and design layout reference marker layout pattern. After defect coordinate conversion, this coordinate deviation is shown on the defect layout pattern coordinate. It will be corrected through the coordinate deviation calibration procedure.

Figure 4:
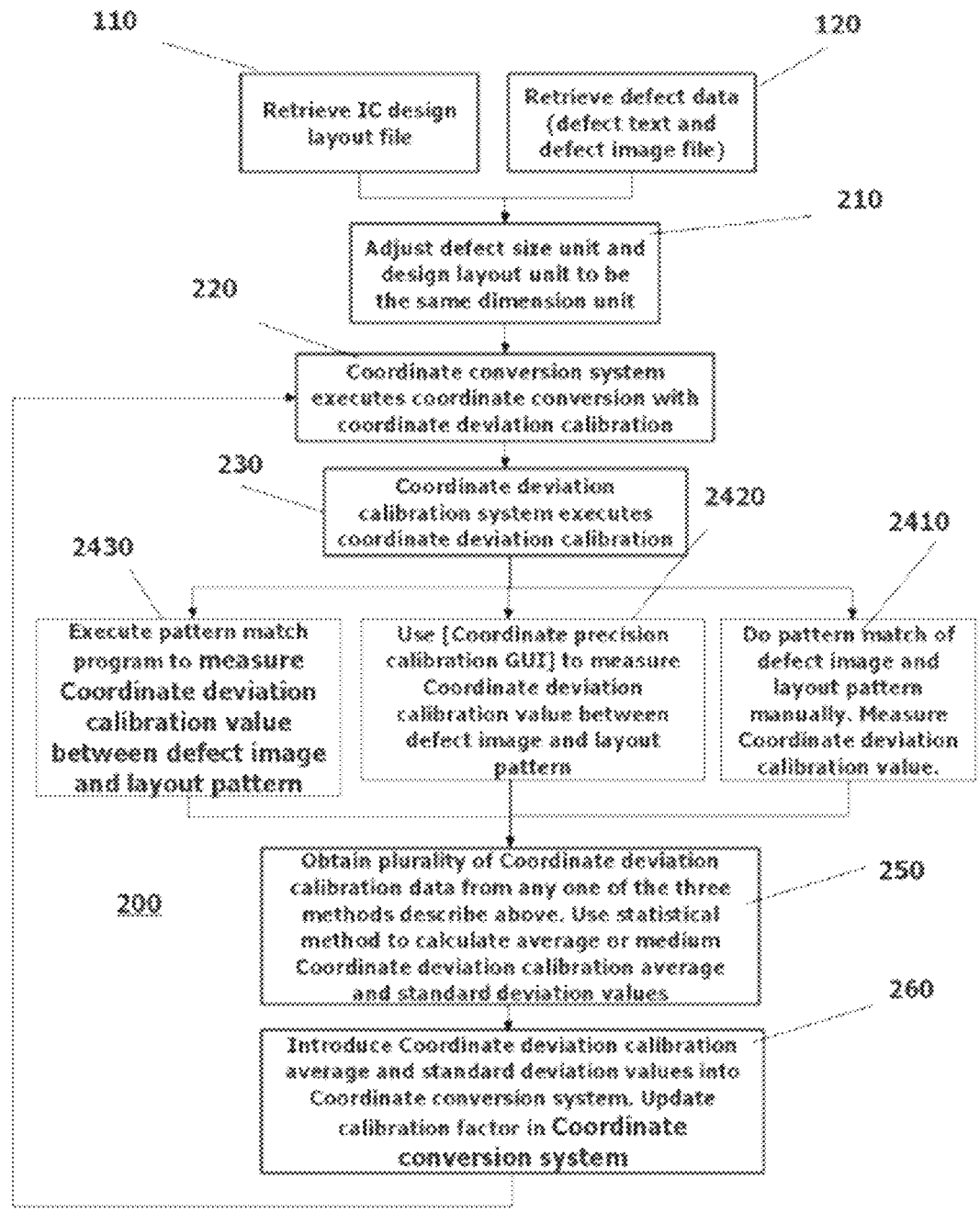
FIG. 4 is the Defect to design layout coordinate conversion and coordinate deviation calibration flowchart for the present invention "Smart System".

Furthermore, the file format of defect image 1101 is different with the file format of design layout pattern 1110 in certain case. For example: When file format of defect image 1101 is JPEG, the unit is in pixel, micrometer or nanometer. When the file format of design layout pattern 1110 is in GDS, the unit is in micrometer (µm), or nanometer (nm). There might exist deviation between those different file format. So in a better practice example of the present invention, a precision calibration procedure is added and is shown in step 200. The actual calibration procedure of step 200 is shown in FIG. 4. FIG. 4 is the calibration process flowchart of the present invention for ⌈defect to design layout pattern coordinate conversion and deviation calibration⌋. In the beginning, retrieve the design layout pattern file and defect data file as shown in FIG. 4 step 110 and step 120. Since the procedures are same as in FIG. 2. There is no need to repeat description here. Next, please see step 210. Step 210 is to adjust both units in defect image 1001 and design layout pattern 1110 to be the same unit. For example: User can choose a unit in pixel, µm, or nm, then adjust both units in defect image 1001 and design layout pattern 1110 to be the same unit. After that, step 220 can be finished. The defect image 1101 can be correctly transformed to design layout pattern 1110. In this way, the system can overcome the large defect to design layout coordinate conversion deviation problem that is induced from the difference between file format of defect image 1101 and file format of design layout pattern 1110.

Figure 5:
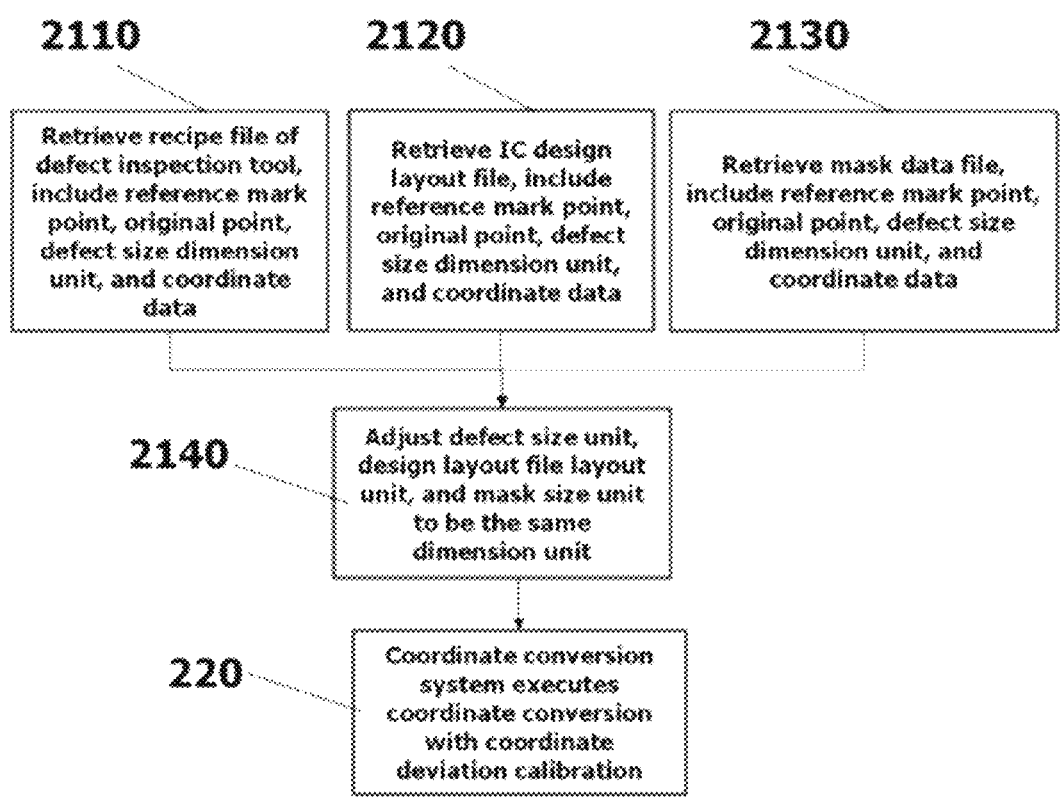
FIG. 5 is the Defect to design layout coordinate conversion flowchart with defect size calibration for the present invention "Smart System".

In order to make the best precision for the defect image to design layout pattern coordinate conversion and deviation calibration, all the possible factors that might affect the coordinate conversion precision are included for calibration. More than that, the present invention provides a better practice example. Please refer to FIG. 5. It is a flowchart for defect size calibration and coordinate conversion. As shown in FIG. 5, the first step 2110 is to retrieve the parameters from defect inspection tool. For example: Data processing unit 21 retrieve from memory unit 23 the alignment reference marker coordinate, dimension data, etc. of a defect inspection tool. Or, step 2120 retrieves the parameters of a design layout 1110. For example: Data processing unit 21 retrieve from memory unit 23 the original coordinate, alignment reference coordinate, and dimension data, etc. of a design layout 1110. Or, step 2130 retrieves the parameters of a mask. For example: Data processing unit 21 retrieve from memory unit 23 the original coordinate, alignment reference coordinate, center point coordinate, and dimension data, etc. of a mask. Then, adjust the defect image 1101 dimension, design layout pattern 1101 dimension, and proportional dimension as defined in mask data to be the same as shown in step 2140. Without step 2140, step 220 cannot be completed. User must choose one or multiple reference marker pattern to setup the alignment mark reference marker coordinate for the defect inspection tool. The marker pattern can be a L shape pattern, a cross pattern (+), or a rectangular pattern, etc. The marker pattern is a simple pattern that can be aligned easily. In general case, the marker pattern is placed in the scribe line that is close to the die corner. That means the marker pattern is not placed inside design layout. Only mask data includes all the marker pattern coordinate inside scribe line, design layout corner and original point coordinate, and mask center point coordinate. That is why all the distances between marker pattern/alignment marker and design layout 1110 original point can be calculated based on the mask parameters data. The coordinate conversion system to convert the defect image coordinate to design layout 1110 coordinate can be setup through the above marker pattern/alignment marker and design layout 1110 original point coordinate relationship. So, a defect image 1101 of a image file 1001 coordinate ($X_1$, $Y_1$) can be converted to design layout 1110 coordinate ($X_2$, $Y_2$) correctly. In the end, processing step 220 in this practice example will guarantee the coordinate deviation calibration, no matter in the coordinate conversion deviation calibration or real time pattern match between defect images 1101 of image file 1001 and design layout pattern 1110, with the coordinate deviation data as shown in step 230.

Please refer to FIG. 4. When step 220 already implements coordinate deviation calibration for all possible coordinate deviation factors, the defect image 1101 of image file 1001 is converted to a defect layout pattern 1111 coordinate ($X_2$, $Y_2$) in design layout 1110. Obviously, each defect layout pattern 1111 represents different layout pattern and different image 1101 pattern. For example: Wafer 10 contains a thousand die 11D. There might be coordinate deviation in each defect layout pattern when the defect image 1101 defect coordinate ($X_1$, $Y_1$) is converted to design layout pattern 1101 defect coordinate ($X_2$, $Y_2$). So, the present invention further provides three methods to calibrate design layout pattern 1101 defect coordinate ($X_2$, $Y_2$) deviation.

Figure 6A:
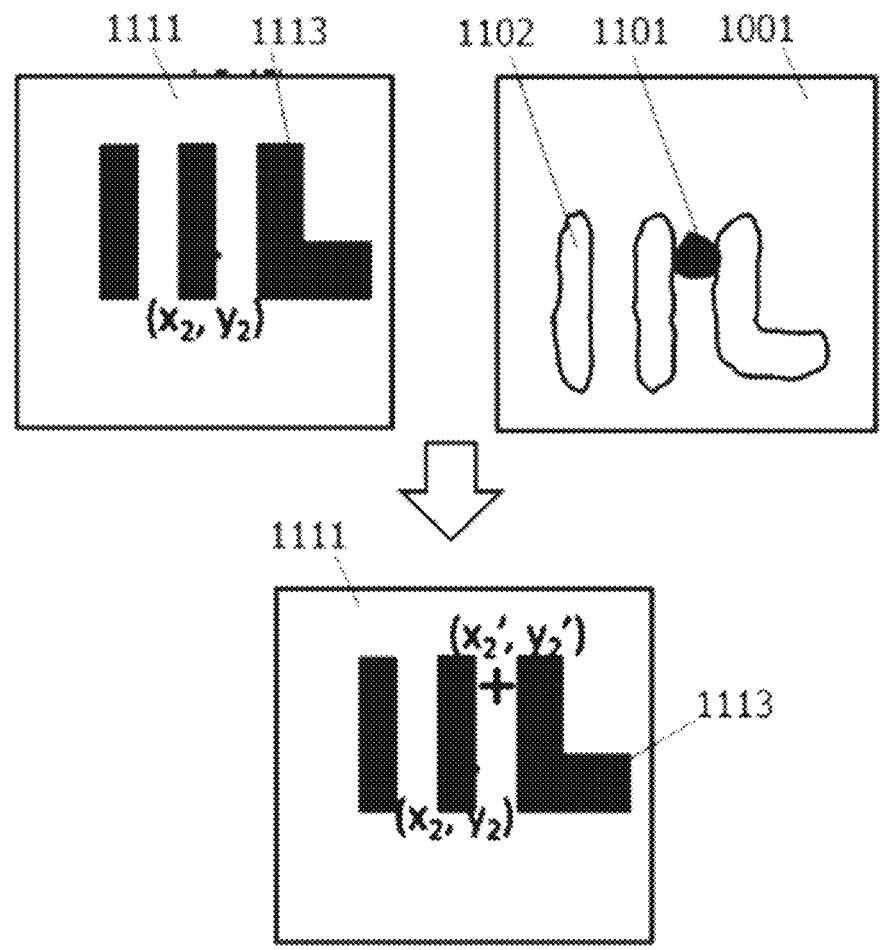
FIGS. 6A to 6D are the Plurality practice examples for coordinate deviation calibration drawing chart for the present invention "Smart System".
Figure 6B:
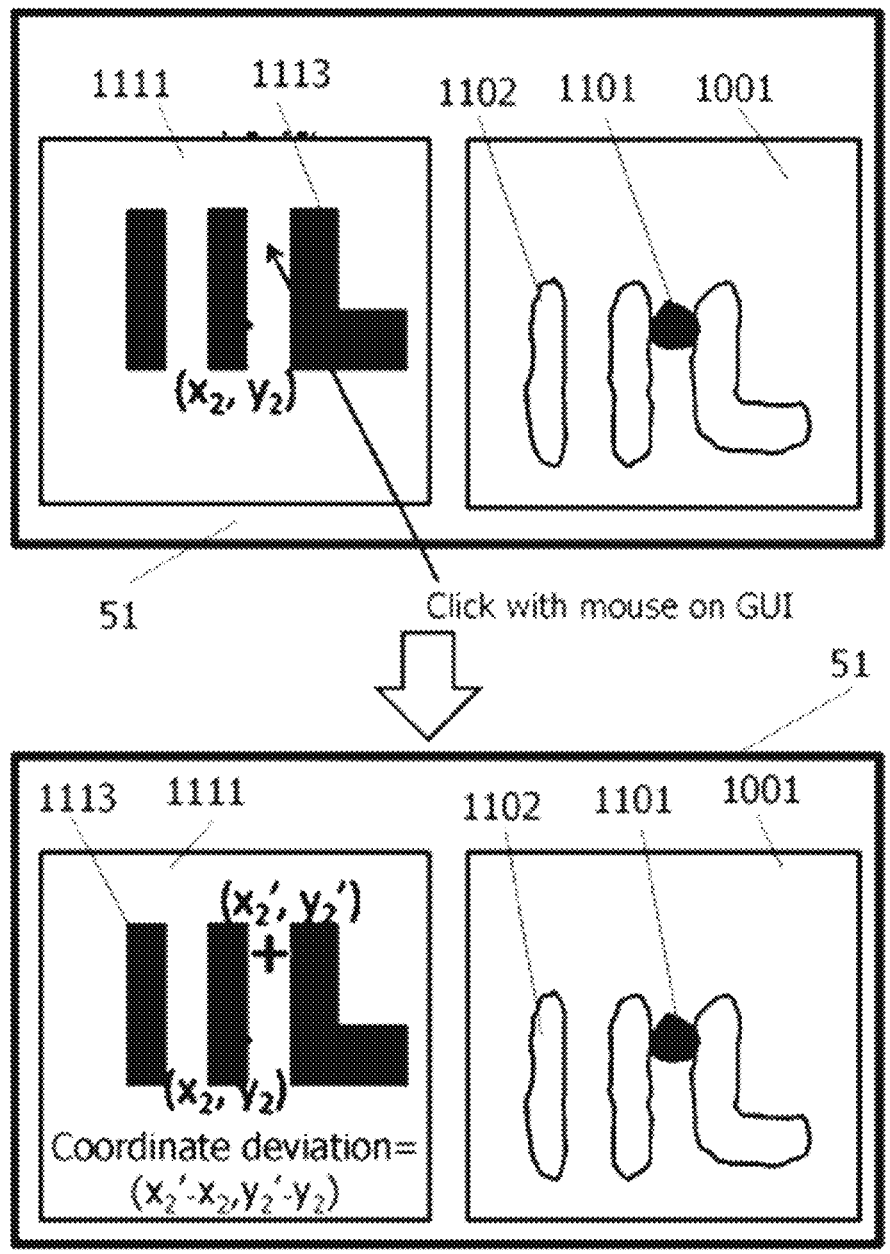
Figure 6C:
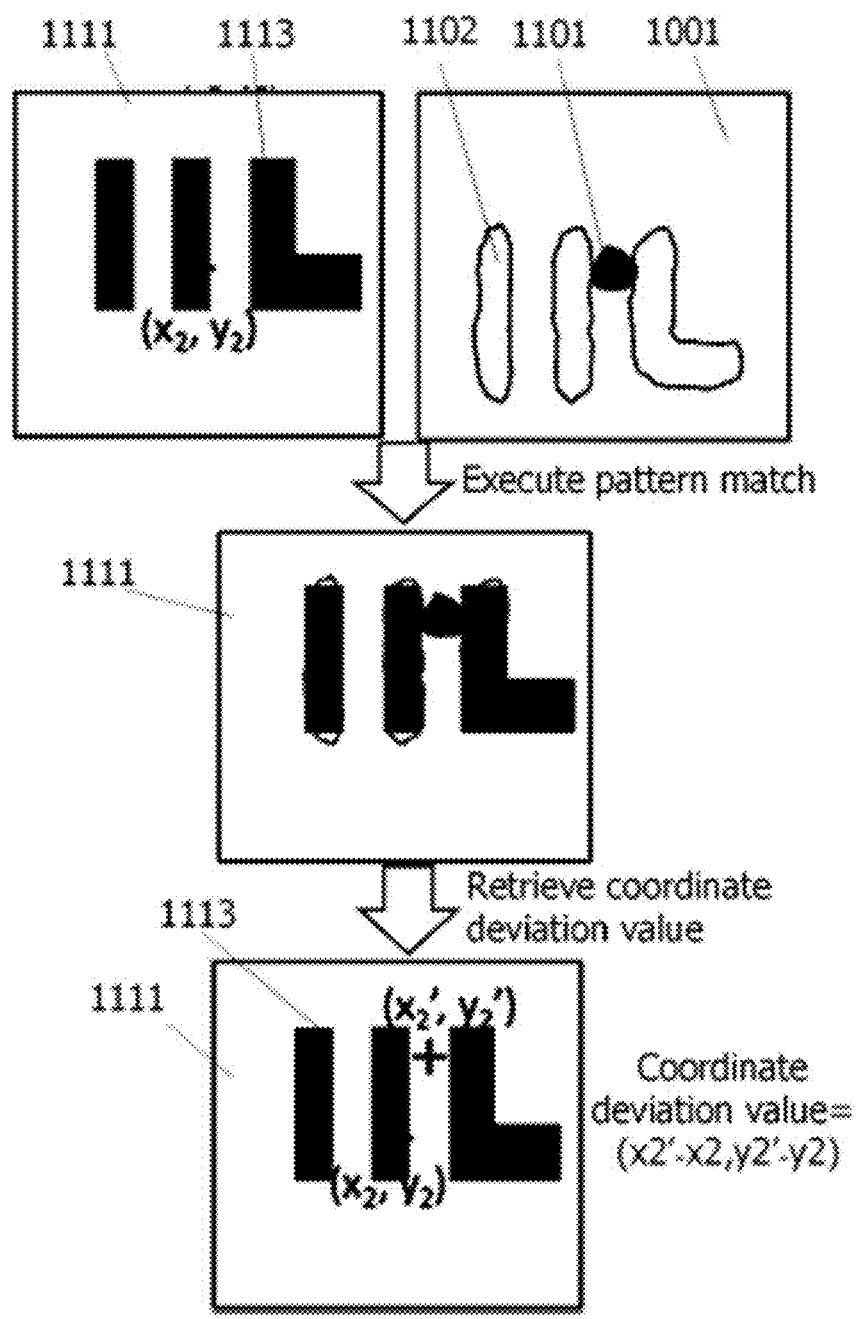
Figures 6D, 7A:
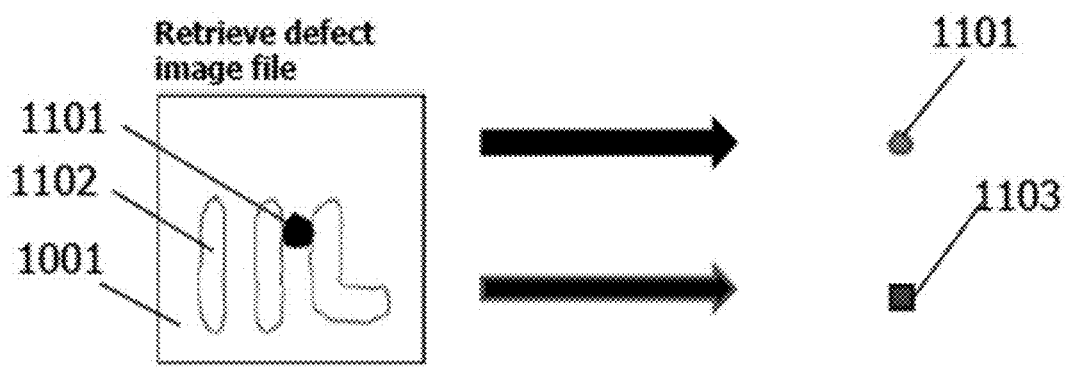
FIGS. 7A to 7E are the Plurality practice examples for clipping defect contour and overlap to mapped design layout pattern drawing chart for the present invention "Smart System".

First method, as shown in step 2410, data processing unit 21 select a defect image 1101 from memory unit 23. For example: Select a design layout pattern that includes the transistor device. Next, data processing unit 21 retrieves a defect layout pattern 1111. Then, data processing unit 21 retrieves defect image 1101 of image file 1001 that has the transistor device pattern. Display both the defect layout pattern 1111 and defect image 1101 of image file 1001 together on the computer monitor screen 51. In a practice example, the dimension unit is already adjusted to be the same in both displayed defect layout pattern 1111 and defect image 1101 of image file 1001. (For example: Both patterns are adjusted to dimension unit such as pixel unit, μm unit, or nm unit.) Then, user who execute the calibration manually processes the coordinate deviation distance from the defect layout pattern coordinate to actual defect layout pattern coordinate with mapped defect image on the monitor screen 51 for a certain defect image/defect layout pattern pairs and calculate the statistical coordinate deviation data. For example: On monitor screen 51, the coordinate deviation calibration sponsor aligns defect layout pattern 1111 and defect image 1101 of image file 1001 with a setting coordinate value manually as shown in FIG. 6A upper half. If the defect coordinate location ($X_2$, $Y_2$) in the converted defect layout pattern 1111 is not in the same coordinate location with the new coordinate location ($X_2'$, $Y_2'$) in the defect image pattern 1001, then a coordinate deviation calibration must be performed to calibrate to new coordinate location ($X_2'$, $Y_2'$). For example: Coordinate deviation calibration sponsor manually marks the defect image 1001 location to the corresponding location in defect layout pattern 1111 as a new coordinate location ($X_2'$, $Y_2'$). Obviously, defect image 1001 location is converted to defect layout pattern 1111 actual defect coordinate location with the coordinate deviation calibration value as ($X_2'-X_2$, $Y_2'-Y_2$) as shown in FIG. 6A lower half. Collect a certain amount of coordinate deviation calibration data. For example: Collect at least 51 coordinate deviation calibration data. As shown in step 250, data processing unit 21 will process the data in a table and performs statistical analysis. Then, the system can generate an Average Coordinate Precision Value and Coordinate Precision Standard Deviation for X-axis and Y-axis as the coordinate calibration factor as shown in FIG. 6D. In a better practice example: If data processing unit 21 with enough memory capacity and fast processing speed, then user can choose to do match for each defect layout pattern 1111 and each defect image 1101 of image file 1001. For example: Match 10000 defect images 1101 and get an even more accurate statistical data as the coordinate deviation calibration data or calibration factor data. The present invention does not put a limit on this. Finally, retrieve the accurate statistical data as the coordinate deviation calibration data or calibration factor data as shown in step 260. The Average Coordinate Precision Value and Coordinate Precision Standard Deviation can be introduced into the coordinate conversion system. For the defect image 1101 in the defect layout pattern 1111 through coordinate conversion, a coordinate deviation calibration is performed. The coordinate deviation value is ($X_2'-X_2$, $Y_2'-Y_2$) or Average Coordinate Precision Value and Coordinate Precision Standard Deviation for X-axis and Y-axis after processing statistical analysis of coordinate deviation value ($X_2'-X_2$, $Y_2'-Y_2$). Finally, the file 1150 after correcting the coordinate deviation is stored in the memory unit 23.

Besides, the present invention can select another calibration method to produce the accurate coordinate deviation calibration data. As shown in step 2420, data processing unit 21 retrieve the first transistor device defect layout pattern 1111. Then, data processing unit 21 retrieves defect image 1101 of image file 1001 that has the transistor device pattern. Display both the defect layout pattern 1111 and defect image 1101 of image file 1001 together on the computer monitor screen 51. In a practice example, the dimension unit is already adjusted to be the same in both displayed defect layout pattern 1111 and defect image 1101 of image file 1001. (For example: Both patterns are adjusted to dimension unit such as pixel unit, μm unit, or nm unit.) Then, coordinate deviation calibration sponsor processes calibration through a Graphical User Interface (GUI). Coordinate deviation calibration sponsor moves computer mouse cursor on monitor screen 51 to new coordinate location ($X_2'$, $Y_2'$) based on ⌈the defect image 1001 location relative to circuit layout pattern 1102⌋ and ⌈the corresponding location in defect layout pattern 1111 with same circuit layout pattern⌋ as shown in FIG. 6B upper half. For example: Coordinate deviation calibration sponsor manually moves cursor to ⌈defect image 1001 location mapped to the corresponding location in defect layout pattern 1111⌋ and marks as a new coordinate location ($X_2'$, $Y_2'$). Then, defect image 1101 defect coordinate ($X_1$, $Y_1$) is converted to design layout pattern 1101 defect coordinate ($X_2$, $Y_2$). If defect image 1101 in the defect layout pattern 1111 on converted defect coordinate location ($X_2$, $Y_2$) is not in the same coordinate location with the new coordinate location ($X_2'$, $Y_2'$) in the defect image pattern 1001 and the defect layout pattern 1111, then coordinate deviation calibration value can be obtained through clicking mouse to the new coordinate location ($X_2'$, $Y_2'$) in GUI. The coordinate deviation calibration data is ($X_2'$-$X_2$, $Y_2'$-$Y_2$) as shown in FIG. 6B lower half. After that, follow the procedures from step 250 to step 260 and performs a certain amount of coordinate deviation calibration as same as in FIG. 6A. The system can generate an Average Coordinate Precision Value and Coordinate Precision Standard Deviation for X-axis and Y-axis as the coordinate calibration factor. The Average Coordinate Precision Value and Coordinate Precision Standard Deviation can be introduced into the coordinate conversion system. It is same as described in above item.

In addition, the present invention can select another calibration method to create accurate coordinate deviation calibration data. As shown in step 2430, data processing unit 21 retrieve the first transistor device defect layout pattern 1111. Then, data processing unit 21 retrieves defect image 1101 of image file 1001 that has the transistor device pattern. Display both the defect layout pattern 1111 and defect image 1101 of image file 1001 together on the computer monitor screen 51. In a practice example, the dimension unit is already adjusted to be the same in both displayed defect layout pattern 1111 and defect image 1101 of image file 1001. (For example: Both patterns are adjusted to dimension unit such as pixel unit, μm unit, or nm unit.) Then, data processing unit 21 perform auto pattern match between ⌈circuit layout pattern 1113 in defect layout pattern 1111⌋ and ⌈circuit 1102 pattern in defect image 1101 of image file 1001⌋ as shown in FIG. 6C central Figure. Coordinate deviation calibration sponsor can mark new coordinate location (X2', Y2') where the defect image 1001 location ($X_1$, $Y_1$) is mapped to the corresponding location in defect layout pattern 1111. Since defect image 1101 defect coordinate ($X_1$, $Y_1$) is converted to design layout pattern 1101 defect coordinate ($X_2$, $Y_2$). If defect image 1101 in the defect layout pattern 1111 on converted defect coordinate location ($X_2$, $Y_2$) is not in the same coordinate location with the new coordinate location ($X_2'$, $Y_2'$) in the defect image pattern 1001 and the defect layout pattern 1111, then coordinate deviation calibration value can be obtained through system coordinate deviation calibration. The coordinate deviation calibration data is ($X_2'$-$X_2$, $Y_2'$-$Y_2$) as shown in FIG. 6C lower half. After that, follow the procedures from step 250 to step 270 and performs a certain amount of coordinate deviation calibration as same as in FIG. 6A. The system can generate an Average Coordinate Precision Value and Coordinate Precision Standard Deviation for X-axis and Y-axis as the coordinate calibration factor. The Average Coordinate Precision Value and Coordinate Precision Standard Deviation can be introduced into the coordinate conversion system. It is same as described in above item.

The method described in FIGS. 6A, 6B, and 6C explains that the present invention can offer multiple practice methods to provide accurate coordinate deviation calibration data. No matter which method is chosen, i.e. from any method in FIG. 6A, 6B, or 6C, the system can generate coordinate deviation calibration data or an accurate statistical data for coordinate deviation calibration or deviation calibration factor by processing step 250 to step 260.

After completion of step 200, the present inventions ⌈Smart System⌋ already obtains the defect image 1101 to design layout pattern 1110 coordinate conversion with coordinate deviation calibration. The coordinate deviation calibration data is ($X_2'$-$X_2$, $Y_2'$-$Y_2$) or statistical analysis value of coordinate deviation calibration data (that is the above mentioned coordinate calibration factor). For example: Average Coordinate Precision Value and Coordinate Precision Standard Deviation for X-axis and Y-axis. Next, defect image pattern 1101 is created in design layout pattern 1110 file. It is used to judge whether this defect image 1101 is an open circuit failure killer defect or a short circuit failure killer defect. The defect image 1101 or its contour is image pattern. Design layout pattern 1110 is GDS or OASIS format. Since there is no defect image in design layout pattern 1110, it is impossible to execute short circuit failure or open circuit failure analysis with the defect image 1101. Since defect image 1101 contour pattern is a possible irregular shape pattern. The present invention provides a ⌈clip defect contour method⌋ for the defect image 1101 to obtain defect size dimension and area of defect image 1101. It is used to be the foundation to judge a short circuit failure killer defect or open circuit failure killer defect.

As shown in step 140 and FIG. 7A to FIG. 7D, it is the drawing chart of the present invention from clip defect contour of a defect image to overlap a design layout pattern on the defect coordinate location. First, ⌈Smart System⌋ data processing unit 21 retrieve a defect image 1101 contour dimension of a image file 1001 from the defect text and image data file 1130. The defect dimension data includes maximum dimension in X-axis and maximum dimension in Y-axis. Based on the clipped contour dimension of the defect image 1101, data processing unit 21 creates a polygon defect image 1103 pattern which has the identical X-axis and Y-axis dimension of a defect contour. For example: If the maximum X-axis dimension is 0.1 μm and the maximum Y-axis dimension is 0.08 μm, then the polygon defect image 1103 pattern area is 0.008 pmt as shown in FIG. 7A lower arrow. Superpose or map the clipped contour pattern of defect image 1101 or polygon defect pattern 1103 to the defect layout pattern 1111 location ($X_2'$, $Y_2'$) under one of the coordinate calibration, i.e. coordinate after coordinate deviation calibration, or coordinate deviation calibration value ($X_2'$-$X_2$, $Y_2'$-$Y_2$), or statistical value of coordinate deviation calibration data. The system can judge whether dimension of the clipped contour pattern of defect image 1101 or polygon defect pattern 1103 will create killer defect impact on the short circuit failure or open circuit failure. As shown on FIG. 7B right hand side defect layout pattern 1111, it is a kind of short circuit failure killer defect, i.e. two circuit layout patterns 1113 connected together by a defect image 1103. As shown on FIG. 7B left hand side defect layout pattern 1111, it is a kind of open circuit failure killer defect, i.e. one broken circuit layout pattern 1113 intercepted by a defect image 1103. Then, step 150 or step 160 can be used to judge whether there is open circuit failure killer defect or short circuit failure killer defect in defect image 1001 or defect layout pattern 1111.

Figure 7B:
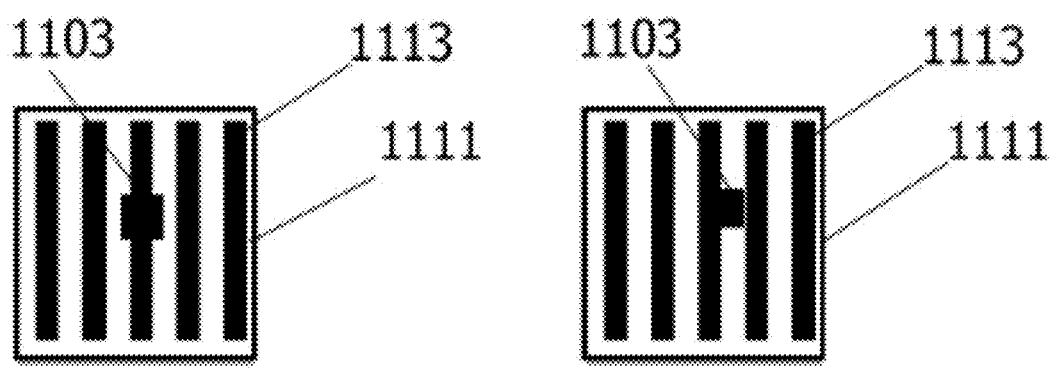
Figure 7C:
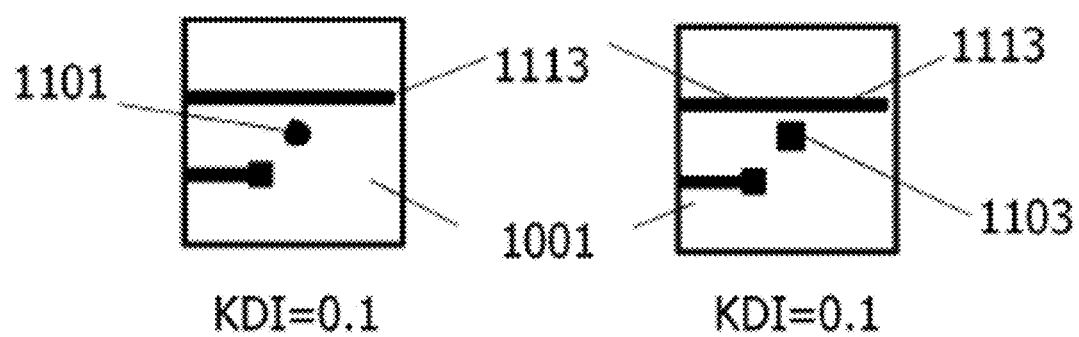

Next, perform Critical Area Analysis (CAA) method on step 150. When data processing unit 21 already overlaps the clipped polygon defect image 1103 area to the mapped defect layout pattern 1111 of defect image 1101 coordinate. Now, the system can utilize CAA method to analyze critical area for the clipped polygon defect image 1103 area and the mapped defect layout pattern 1111. Then, the system can judge short circuit failure or open circuit failure probability of a defect. This probability value for a defect is a Killer Defect Index (KDI), i.e. a CAA value. For example: The system overlaps every clipped polygon defect image 1101 to the mapped defect layout pattern 1111. Then, system judges whether there is a short circuit failure or open circuit failure on the circuit layout 1113. At same time, the system can judge the Killer Defect Index value from the analyzed critical area value based on the polygon defect image 1103 pattern and circuit layout 1113. Please see killer defect judgment in FIG. 7C (i.e. defect pattern 6 in FIG. 3). When dimension of the clipped defect image 1101 pattern or the clipped polygon defect image 1103 pattern is much below the dimension of circuit layout 1113 width or spacing between two circuit layout 1113, the defect will not cause either open circuit failure or short circuit failure. For example: Dimension of a polygon defect image 1103 pattern is 0.008 μm. Dimension of a circuit layout 1113 width is 0.1 μm. Dimension for the spacing between two circuit layout 1113 is 0.1 μm. No matter it is a defect image 1101 pattern or a clipped polygon defect image 1103 pattern, the defect will not cause either open circuit failure or short circuit failure. The judged critical area is 0. So, Killer Defect Index is 0, i.e. KDI=0. Dimension of a polygon defect image 1103 pattern (ex. 0.11 μm) is equal or close to dimension of circuit layout 1113 width (ex. 0.1 μm). It is possible to cause short circuit failure or open circuit failure. Since the probability that a defect image 1101 pattern or polygon defect image 1103 will fall on circuit layout 1113 of the defect layout pattern 1111 is related to the circuit layout 1113 area ratio of the defect layout pattern 1111. As shown in FIG. 7C. When the critical area of circuit layout occupies only 1/10 of the total coordinate deviation region area inside a defect layout pattern 1111, then the judged killer defect area is 0.1. So, Killer Defect Index is 0.1, i.e. KDI=0.1. That is to say. The short circuit failure or open circuit failure probability of the circuit layout 1113 in defect layout pattern 1111 (seen in FIG. 7C) caused by a polygon defect image 1103 pattern is 0.1.

Figure 7D:
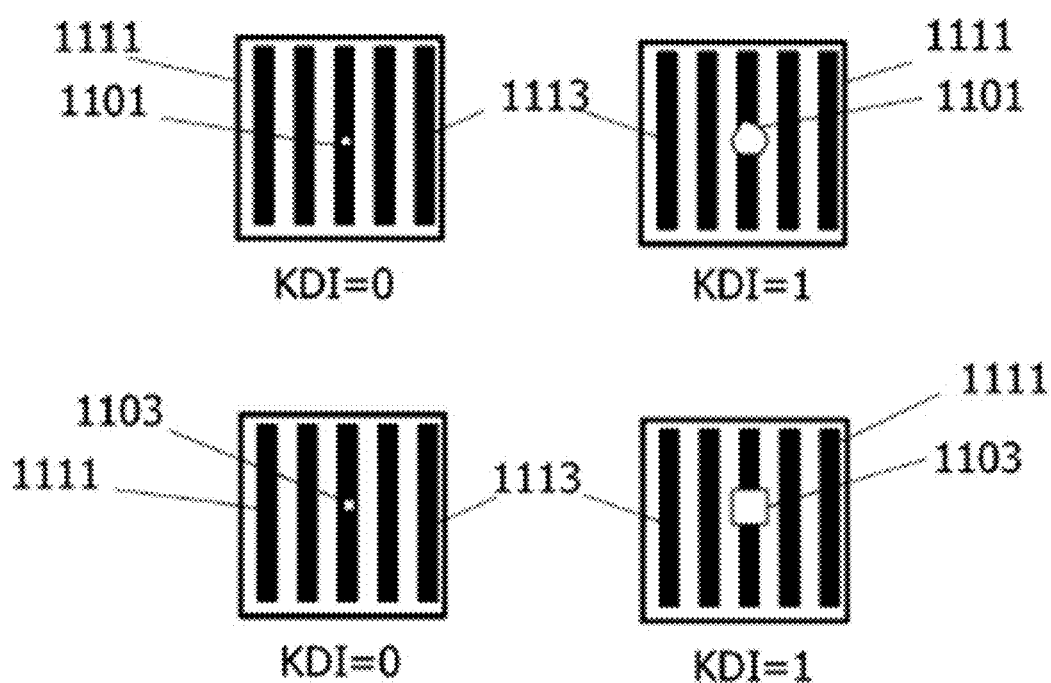
Figure 7E:
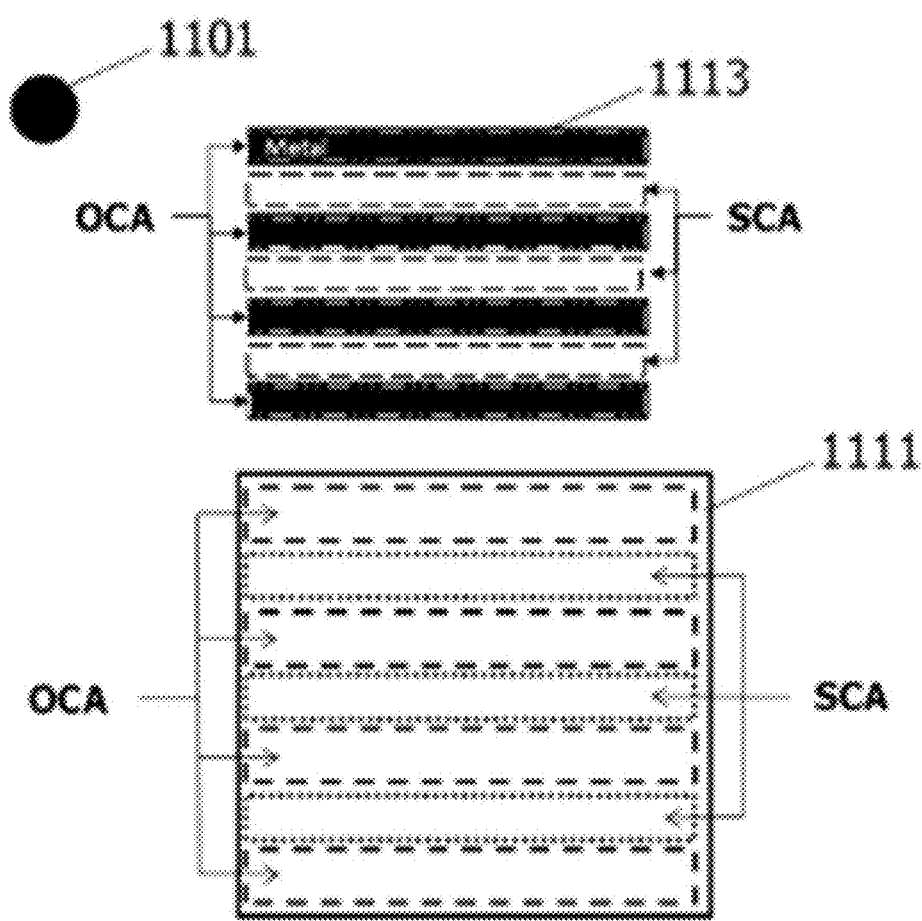

FIG. 7D is used to describe the implementation of ⌈how to analyze and judge Killer Defect Index⌋. As shown in FIG. 7D, Critical Area Analysis method used in the present invention is often used in ⌈Design For Manufacturing⌋ to simulate wafer yield. It analyzes the critical area of an IC design layout with artificial defect data. The artificial defect data is generated with Monte-Carlo method or similar method with random defect generation. It is not a real defect data output from a defect inspection data. Those randomly generated defect data are spread randomly over different coordinate location in a full chip design layout. The purpose is to simulate the artificial defect that will cause possible yield loss and get the possible wafer yield with this kind of defect distribution assumption. CAA in ⌈Design For Manufacturing⌋ wafer yield simulation is not a real wafer defect analysis. CAA used in the present invention is to analyze defect data from defect inspection tool. The clipped defect image 1101 and its defect size dimension, area is converted to the corresponding coordinate in the defect layout pattern 1111. Then, calculate the critical area based on the defect image 1101, defect size dimension, area, and the defect layout pattern 1111 information within a coordinate deviation region area. (As described before, defect can be in any coordinate location inside this coordinate deviation region area because the deviation from the defect inspection tool's stage movement motor precision error. The Killer defect Index (KDI) is equal to ⌈The critical area from CAA analysis divided by the total coordinate deviation region area⌋. This KDI value represents the probability of open circuit failure or short circuit failure for a defect and the defect's mapped defect layout pattern. As shown in the drawing Figure in FIG. 7D left side pattern, defect image 1101 pattern or clipped polygon defect image 1103 pattern does not cause open circuit failure or short circuit failure. This defect is not a killer defect. The critical area is judged as 0. KDI is used for defect sample selection. When KDI is equal to 0 or very close to 0, that represents the open circuit failure or short circuit failure probability of this defect is very low. As a result, this defect is not selected in defect sample selection. As shown in the drawing Figure in FIG. 7D right side pattern, the dimension of a defect image 1101 or a polygon defect image 1103 pattern (ex. 0.11 μm) is equal or close to dimension of circuit layout 1113 width (ex. 0.1 μm). It is possible to cause short circuit failure or open circuit failure. The analyzed open circuit failure critical area is named as Open Critical Area (OCA). The analyzed short circuit failure critical area is named as Short Critical Area (SCA). It is shown as the area defined by dashed line in FIG. 7E. Because Open Critical Area and Short Critical Area will cause either systematic defect and random defect failure. So, Open Critical Area and Short Critical Area must be added together (not counting overlapped region twice). Then, this (OCA+SCA) is divided by total coordinate deviation region area. (As described, the coordinate deviation after defect scan and inspection is −0.5 μm~+0.5 μm for an optical defect inspection tool. Total coordinate deviation region area is 1 μm×1 μm for the defect layout pattern 1111) For example: The conductor width in a defect layout pattern 1111 is 50 nm. The spacing between two different conductors is 30 nm. Dimension of a defect image 1101 pattern is 60 nm. Obviously, this 60 nm dimension of defect image 1101 is a killer defect no matter what coordinate location it is inside the defect layout pattern 1111. When Open Critical Area (OCA) is equal to 0.7 μm$^2$ and Short Critical Area (SCA) is equal to 0.3 μm$^2$ Assume there is no overlap of OCA and SCA. The defect sample selection indicator KDI is equal to 1 from calculation ⌈0.7 μm$^2$+0.3 μm$^2$/1 μm×1 μ=1⌋. When defect sample selection indication KDI is equal to 1 or very close to 1, it represents the open circuit failure or short circuit failure probability of the defect is very high. This defect is selected as high probability. In the end, the defect sample probability of the plurality polygon defect image 1101 pattern will be recorded into memory unit 23.

Besides, the present invention can also choose step 160 to judge whether a defect will cause open circuit failure or short circuit failure probability or not. Clip a defect image 1101 of image file 1001 (this image file 1001 is same as described at prior section. Include defect contour image 1101 and its coordinate location relative to surrounding circuit pattern) directly. Then, overlap this clipped defect image to the mapped defect layout pattern 1111 (as shown in FIG. 6C central drawing Figure). After that, the system can judge whether this defect image 1101 is an open circuit failure killer defect or a short circuit failure killer defect. For example: Data processing unit 21 clips directly an original defect image 1101 contour of image file 1001 and overlaps this defect image contour to the mapped (relative to defect image 1101) defect layout pattern 1111. Now, either data processing unit 21 or engineer can perform pattern match based on the original defect image 1101 contour and defect layout pattern. Judge whether this original defect image contour is an open circuit failure type failure defect or short circuit failure type failure defect. If the result is either an open circuit failure or short circuit failure, then it is judged as a killer defect. The Killer Defect Index is 1. If the result is neither an open circuit failure nor short circuit failure, then it is judged as a non-killer defect. The Killer Defect Index is 0. Last step, record Killer Defect Index (KDI) results of those defects image 1101 into memory unit 23. Since this practice example is to clip directly an original defect image 1101 contour of image file 1001 and overlap this defect image contour to the mapped (relative to defect image 1101) defect layout pattern 1111. Obviously, the system can judge open circuit failure result, short circuit failure result, and decide KDI value of defect image 1101 directly. A better practice example in process step 160 is shown as follows. First, process step in FIG. 4 or FIG. 5. That means obtaining correct coordinate of original defect image 1101 contour and converting accurately to the mapped defect layout pattern 1111 coordinate (relative to defect image 1101 coordinate) are very critical. Besides, another better practice example in process step 160 is shown as follows. Defect image 1101 of image file 1101 is an image file generated from the Scanning Electron Microscope (SEM) defect scan result. Because the high precision level from SEM defect scan, the coordinate in the original defect image 1101 of a SEM image file is the actual defect location. So, KDI value of the defect image 1101 can be known directly. That is why the KDI value is either 1 or 0 under this practice example. The purpose to overlap this original defect image 1101 contour to the mapped defect layout pattern 1111 (relative to defect image 1101) is to know exactly what defect layout pattern 1111 coordinate location the defect image 1101 falls on. So, design house can modify design layout based the defect layout pattern that would create failure killer defect.

Based on above description: When doing killer defect index (KDI) analysis or Critical Area Analysis (CAA) of defect image 1101, ⌈Smart System⌋ of the present invention can choose original defect image 1101 contour of image file 1001 and overlap this contour to the mapping defect layout pattern 1111 of defect image 1101. It is shown in step 150. About this, it is not limited by the present invention.

According to description before, Fab team processes defect scan and inspection of wafer 10 to get defect image 1101. In order to achieve high speed scanning purpose, Fab normally selects microscope tool, E-beam inspection tool, optical inspection tool, defect scan tool, or camera etc. to obtain defect inspection data (ex. defect size, width, coordinate, or contour, etc.) of the wafer. When using the optical inspection tool to scan wafer and create defect image 1101, there is unclear defect image due to insufficient resolution ability from the optical inspection tool. That is because the defect scan resolution is related to the optical inspection tool's lens and wavelength. If the pattern to be scanned on wafer 10 becomes smaller enough, then the resolution of the optical inspection tool cannot inspect and compare the pattern of the wafer 10 clearly. A vague defect image 1101 is generated under insufficient resolution issue. For example, when defect image 1101 is a defocus image, the rough edge of the defect image 1101 is hard to be correctly judged in the clip of defect image 1101 contour. That will make the defect image 1101 from defect scan to be larger than its actual defect image. This incorrect dimension of defect image 1101 will generate incorrect killer defect and non-killer defect classification due to this misjudgment. Besides, every optical inspection tool has its own resolution limit. If the resolution is insufficient in the defect inspection of smaller geometry pattern, that means the minimum dimension unit used in defect scan and defect judgment of an optical inspection tool is larger than minimum geometry dimension of the layout pattern. Under such circumstance, defect image 1101 pattern is a defocus image. This will result in killer defect misjudgment. For example: The minimum resolution unit is 50 nm in an optical inspection tool. An actual X-axis defect size dimension and Y-axis defect size dimension are 35 nm. So, the minimum dimension to be judged by this optical inspection tool is 50 nm. The original inspection defect report in defect text and image data file 1130 is recorded in the multiplication of minimum dimension unit for the scanned and detected defect image 1101 dimension and area. This defect image 1101 size dimension and area are much larger the actual defect image 1101 dimension and area using a 1 or 2 nm resolution level SEM tool to obtain clear defect image 1101. Obviously, the incorrectness of original defect size will impact Killer Defect Index analysis result. The non-killer defect or negligible risk killer defect will be judged as a high risk killer defect incorrectly. For example: The actual defect image 1101 size and area is not a short circuit failure or open circuit failure defect. Due to minimum dimension unit of insufficient resolution and the defocus defect image result, the area of plurality defect image 1101 in the defect report file results in too many high risk killer defects. That will lower the chance of selecting real open circuit failure defect sample or short circuit failure defect sample. This will result in slower yield improvement time and increase cost. Very clearly, this defect size of the defect image 1101 comes from the original defect inspection report file that is generated from the defect inspection tool with insufficient minimum dimension resolution problem. So, the incorrect defect size must be calibrated to approach real defect size dimension. Then the system can make correct defect classification judgment. So, the success rate of selecting open circuit failure defect or short circuit failure defect can be raised.

Figure 8A:
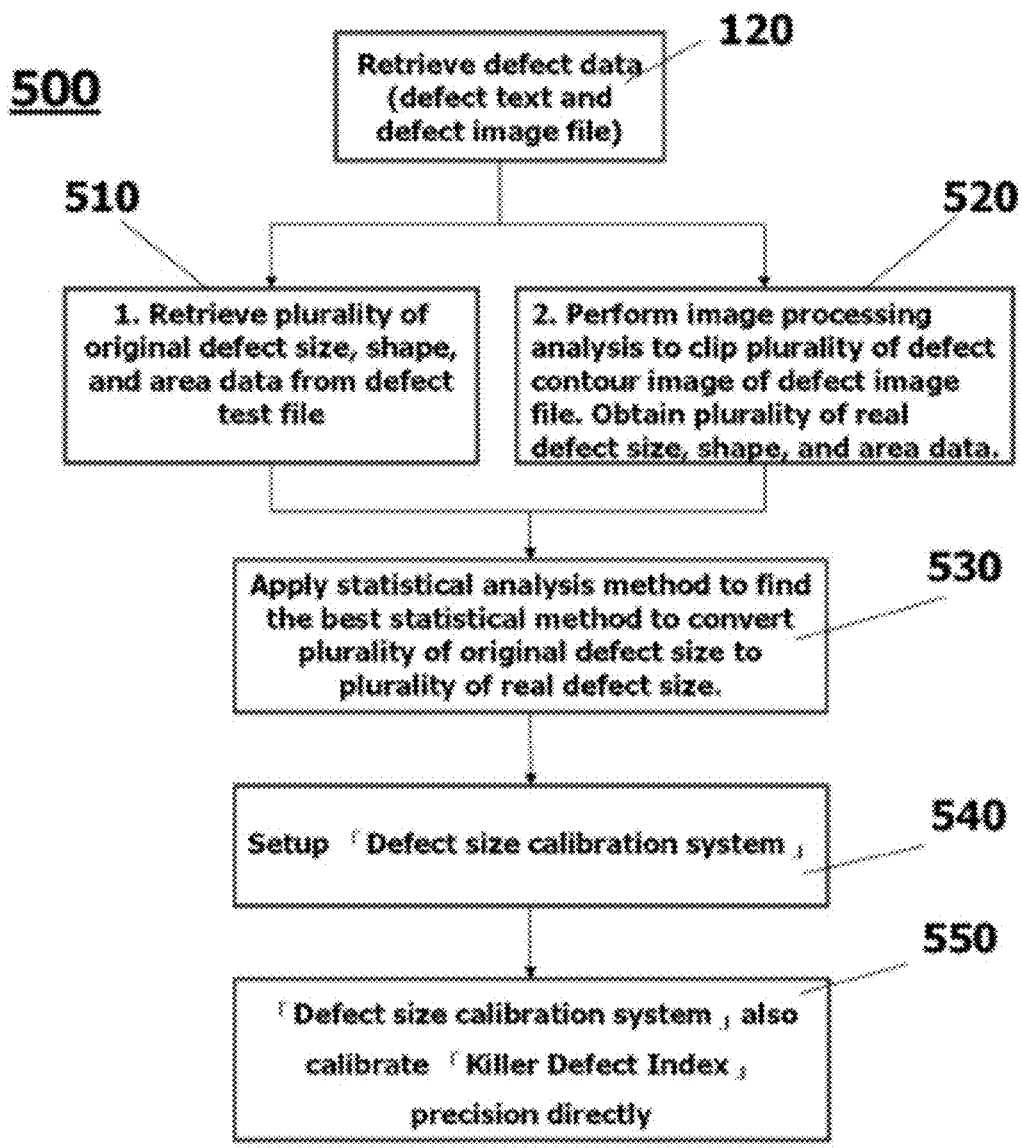
FIGS. 8A and 8B are the Setup defect size, defect area calibration system flowchart for the present invention "Smart System".
Figures 8B, 8C:
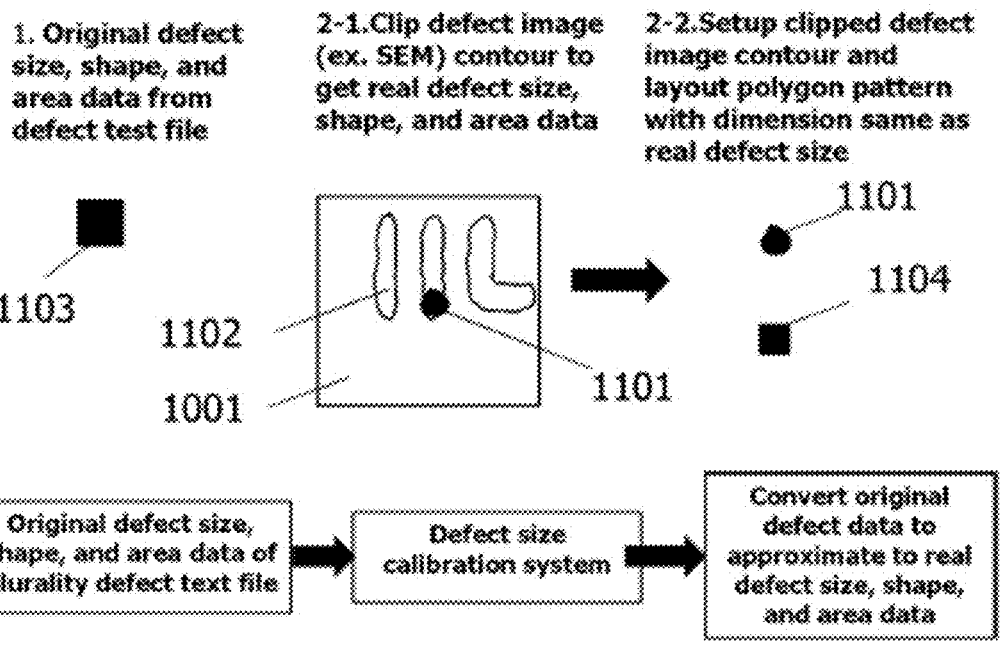
FIG. 8C is the "Original defect size conversion to final defect size table through high resolution defect image calibration" for the present invention "Smart System".

In order to solve the defocus problem suffered from the wafer 10 defect inspection result of optical inspection tool, the present invention provides a defect size calibration method to calibrate defect size and area of defect image 1101. It is shown in FIG. 8A step 500. FIG. 8A is the ⌈Setup defect size and area calibration system⌋ process flowchart of the present invention. Precise defect size calibration is the only way to Critical Area Analysis (CAA) and Killer Defect Index (KDI) precision calibration. Left side in FIG. 8B is ⌈Data processing unit 21 retrieves original defect size, area of defect inspection report from the defect text and image data file 1130⌋. Then, data processing unit clips defect contour of higher resolution defect image file from the defect text and image data file 1130. In the better practice example, higher resolution defect image file means the defect size and area from SEM image file. After that, use the higher resolution defect size and area result from SEM image file to calibrate the original defect contour size and convert to polygon defect pattern. In FIG. 8C, the table shows that the original defect size on the left side is converted to approximate to actual defect contour size through the higher resolution defect image file calibration. Detail description is explained as below.

As shown in FIG. 8A, it is a Critical Area Analysis and Killer Defect Index Calibration flowchart 500 of the present invention. It begins with data processing unit 21 to retrieve defect text and image data file 1130. First, it is shown in step 120. Data processing unit 21 retrieves original defect data (including text file and defect image file) from defect text and image data file 1130. Next, it is shown in step 510. Data processing unit 21 retrieves original defect size in X-axis and Y-axis, and defect area of polygon defect image 1103 from defect text and image data file 1130. When the resolution of an optical inspection tool is not good enough for the defect scan, it will generate incorrect and larger defect size than real defect size. For example: Resolution of an optical inspection tool is 50 nm. The minimum dimension from defect inspection report is 50 nm. Even though the original defect size is less than 50 nm, the defect report from an optical inspection tool is in multiple times of 50 nm to display. So, there is a deviation between the minimum dimension detected in an optical inspection tool and the minimum dimension detected in a better resolution SEM tool (ex. SEM resolution is 2 nm). For example: It is shown in FIG. 8C. The original defect size for 3rd defect image 1101 is 50 nm in X-axis and 50 nm in Y-axis. The original defect size for 4th defect image 1101 is 150 nm in X-axis and 150 nm in Y-axis. The Killer Defect Index for 3rd defect image 1101 is 0.4. The Killer Defect Index for 4th defect image 1101 is 1. Then, it is shown in step 520. Data processing unit 21 selects high resolution defect image 1101 from memory unit 23. Data processing unit 21 clips defect image contour defect size and defect contour area of defect image 1101. For example: Use the SEM defect image with 3 nm resolution. The system can analyze that the SEM defect size for 3rd defect image 1101 is 35 nm in X-axis and 35 nm in Y-axis. The system can analyze that the SEM defect size for 4th defect image 1101 is 100 nm in X-axis and 120 nm in Y-axis. After defect size calibration for this practice example, more accurate KDI value can be obtained with precision calibration. For example: It is shown in FIG. 8C. The real Killer Defect Index after defect size calibration for 3rd defect image 1101 is 0.1. The real Killer Defect Index after defect size calibration for 4th defect image 1101 is 0.55. Next, it is shown in step 530. Apply statistical method to find the calibration factor between plurality original defect size, defect area data group, and plurality high resolution defect image contour size, defect contour area data group. Find the best calibration factor from the best statistical method. It is shown in step 540. Setup a defect size calibration system and metrology uncertainty analysis with statistical method. Convert the original defect size data, which is generated from an in-line defect inspection of an optical inspection tool, to approximate real defect size data. As to the real defect size conversion procedure, it will be described in next section in detail. Besides, one important thing is why not use better resolution SEM tool to do defect scan and inspection directly. Instead, process defect inspection in a more complex calibration procedure. That is because the defect inspection is scanned after finishing wafer 10 process step. Although SEM tool resolution is good enough, SEM tool operation is much more complex. SEM tool defect inspection throughput can only handle 1% of current original defect data volume. In order to speed up process time, it is impossible to use SEM to scan all the wafers. Fab team has to use optical inspection tool. Without doing defect size calibration, it will result in incorrect Killer Defect Index judgment for optical inspection tool. This will not just impact defect classification, but also impact wafer yield improvement. Increase Fab cost. It is shown in step 550. Processing defect size calibration is same as raising Killer Defect Index precision level from Critical Area Analysis and judging killer defect classification precisely. In this practice example, selecting number of better resolution SEM images to do statistical analysis is not limited by the present invention. Furthermore, Fab team can choose SEM tool or other advanced defect inspection tool to do defect scan and inspection in advanced technology Fab process if SEM tool defect scan speed is improved fast enough or other advanced defect inspection tool can provide fast defect inspection. Under such circumstance, the accurate KDI value of a defect can be decided as described in step 160. Even though process shrink continues to small geometry to be equal or smaller than SEM resolution, the above defect size calibration system and method is still applied to any new defect inspection tool and camera tool. For example: Design layout pattern minimum geometry dimension is 1, 2 nm, or lower than 1 nm. Then, layout pattern minimum geometry dimension is equal to or smaller than SEM resolution. It is not limited by the present invention.

Please refer to FIG. 8C. Incorrect original defect size data is generated from Fab in-line defect inspection tool. The defect size calibration process flow is to execute defect size calibration and metrology uncertainty analysis through this ⌈Defect Size Calibration System⌋ and convert original defect size data to approximate actual defect size data. The setup of ⌈Defect Size Calibration System⌋ is shown in FIG. 8A, 8B. It is shown in step 540. For every defect image 1101, data processing unit 21 collect the original defect size before defect size calibration and real defect size after defect size calibration and perform statistical analysis to build up a statistical model. The defect size X-axis and Y-axis data for defect image 1101 will be corrected based on this statistical model. For example: Use the defect image 1101 with KDI value 1 to do defect size calibration. The statistical model for the defect size calibration is built up. A defect size calibration factor is defined to be equal to 0.85. For example: In FIG. 8C, the original defect size for 4th defect image 1101 is 150 nm in X-axis and 150 nm in Y-axis. Then, do defect size calibration in step 540. Need to multiply defect size calibration factor 0.85 with original defect size in defect image 1101 or polygon defect image 1103. Then, defect size after defect size calibration will be 130 nm in X-axis and 130 nm in Y-axis for defect image 1104 or polygon defect image 1105 after calibration. Or use the defect image 1101 with KDI value 0.5 to do defect size calibration. The statistical model for the defect size calibration is built up. A defect size calibration factor is defined to be equal to 0.9. The defect size conversion process is same as described above. It is not repeated again. Then, it is shown as in step 550. Data processing unit 21 extract the calibration factor from defect size calibration statistical model, execute defect size calibration automatically for every defect image 1101, and overlap to the mapped design layout pattern 1110 relative to defect image 1101 coordinate. Finally, data processing unit 21 or engineer can get more accurate Killer Defect Index for every defect image 1101 with new calibration.

After the calibration procedure 8A, 8B, and 8C, user can get more precise real defect size data. Since the killer defect index is proportional to the defect size. Incorrect defect size would cause defect count of higher killer defect index higher than it should be. That makes the selection of short failure defect or open failure defect even harder. Eventually, that increase time to improve wafer yield and cost. In FIG. 8C, the table 1160 shows the defect size data before and after defect size calibration. Obviously, the best result will be the calibration with SEM defect inspection data. Next will be to calibrate with a defect size calibration factor. When the calibration sample count is higher in determining the defect size calibration factor, the statistical defect size calibration factor will be closer to the SEM defect inspection data.

Figure 11A:
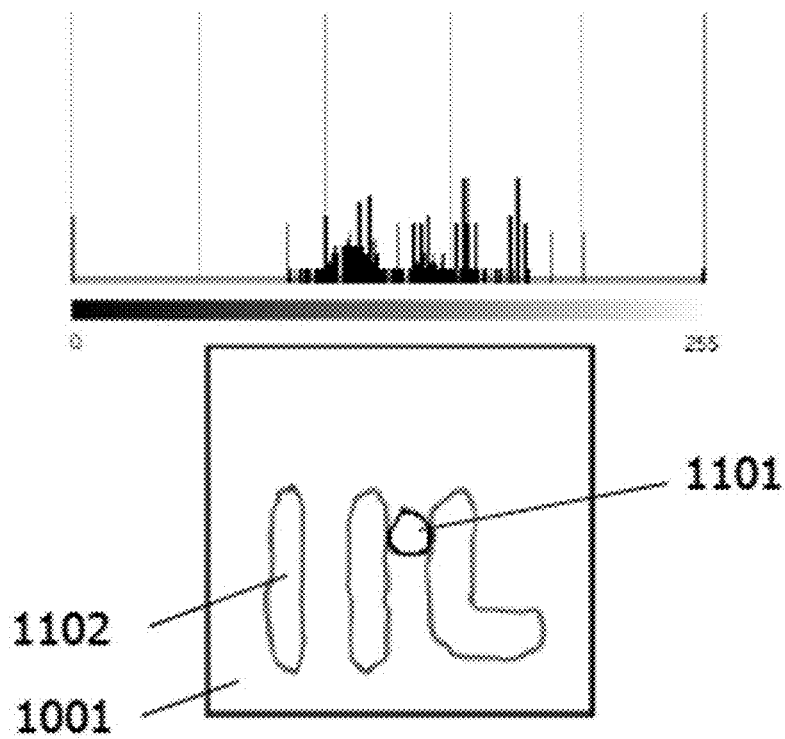
FIGS. 11A to 11G are the Defect pattern library for the present invention "Smart Semiconductor Defect Calibration, Classification, and Sampling System and The Method Thereof".

Please see FIG. 2. After processing defect open circuit failure or short circuit failure type analysis in step 150 and step 160 and calibration in step 500, the present invention can further perform defect classification for defect image 1101. As shown in step 170, the defect can be classified as Non-killer defect or Killer defect based on the defect calibration result in previous step. For example: The result by implementing step 150 is to classify defect based on KDI value, defect signal parameters, and whether a defect matches defect pattern in defect pattern library database and high frequent failure defect library. Defect signal parameters is the intensity or brightness value of every pixel data in two dimensional vector analysis obtained from image processing analysis of the defect image 1101 of image file 1001. It is shown in FIG. 11A. The horizontal axis is the intensity. The vertical axis is in pixel count unit. Also, contrast value is the relative intensity ratio between defect pattern and its surrounding background pattern using image processing analysis method. Polarity value is to imply a relative position between the defect pattern and background pattern by checking the defect pattern and its light shadow change using image processing analysis method. In step 160, it is to overlap defect contour with two different polygon patterns or one polygon pattern and check whether this defect contour is classified as a non-killer defect, or open circuit failure type killer defect, or short circuit failure type killer defect. Detail execution procedure will be described in later section.

Figure 11B:
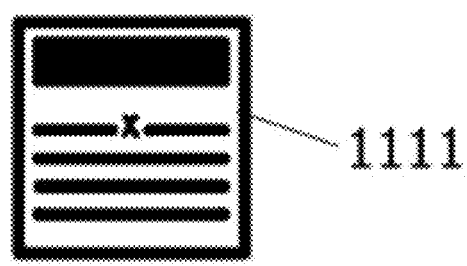
Figure 11C:
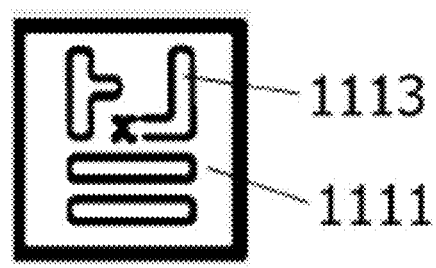
Figure 11D:
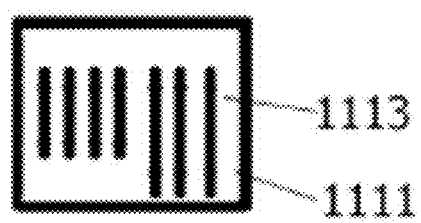

In addition, process step 180 in FIG. 2 to setup defect pattern library and frequent failure defect library. The defect pattern library source is described below. One defect pattern is layout pattern with design rule check error. For example: Spacing distance rule is 30 nm. Actual drawing layout pattern is 28 nm. This will narrow process window and result in lower wafer yield. So, it will be selected into defect pattern library as shown in FIG. 11B. Another defect pattern source is from the Design for Manufacturing (DFM) simulation analysis of a design layout 1110. If there is layout pattern showing high risk pattern from the DFM simulation analysis. Since it could narrow process window as well, it is possible to cause lower wafer yield. Further defect inspection of this layout pattern on wafer process window check is needed to verify if there is open circuit failure defect or short circuit failure defect based on the layout pattern locations on wafer. That is why it is selected into defect pattern library as shown in FIG. 11C X marker. The way to setup frequent failure defect library is to combine plurality of actual defect image 1101 data from optical inspection tool and perform pattern match method to obtain pattern group with identical or similar pattern as shown in FIG. 11D. When the circuit layout pattern is dense in a design layout, it belongs to a frequent failure defect pattern. Further defect inspection of this layout pattern on wafer process window check is needed to verify if there is open circuit failure defect or short circuit failure defect based on the frequent failure defect layout pattern locations on wafer. That is why it is selected into frequent failure defect library. User can collect systematic defect layout pattern 1111, open circuit failure type or short circuit failure type defect layout pattern found in failure analysis, layout pattern with DRC error, and [Design For Manufacturing check as weak pattern] together and setup into defect pattern library. User can also reference frequent failure defect library patent method cited in U.S. Pat. No. 8,607,169B2 of the same inventor and setup frequent failure defect library. In step 170, the system will execute pattern match (pattern match patent method reference is cited in ROC Taiwan patent no. 15346462 of the same inventor) between the defect layout pattern from defect inspection data of a defect inspection tool and those defect layout pattern in defect pattern library and frequent failure defect library. It is to find if there is identical or similar defect layout pattern for further defect analysis.

Figure 9:
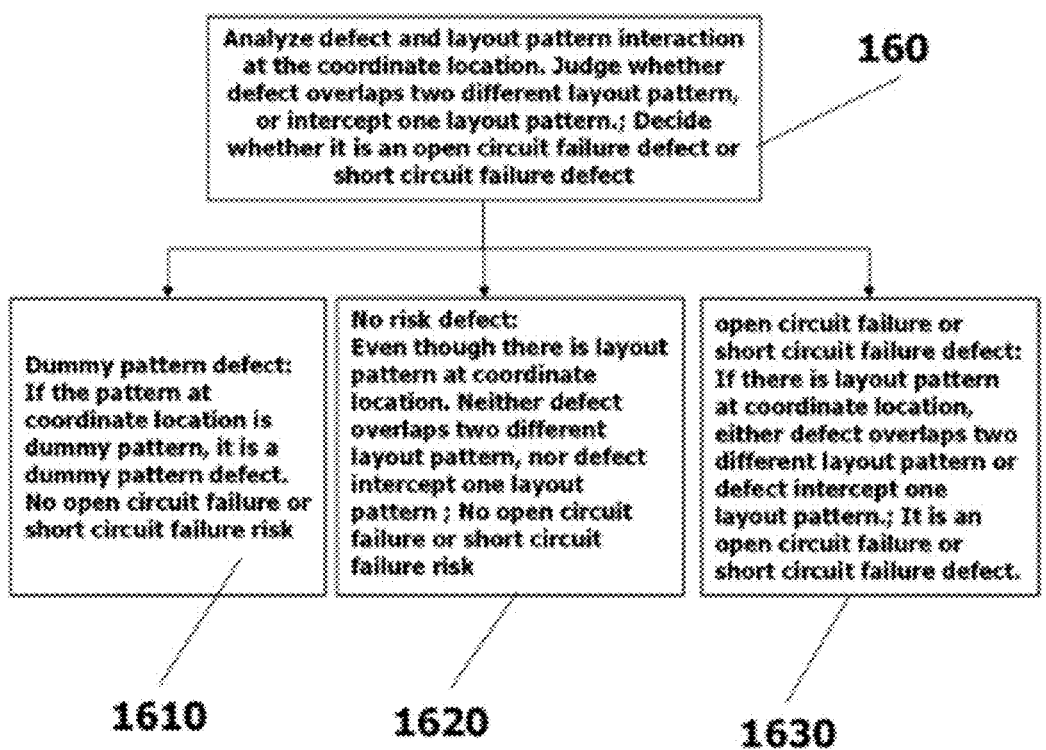
FIG. 9 is the "Execute pattern match between defect contour and polygon pattern flowchart" for the present invention "Smart System".
Figure 11E:
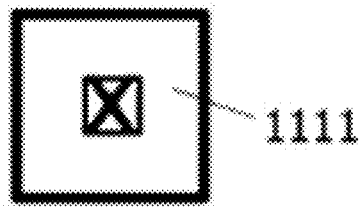
Figure 11F:
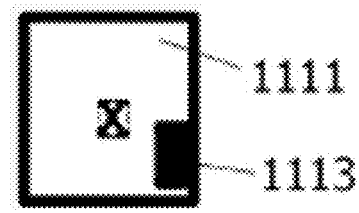

Besides, please refer to FIG. 9 [A flowchart to execute the pattern match analysis between defect contour and design layout pattern polygon]. As shown in FIG. 9, step 160 is performed to execute the pattern match analysis between defect contour and design layout pattern polygon and judge whether there is a short failure defect or open failure defect. Then, defect is classified. As shown in step 1610: If there is either no circuit pattern 1113 or dummy pattern inside the coordinate deviation region where the center of coordinate deviation region is the defect image 1101 mapped at the defect layout pattern 1111. Since there is no short failure or open failure possibility, the judgment is a dummy pattern defect. Dummy pattern defect, as shown in FIG. 11E, is categorized as a non-killer defect. Next, it is shown in step 1620. If there is circuit pattern 1113 inside the coordinate deviation region where the center of coordinate deviation region is the defect image 1101 mapped at the defect layout pattern 1111. From the pattern match analysis between defect contour and design layout pattern polygon of step 160, there is no short failure or open failure possibility. It is judged to be a nuisance defect. As shown in FIG. 11F, only a circuit layout pattern 1113 located at one side of the defect layout pattern 1111. The defect will not cause short failure or open failure in FIG. 11F. Nuisance defect, as shown in FIG. 11F, is categorized as a non-killer defect. Furthermore, it is shown in step 1630. If there is circuit pattern 1113 inside the coordinate deviation region where the center of coordinate deviation region is the defect image 1101 mapped at the defect layout pattern 1111. From the pattern match analysis between defect contour and design layout pattern polygon of step 160, there is short failure or open failure possibility. It is judged to be a short defect or open defect. As shown in FIG. 7D, short defect or open defect is categorized as a killer defect.

Figure 10:
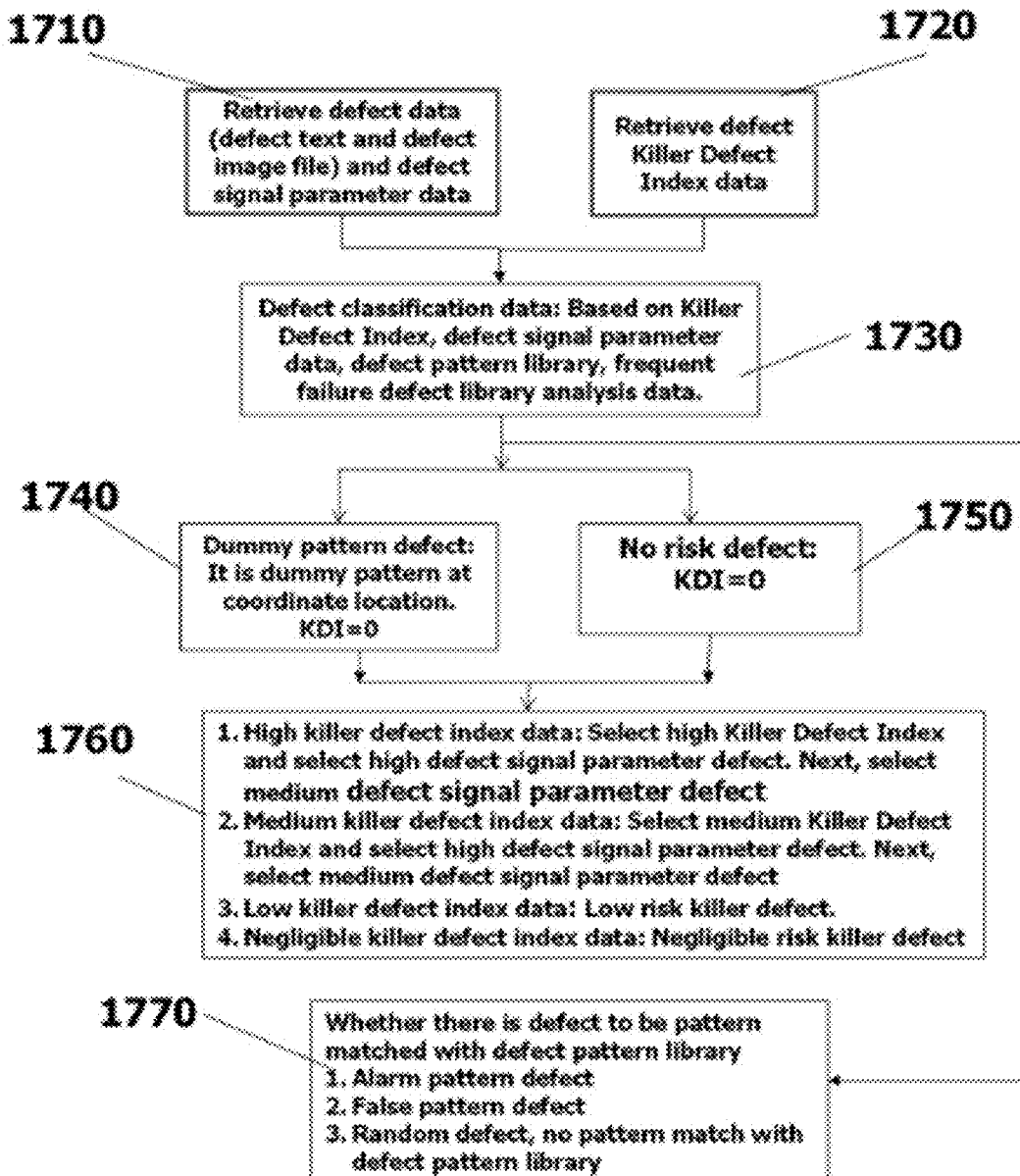
FIG. 10 is the Defect classification flowchart for the present invention "Smart System".

Please refer to FIG. 10. FIG. 10 is a defect classification flowchart of the present invention. Obtain defect signal parameter data and KDI data as shown in FIG. 10. Based on KDI value and defect signal parameter value of each defect, and whether the defect matches defect pattern in defect pattern library and frequent failure defect library, the defect is classified as Non-killer defect and Killer defect. It is a criteria used for defect sample selection. In step 1710, it is to retrieve defect data and the defect signal parameter data after image processing analysis. In step 1720, it is to retrieve KDI data that is from Critical Area Analysis method in step 150 process. In step 1730, it is to classify defect based on KDI value and defect signal parameter value of each defect, and whether the defect matches defect pattern in defect pattern library and frequent failure defect library. Please reference defect pattern library from FIG. 11A to 11G. In step 1740, it is to judge whether there is possibility of either open circuit type failure or short circuit type failure. For example: When KDI value of a defect is equal to 0. No matter how much the defect signal parameter value (as shown in FIG. 11A) is, it is judged as a dummy pattern defect (as shown in FIG. 11E). It is classified as Non-killer defect. The defect will be filtered. That means the Non-killer defect is not considered in the defect sample selection analysis. For example: There are 5000 defects in defect image file 1101. 3000 defects are Non-killer defect. During defect sample selection analysis, those 3000 Non-killer defects are not considered for defect sample selection. In step 1750, it is to judge a KDI value to be equal to 0 or close to 0. No matter how much the defect signal parameter value, it is judged as a Nuisance defect (as shown in FIG. 11F). It is classified as Non-killer defect. The defect will be filtered as well. The filter procedure is same as in step 1740. It is not repeated here.

Next, implement step 1760. First, it is to do defect classification for those defects not filtered from previous step. For example: Select high KDI value defect (ex. KDI value 0.75~1) and high defect signal parameter value as first priority defect sample selection group. After that, selected high KDI value defect (ex. KDI value 0.75~1) and medium defect signal parameter value as second priority defect sample selection group. The next is to select medium KDI value defect (ex. KDI value 0.5~0.75) and high defect signal parameter value as third priority defect sample selection group. Next, select medium KDI value defect (ex. KDI value 0.5~0.75) and medium defect signal parameter value as fourth priority defect sample selection group. To be mentioned here, all the above groups belong to high risk killer defect sample selection group. It is under high priority to monitor if any further process, equipment problem must be fixed, or layout pattern must be modified. If there is time limitation, user can select the first priority defect sample selection group to inspect the defect pattern closely. How to decide the defect sample selection group, the present invention does not put any limitation for defect sample selection.

Even more, selected low KDI value defect (ex. KDI value 0.2~0.5) and high, medium defect signal parameter value as fifth or least priority defect sample selection group. Since low KDI value defect is a low risk killer defect, it is only selected at minimum defect sample quantity or even selected occasionally. As to lowest KDI group defect (ex. KDI<0.2 and KDI>0), it is a negligible risk killer defect. Since negligible risk killer defect approximate nuisance defect, it is close to Non-killer defect. So, there is no need to do defect sample selection for negligible risk killer defect. The negligible risk killer defect will be filtered as well. Those procedures mentioned above already implements defect classification and defect sample selection group for all the defect image 1101 on wafer 10. So, those defect classification and defect sample selection result will be recorded into defect text and image data file 1130 with more result data added (as shown in FIG. 3B, more column of defect information is added). Each defect image 1101 is marked what defect classification group and defect sample selection priority group the defect belongs to. Of course, the added defect information in the defect text and image file 1130 will be updated and stored into memory unit 31.

Figure 11G:
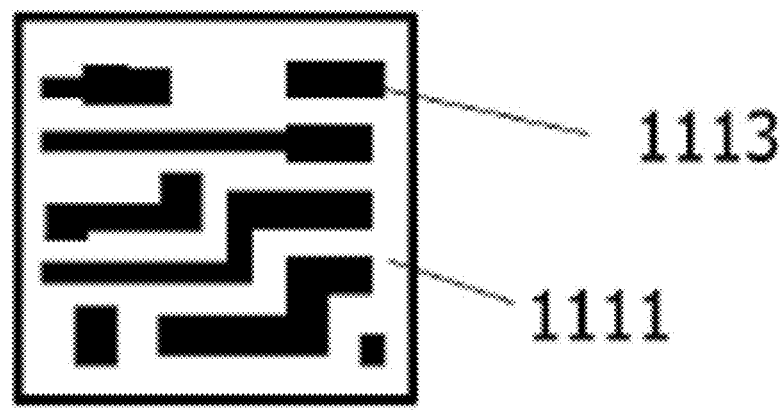

Besides, it is shown in step 1770. After finishing defect classification in step 1730 and perform pattern match with in defect pattern library and frequent failure defect library. If there is identical or similar defect pattern and the defect pattern is a alarm defect pattern, then the defect must be sampled at defect sample selection procedure. On the other hand, the defect will be filtered if the defect pattern is a false defect layout pattern (as shown in FIG. 11G).

A ⌈Smart Defect Calibration System and The Method Thereof⌋ of the present invention utilize defect coordinate calibration system and defect size calibration system to improve the Critical Area Analysis precision level for defect analysis. That raises the killer defect judgment precision level when open circuit failure or short circuit failure probability of semiconductor defect can be judged correctly. The non-killer defect will be filtered and excluded in defect sample selection procedure. Combine KDI data and defect signal parameter data to setup killer defect and its risk classification level as defect sample selection priority sequence. Comparing to traditional defect sample selection standard based on defect signal intensity and defect size dimension criteria, the present invention increases the discovery of real open circuit failure killer defect or short circuit failure killer defect in much better capability. It will shorten defect yield learning curve time and raise to higher wafer yield as well. Ramp production at earlier time will increase revenue. Wafer yield increase reduces cost.

Figure 12A:
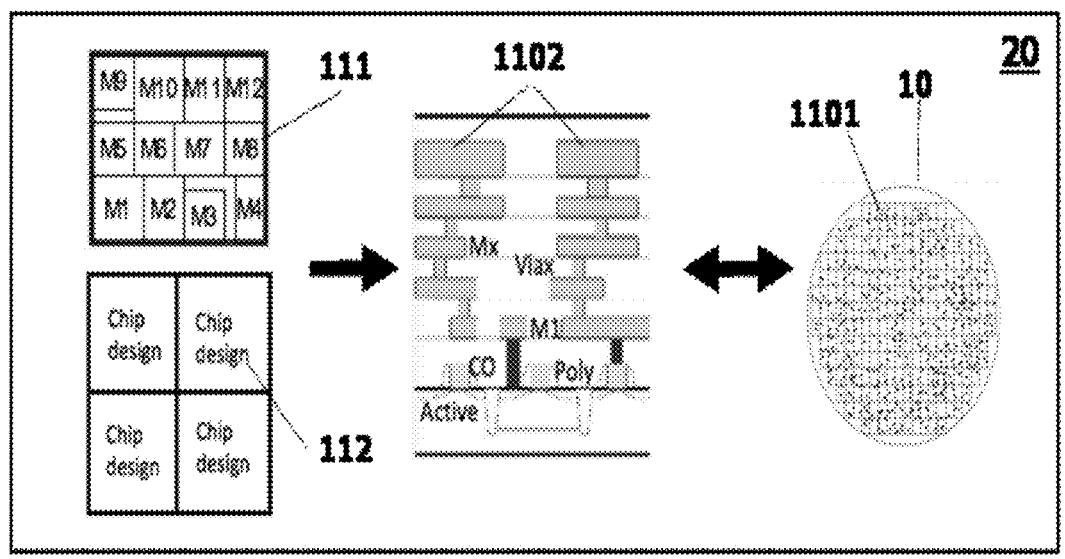
FIG. 12A is a defect analysis architecture chart from R&D to mass production stage.

Next, please refer to FIG. 12A. It is a defect analysis architecture chart from R&D to mass production stage. As shown in FIG. 12A, IC design house will normally choose to begin with wafer shuttle 111 when IC design house moves from R&D to mass production stage in an advanced nanometer process. Then, IC design house will choose to make own mask 112. In general, IC design house will join the wafer shuttle 111 project during the R&D stage. Pluralities of IC design house can design one or multiple small module chip design. For example: Company A's design file will be assigned to wafer shuttle 111 M1 location. Company B's design files will be assigned to wafer shuttle 111 M2 and M3 locations. Company C's design file will be assigned to wafer shuttle 111 M4 location, etc. When IC design house finishes product circuit design and design layout, they can select semiconductor Fab to complete mask making. Finally, semiconductor Fab handle process development and equipment tool's parameters adjustment to the best manufacturing condition. Obviously, to make a functional chip in the wafer manufacturing process is belonging to the expertise of process engineers. So, there is no problem during the wafer manufacturing procedure. However, the execution of defect inspection is also handled by process engineers in semiconductor Fab. Implement in-line wafer's defect scan and inspection to obtain defect 1101 data of wafer 10 in each process (for example: poly1 layer 1; brief name as poly1). Then, process engineers in semiconductor Fab conduct defect analysis to find out bad die failure mechanism that causes yield problem. Because defect size becomes smaller toward more advanced nanometer process. So, the defect 1101 count from defect scan and inspection becomes larger. For example: there are several thousands to several tenthousand random defect counts. But, they can select defect samples based on experience or select 100 to 200 random defects for SEM imaging to confirm whether those selected defect samples will cause circuit 1102 open or short failure. Obviously, the random defect sampling is adopted by process engineer for yield analysis. The probability to hit short circuit or open circuit killer defect is extremely low. Actually, Fab engineers can only obtain a partial killer defect SEM images no matter how process engineers execute defect sampling. Then, Fab engineers analyze what process or equipment tool causes the killer defect. But, there are still large part of short circuit or open circuit killer defects that are not selected for SEM images. Now, that is why the efficiency to execute yield improvement by engineers is poor. Usually, it takes a few years to reach the yield improvement goal. Poor efficiency will delay the time to decent yield in mass production. This defect inspection and yield improvement mode is operated currently by IC design house and semiconductor Fab. However, the discovery of yield loss failure mode is totally dependent upon engineer's experience and luck. That limits the chance to quickly solve defect yield problem.

Figure 12B:
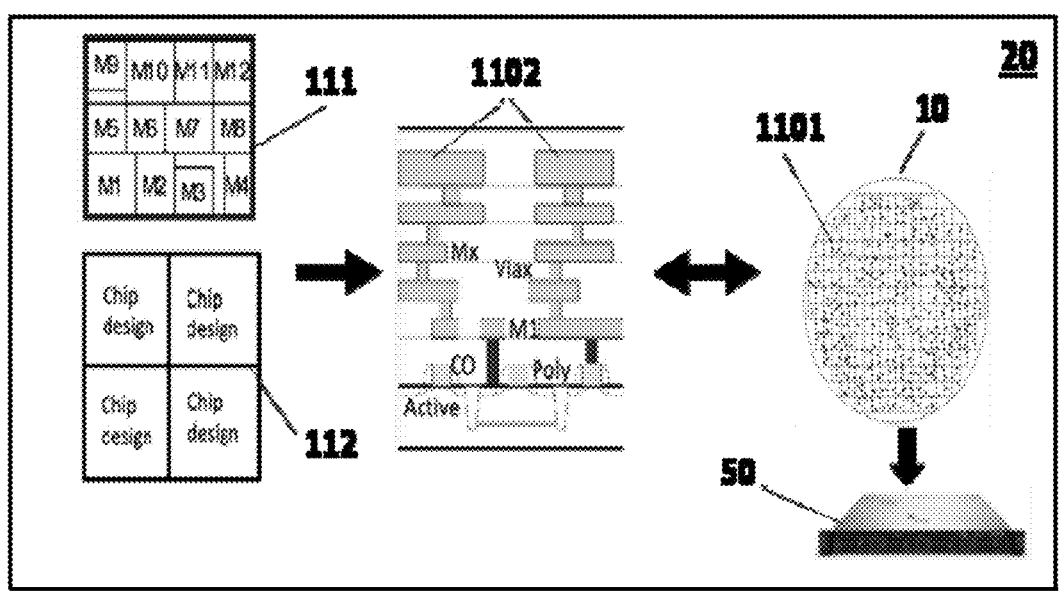
FIG. 12B is this invention's "Semiconductor Fab's Defect Operating System" from R&D to mass production stage.

FIG. 12B is this invention's "Semiconductor Fab's Defect Operating System" from R&D to mass production stage As shown in FIG. 12B, IC design house normally will join advanced nanometer process's wafer shuttle 111 project in the R&D stage. Also as shown in FIG. 12A, pluralities of IC design house can design one or multiple small module chip design. For example: Company A's design file will be assigned to wafer shuttle 111 M1 location. There is no need to repeat again. Similarly, IC design house 30 finishes product circuit design and design layout. Then, IC design house can select semiconductor Fab 20 to complete mask making. Finally, semiconductor Fab 20 handle process development and equipment tool's parameter adjustment to the best manufacturing condition. However, the execution of defect inspection is also handled by process engineers in semiconductor Fab. Implement in-line wafer's defect scan and inspection to obtain defect 1101 data of wafer 10 in each process (for example: 1 poly1 layer; 10 metal layers). Then, perform matching and judgment through "Semiconductor Fab's Defect Operating System" or "Defect Operating System" 50 to obtain pluralities of possible killer defect 1101 data over pluralities of layers. IC design house 30 can follow the "Defect Operating System" 50 processed result that create the actual and all layers' killer defect 1101 report files for wafer 10. Find possible defect location that matches die index, coordinate location, process layer, and killer risk conditions. Then, conduct failure analysis on those possible defects. Through "Defect Operating System" 50 killer defect 1101 report files, IC design house can discover those short circuit or open circuit killer defect 1101 which were not selected as defect sample list to take SEM images. This invention complements the insufficiency of discovering real failure killer defect through inline defect inspection. Then, IC design house 30 can reference the killer systematic defect 1101 location. Design engineer can modify IC design layout pattern 1110 directly on the GUI of a layout editor. IC design house 30 can use this invention's offering, i.e. "Defect Operating System" 50, in every layer's defect analysis of a wafer manufacturing process. IC design house 30 can join semiconductor Fab 20 yield analysis and modification of IC design layout pattern 1110. So, it is easier and faster to achieve a good wafer yield target in mass production. This is a new operation mode to quickly solve defect yield between IC design house 30 and semiconductor Fab 20.

Figure 13A:
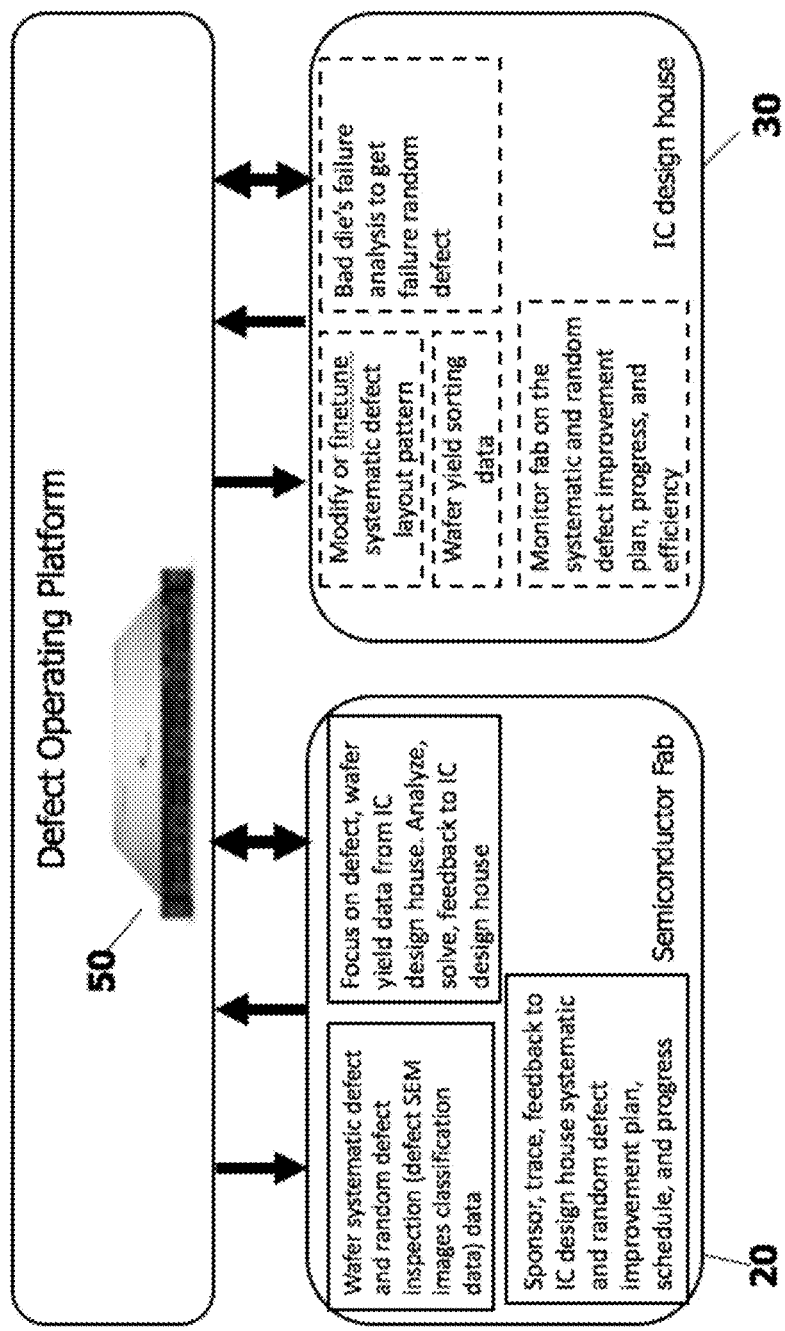
FIG. 13A is this invention's "Semiconductor Fab's Defect Operating System" architecture chart.

FIG. 13A is this invention's "Semiconductor Fab's Defect Operating System" architecture chart. As shown in FIG. 13A, semiconductor Fab 20 manufacture mask based on the IC design layout 1110 which is offered by IC design house 30. Then, semiconductor Fab 20 conducts wafer manufacturing and defect inspection for each layer. Semiconductor Fab 20 will transfer and store each layer's original defect data file into "Defect Operating System" 50. Original defect data file includes: Defect text and image data file 1130. Inside the defect text and image data file 1130, the record for each defect's image 1101 contains die index 11 number, defect image 1101 identification number, product name, defect inspection step, lot number, defect inspection tool ID, defect ID, defect coordinate $(X_1, Y_1)$, and rough defect image size (include: maximum size in X direction and maximum size in Y direction), etc. Finally, deliver and store these defect text and image data file 1130 into storage unit 23 of the "Defect Operating System" 50. Then, "Defect Operating System" 50 will execute coordinate conversion for this defect data. That is because the defect 1101 coordinate location on the wafer detected by semiconductor Fab 20 and the coordinate location in design layout are different. So, the defect coordinate location on wafer 10 must be converted into the corresponding coordinate location in IC design layout pattern 1110. Then, defect analysis can be executed. Furthermore, it must go through step 200, step 300, and step 500 in flowchart 100 to perform coordinate calibration and defect size calibration. For example: The "Defect Operating System" 50 of this invention will execute step 200 and step 300 for coordinate calibration and defect size calibration. Then, "Defect Operating System" 50 will execute step 150 and step 160 of flowchart 100 to perform Critical Area Analysis (CAA). Nuisance defect will be filtered. After that, killer defects will be delivered to IC design house 30 to judge which defect pattern out of systematic defects belongs to killer systematic defect pattern groups and which defect out of random defects belongs to random killer defect.

When defect inspection data of a systematic defect test can reach 1 million defect counts, IC design house 30 has no ability to perform analysis with such huge defect count. It must be processed first. For example: "Defect Operating System" 50 of this invention will execute systematic defect pattern grouping and Critical Area Analysis (CAA). That is to execute systematic defect pattern grouping first, i.e. 1 million defect count systematic defects will be reduced to 10 thousand systematic defect pattern groups. Then, execute CAA to filter nuisance defect pattern groups and low risk systematic defect pattern groups, i.e. 10 thousand defect pattern groups will be reduced to 1 thousand systematic defect pattern groups. Then, IC design house 30 can choose to store those one thousand killer systematic defect pattern groups' coordinate location data into memory unit 33. Or connect directly with "Defect Operating System" 50 to obtain those one thousand killer systematic defect pattern groups' coordinate location data. Next: Based on those one thousand killer systematic defect pattern groups' coordinate location data, data processing unit 31 will modify IC design layout pattern 1110 through the GUI of a layout editor. Also, data processing unit can choose a certain quantities defect samples (for example: 500 killer systematic defect pattern groups) out of those one thousand killer systematic defect pattern groups' coordinate location data to take SEM images. After confirming the locations of killer systematic defect pattern, modify IC design layout pattern 1110 through the GUI of a layout editor based on the killer systematic defect pattern groups' coordinate locations. So, solve killer systematic defect out of systematic defects to increase yield. In the end, IC design house 30 will store the modified IC design layout 1110 into memory unit of "Defect Operating System" 50.

In addition, random defect inspection data could be several thousands to several ten thousands defect count. "Defect Operating System" 50 of this invention must execute step 200, step 300, and step 500 in flowchart 100 to perform coordinate calibration and defect size calibration. Then, "Defect Operating System" 50 will execute step 150 and step 160 of flowchart 100 to perform Critical Area Analysis (CAA). Majority of nuisance defects and low risk random defects will be filtered. For the remaining 10% killer random defects, IC design house 30 will integrate all the layers' killer random defects out of defect inspection data and the corresponding bad die testing failure zone. Perform failure analysis to get defect SEM image. Confirm every failure killer random defect out of those killer random defects. Transfer to semiconductor Fab 20 through "Defect Operating System" 50. Semiconductor Fab 20 will propose a solution based on the killer random defect locations and the short circuit and open circuit failure killer random defect SEM image. Improve yield by solving those killer random defect issues. Obviously, IC design house 30 cannot handle the huge amount of systematic defect and random defect without the "Defect Operating System" 50. IC design house 30 cannot judge where those important killer defects are. Don't even think about to perform matching analysis one by one for all the defect data. So, "Defect Operating System" 50 of this invention is a very critical system to enhance process yield and move quickly into production. As mentioned before, the current technology shown in FIG. 12A is totally dependent upon semiconductor Fab's process engineer whose experience and luck determine the process yield enhancement. In the practice example of this invention, it is handed to "Defect Operating System" 50 to implement. "Defect Operating System" 50 of this invention must at least execute coordinate conversion, coordinate calibration and defect size calibration, defect layout pattern grouping, and Critical Area Analysis in flowchart 100. Only killer defects are kept for defect analysis. So, systematic defect count or random defect count is greatly reduced. Next, IC design house 30 receives the IC design layout pattern 1110 and killer systematic defect locations from "Defect Operating System" 50. Through data processing unit 31, design engineer modifies IC design layout pattern 1110 through the GUI of a layout editor. The systematic defect is solved to improve yield. In the end, IC design house 30 will store the modified IC design layout 1110 into memory unit of "Defect Operating System" 50. All the software used to execute coordinate conversion, coordinate calibration and defect size calibration, defect layout pattern grouping, and Critical Area Analysis, etc (for example: flowchart 100) and hardware are already built up in "Defect Operating System" 50.

Figure 13B:
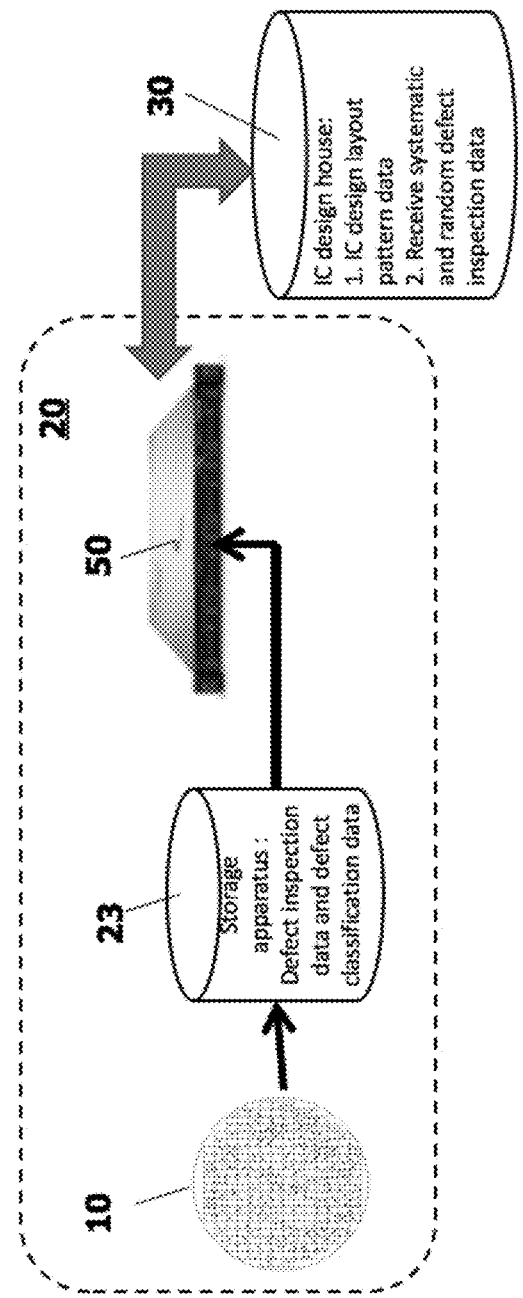
FIG. 13B is this invention's "Semiconductor Fab's Defect Operating System" system architecture chart with a practice example.

FIG. 13B is this invention's "Semiconductor Fab's Defect Operating System" system architecture chart. As shown in FIG. 13B, IC design house 30 buys or leases a server and install "Defect Operating System" of this invention into the server. Server apparatus can be one or pluralities of servers. In this practice example, the server is assigned to Semiconductor Fab inside. It is normally inside the computer room. In semiconductor Fab, the original defect data 1130 is generated after executing defect scan and inspection on wafer 10. This will ensure original defect data 1130 from leaking outside. Also, this will ensure the defect text file and defect image file, which are related to semiconductor Fab 20 and process yield, stored safely inside semiconductor Fab 20. Next, the system can process and analyze real-time wafer defect inspection data created from wafer defect scan and inspection. So, the new wafer's original defect data from a wafer defect scan and inspection can be stored into memory unit 23 (for example: hard drive). Memory unit 23 can be installed inside "Defect Operating System" 50 or setup independently as shown in FIG. 13B. In this practice example, semiconductor Fab 20 executes defect analysis. For example when semiconductor Fab 20 completes wafer's original defect data and stores into "Defect Operating System" 50, then "Defect Operating System" 50 can immediately process original defect data. For example: Process through flowchart 100 and filter out possible killer defect information. After storing into storage apparatus, transfer data back to semiconductor Fab 20. Next, start executing systematic defect or random defect analysis based on the defect testing type (for example: Systematic defect or random defect). The analysis is described below.

Based on FIGS. 13A and 13B, the systematic defect is analyzed first. Based on the wafer's original systematic defect data 1130, "Defect Operating System" 50 will conduct systematic defect layout pattern grouping and killer risk level classification process for each systematic defect layout pattern group (for example: execute as shown in flowchart 100). If it belongs to nuisance defect type systematic defect layout pattern group, then this group is not for defect sampling. Only the killer systematic defect layout pattern groups are selected for defect sampling and taking SEM images. After that, convert all the possible killer systematic defect layout pattern groups image file into systematic defect text and image data file (for example: killer systematic defect text and image data file 1160). Finally, killer systematic defect text and image data file 1160 is transferred to IC design house through internet transportation or FTP type. Then, IC design house 30 will convert killer systematic defect text and image data file 1160 into systematic defect design layout pattern 1111, layer, and coordinate location. User can review the systematic defect layout pattern through GUI. In addition, conduct defect analysis on random defect. Based on wafer's original random defect data 1130, classify each random defect into killer risk level random defect following flowchart 100. If it is nuisance random defect, then it is not for defect sampling. Focus only on killer random defect for defect sampling. Next, select some killer random defects out of all the possible killer random defects to take SEM images. It is to confirm killer random defect on the wafer's coordinate locations and those short circuit type and open circuit type failure killer random defects. Further, collect all the possible killer random defects with coordinate location on wafer and SEM random defect images and random defect classification result reviewed by semiconductor Fab 20 technicians. Convert the above data into random defect text and image data file (for example: killer random defect text and image data file 1160). Killer random defect text and image data file 1160 is transferred to IC design house through internet transportation or FTP type. Then, IC design house 30 will convert killer random defect text and image data file 1160 into random defect design layout pattern 1111, layer, and coordinate location. User can review the systematic defect layout pattern through GUI.

Figure 14A:
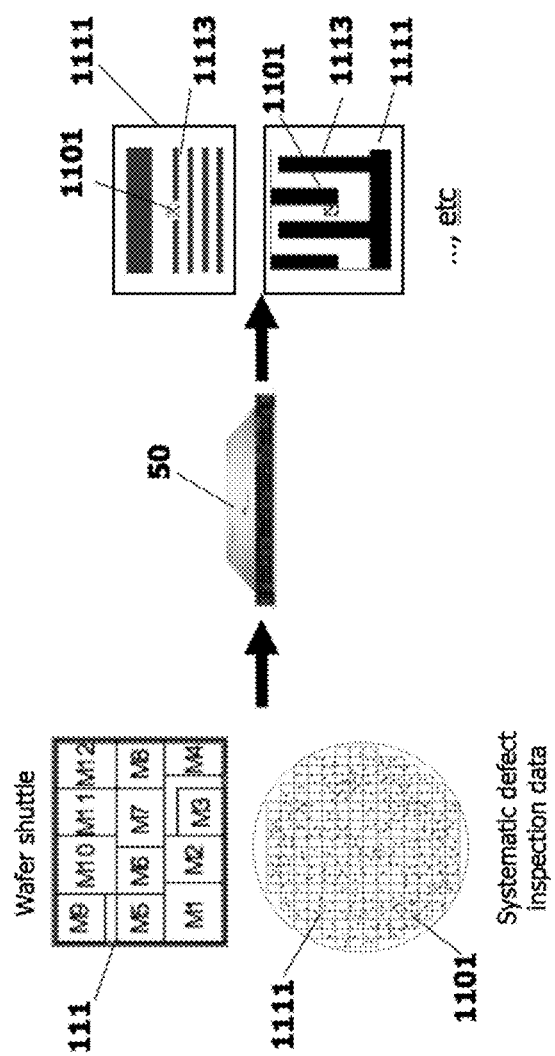
FIG. 14A is this invention's "Semiconductor Fab's Defect Operating System" architecture chart that show the practice example of systematic defect solution.

Next, please refer to FIG. 14A. It is this invention's "Semiconductor Fab's Defect Operating System" architecture chart that shows the practice example of systematic defect solution. First as shown in FIG. 14A, "Defect Operating System" 50, which is placed inside semiconductor Fab 20 by IC design house 30, processes the original detected systematic defect data file 1130 through flowchart 100. "Defect Operating System" 50 convert defect layout pattern 1111 of all the possible killer systematic defect layout pattern groups into killer systematic defect text and image data file 1170 (as shown in FIG. 14G). Killer systematic defect text and image data file 1170 is transferred to IC design house 30 through internet transportation or FTP type. In the systematic defect layout pattern 1111 of the killer systematic defect layout pattern groups, it can display the location relationship between defect image 1101 and layout circuit 1113. Next, transfer into each systematic defect layout pattern 1111. Based on the killer systematic defect layout pattern groups, IC design house 30 can modify or fine-tune IC design layout pattern 1110 in the GUI of a layout editor. Then, "Defect Operating System" 50 feedback those modified or fine-tuned IC design layout pattern 1110 to semiconductor Fab 20. It will be described more detail in FIG. 14B. When original systematic defect data 1130 is not processed through "Defect Operating System" 50, then, step 200, step 300, and step 500 in flowchart 100 are not executed. So, no coordinate conversion, coordinate calibration, or systematic defect pattern grouping is performed. Step 150 and step 160 of flowchart 100 are not executed either to perform Critical Area Analysis (CAA). In the end, killer systematic defect layout pattern group 1111 will not be obtained through nuisance systematic defect pattern group filter. It is useless for IC design house to analyze those million systematic defect count data. It is impossible for engineer to analyze defect one by one. So, it has to go through "Defect Operating System" 50 of this invention to execute flowchart 100 process. Use pattern match to put all the same systematic defect patterns to be classified into a same systematic defect pattern group. For example, First systematic defect pattern group contains 900 same systematic defect patterns. Second systematic defect pattern group contains 860 same systematic defect patterns. Till the end, last systematic defect pattern group contains 15 same systematic defect patterns. Obviously, systematic defect analysis can process through pattern grouping to reduce 1 million defect patterns into much less defect pattern group quantities. For example: It is reduced from 1 million defect counts to 10 thousand defect pattern groups. Then, use CAA analysis method to filter nuisance defect pattern groups. Classify into "killer systematic defect pattern group", and "nuisance or non-killer systematic defect pattern group". Only killer systematic defect pattern groups are kept for further analysis. After CAA analysis process, the 10 thousand defect pattern groups are further reduced. For example: It is reduced to 1 thousand systematic defect pattern groups. Next, "Defect Operating System" 50 of this invention will put those 1 thousand killer systematic defect pattern groups and their corresponding location zone in IC design layout pattern 1110 to be displayed on the GUI of layout editor in IC design house. It is shown in FIG. 14A right hand side of killer systematic defect layout pattern 1111. By focusing on the remaining 1 thousand killer systematic defect pattern groups, the circuit design engineer of IC design house can analyze, modify, or fine-tune IC design layout 1110 directly on the GUI of a layout editor. Then, data file is feedback to semiconductor Fab 20 through "Defect Operating System" 50.

Figure 14B:
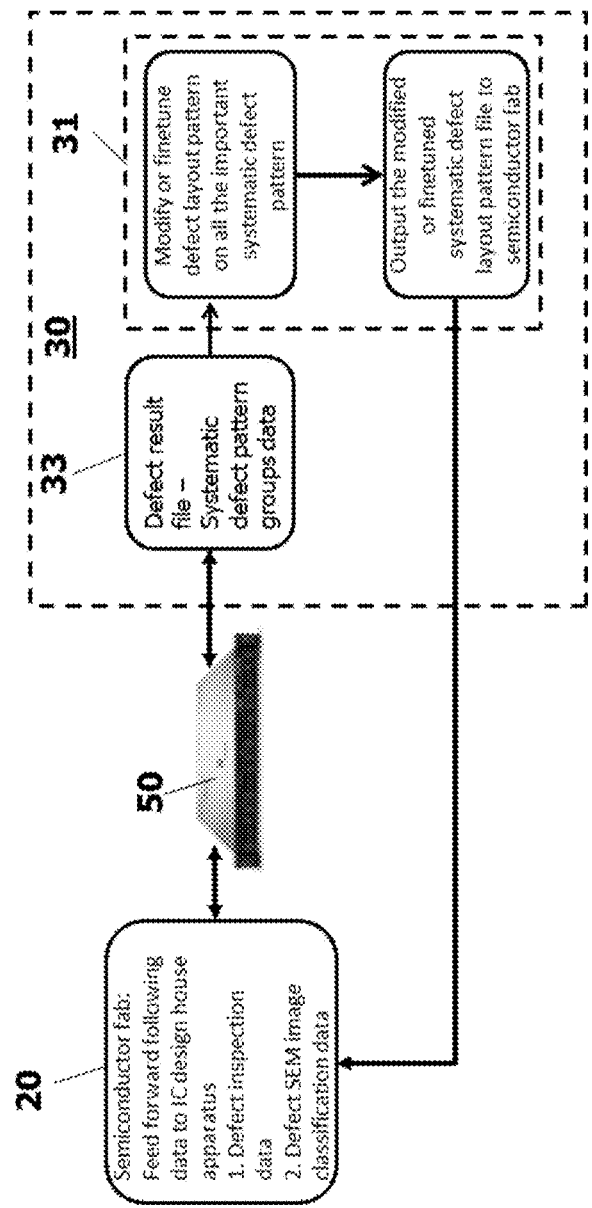
FIG. 14B is this invention's "Semiconductor Fab's Defect Operating System"—an architecture chart of systematic defect solution.

FIG. 14B is this invention's "Semiconductor Fab's Defect Operating System"—an architecture chart of systematic defect solution. It is shown as in FIG. 14B. First of all, semiconductor Fab 20 will detect systematic defect on any IC design house 30 product. The systematic defect experiment is an exposure energy/defocus matrix process window experiment on one lithography layer (for example: poly1 layer). Then, conduct defect scan and inspection analysis. Semiconductor Fab 20 will store the systematic defect data, which is obtained from defect scan and inspection, into "Defect Operating System" 50 memory unit. Next, "Defect Operating System" 50 will execute analysis and processing as described in flowchart 100. "Defect Operating System" 50 transfers the systematic defect layout pattern 1111 of all the possible killer systematic defect pattern groups into systematic defect text and image data file 1170. Killer systematic defect text and image data file 1170 is transferred to IC design house 30 through internet transportation or FTP type. After that, IC design house 30 stores the killer systematic defect text and image data file 1170 into memory unit 33. Furthermore, data processing unit 31 will convert the killer systematic defect text and image data file 1170 into systematic defect layout pattern 1111, layer and coordinate location. The systematic defect layout pattern 1111 of the killer systematic defect pattern groups will be displayed in GUI. So, users can review the systematic defect layout pattern 1111. Detail procedure is shown in FIG. 13B (Please refer to paragraph 61). Next, GUI of the layout editor in data processing unit 31 displays the layout pattern. Based on the design layout pattern 1113 coordinate location of the possible killer systematic defect 1101, circuit designer and design layout engineer of IC design house 30 can modify, or fine-tune each design layout pattern 1110. For example: Increase process window, increase spacing between conductor lines, or widen line width, etc. are used to improve design layout pattern 1110. It is to solve the killer systematic defect pattern of the original systematic defect. After improving design, layout pattern, IC design house 30 stores the modified or fine-tuned IC design layout pattern 1110 into "Defect Operating System" 50. In the end, "Defect Operating System" 50 will transfer the data file to semiconductor Fab 20. In another word, i.e. shown in chart 14B, it is the IC design layout pattern's 1110 design layout fix architecture of this invention.

Figure 14C:
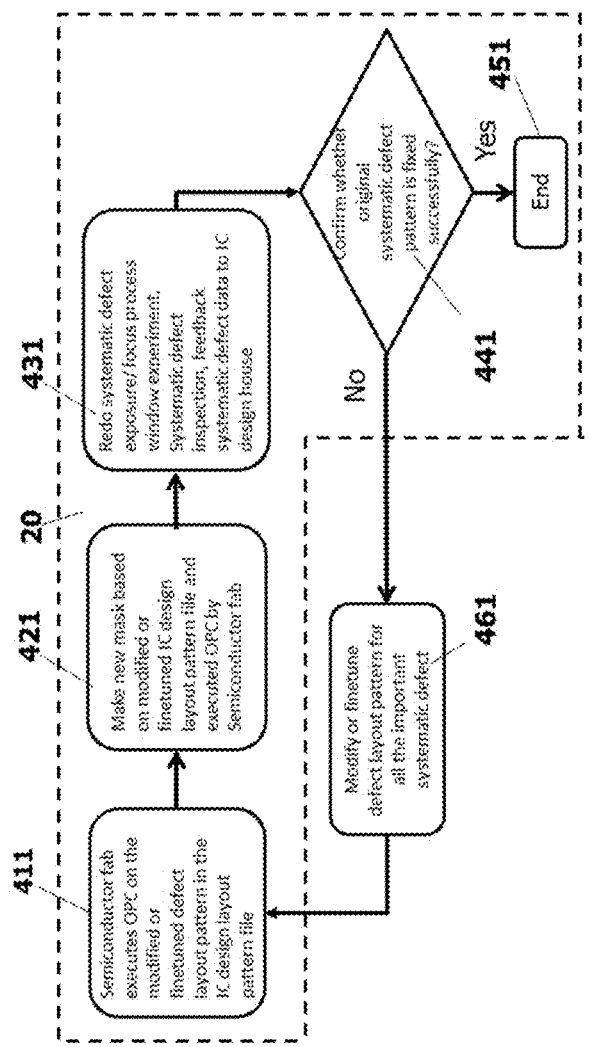
FIG. 14C is this invention's "Semiconductor Fab's Defect Operating System" flowchart that is used to judge a complete fix on systematic defect.

Next, please refer to FIG. 14C. It is this invention's "Semiconductor Fab's Defect Operating System" flowchart that is used to judge a complete fix on systematic defect. First as shown in FIG. 14A, semiconductor Fab 20 receives new (after modification or fine-tune) IC design layout pattern 1110 file from IC design house 30 through "Defect Operating System" 50. Based on new IC design layout pattern 1110, semiconductor Fab 20 will handle Optical Proximity Correction (OPC) as shown in step 411. Next, produce new mask based on new Optical Proximity Correction result as shown in step 421. After that, redo wafer manufacturing process. As shown in step 431, restart wafer's exposure energy/defocus matrix process window experiment on a lithography process. Execute wafer's defect scan and inspection analysis. Confirm whether original killer systematic defect 1101 on layout pattern 1113 coordinate location, and all the possible killer systematic defect 1101 on layout pattern 1113 coordinate locations are fixed or not (that means no killer systematic defect appearance on same coordinate location). Furthermore, it is shown in step 441. If the original killer systematic defect 1101 is already fixed, then engineer can judge that systematic defect is excluded or fixed. (Note: There is no killer systematic defect appearance on the same location; or wafer yield is improved from 0 to be higher than a minimum yield level from wafer sort yield data. For example: 15% yield level.) So, finish the systematic fix procedure is shown in step 451. If the original killer systematic defect 1101 still exists on the same location or new killer systematic defect is generated, or wafer yield is still between 0% and 5%, this represents the killer systematic defect still exists. So, wafer yield cannot be improved. Now, engineer has to go through the IC design layout 1110 fix architecture as in FIG. 14B. With data processing unit 31, engineer opens the GUI of the layout editor. For layout pattern 1113 coordinate location of all the possible killer systematic defect 1101, engineer once more modify or fine-tune each IC design layout pattern 1110 as shown in step 461. After that, IC design house 30 transfers the modified or fine-tuned IC design layout pattern 1110 file to semiconductor Fab 20. Based on new IC design layout pattern 1110 file, Semiconductor Fab 20 redo Optical Proximity Correction (OPC) as shown in step 411. Repeat the killer systematic defect fix flow as described before.

This invention displays the architecture and processing procedure of FIGS. 14B and 14C. When "Defect Operating System" 50 of this invention is used to conduct defect analysis and processing, then IC design house 30 starts cooperation with semiconductor Fab 20 from the beginning to develop a new generation process. Starting from the first wafer shuttle 111 to pilot production, IC design layout pattern 1110 will modify several times and perform layout pattern optimization. IC design house 30 operates under "Defect Operating System" 50 architecture. Between two different IC design layout pattern 1110, design house can ask semiconductor Fab 20 to focus on pluralities of lithography process layers and conduct multiple times of detecting systematic defect experiment, i.e. exposure energy/defocus matrix process window experiment. Execute defect scan and inspection analysis as well. Through "Defect Operating System" 50, execute multiple times analysis and processing to obtain systematic defect pattern group data file. Semiconductor Fab 20 can offer IC design house 30 the layout pattern 1113 location of the killer systematic defect 1101. With data processing unit 31, engineer opens the GUI of the layout editor. Engineer once more modify or fine-tune each IC design layout pattern 1110. For example: Increase process window, increase spacing between conductor lines, or widen line width, etc. are used to improve design layout pattern 1110. For example: Before pilot production, IC design house 30 already modified IC design layout pattern 1110 four times. For each layer's masking process, (for example: each important layer poly1, metal1, metal2 etc. lithography process layer), engineer executes at least three exposure energy/defocus matrix process window experiment. Execute defect scan and inspection analysis. Operate "Defect Operating System" 50 under FIG. 14B IC design layout pattern architecture. With data processing unit 31, engineer opens the GUI of the layout editor. Engineer once more modify or fine-tune each IC design layout pattern 1110. Compare to the current operation mode, i.e. semiconductor Fab 20 handles process parameter adjustment and Optical Proximity Correction. It is much more efficient to overpass the zero yield barrier that is caused by systematic defect issue. This invention can move quickly into pilot production stage. Furthermore: "Defect Operating System" 50 can be applied to pluralities of IC design houses 30 to join and are responsible to modify or fine-tune each layout pattern 1113 defect of all the possible killer risk systematic defects 1101. Especially in the advanced nanometer process, current operation mode by semiconductor Fab 20 is not efficient to solve all the systematic defect issues by themselves. Applying the IC design layout fix architecture in FIG. 14B and FIG. 14C, "Defect Operating System" 50 of this invention shows a new invention mode to improve systematic defect issue much faster and more efficient than current operation mode.

Figure 14D:
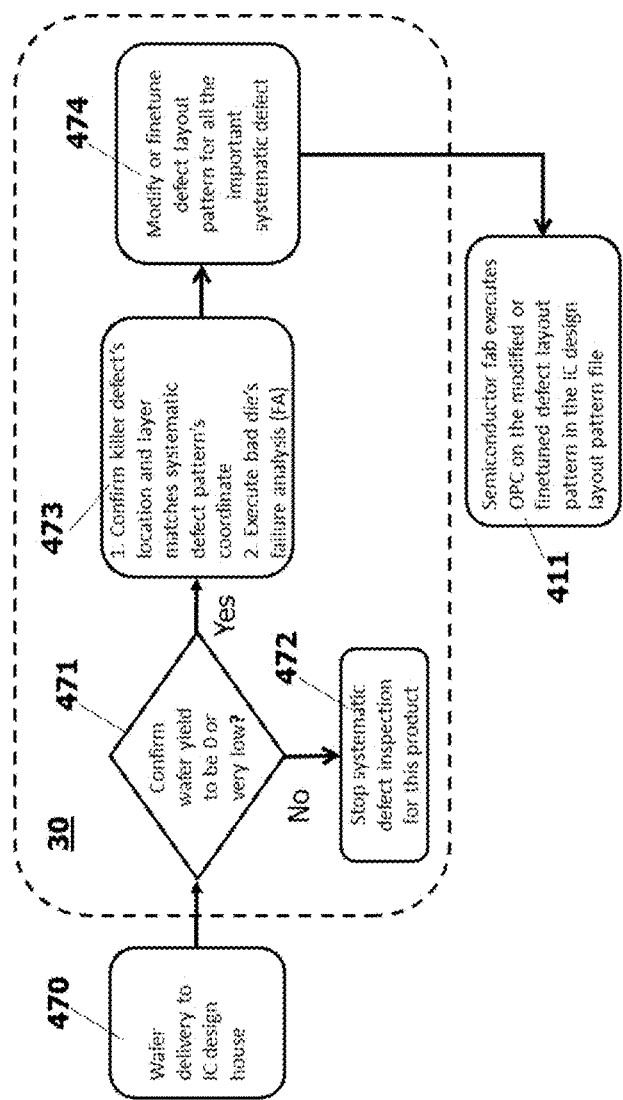
FIG. 14D is this invention's "Semiconductor Fab's Defect Operating System" flowchart that solves systematic defect in another practice example.

Please refer to FIG. 14D. It is this invention's "Semiconductor Fab's Defect Operating System" flowchart practice example that is used to solve systematic defect. First, it is shown as in FIG. 14D. When semiconductor Fab 20 finishes all the wafer manufacturing processes. As shown in step 470, semiconductor Fab 20 delivers pluralities of wafer 10, which contain pluralities of functional chips, to IC design house 30. Then, IC design house 30 can execute wafer sorting at in-house wafer sort tester or in a foundry wafer sort Fab. As shown in step 471, wafer sorting is used to judge wafer yield of wafer 10 which is manufactured by semiconductor Fab 20. Wafer sorting is performed in a wafer sort tester which applies a probe card to directly contact every metal pad on each die 11. Normally, the metal pads in a function die 11 can be in order of ten and hundred. There are also several hundred connection wires to connect to probe card. The execution of testing functions in this wafer sort tester includes: 1) Open-short circuit test. Testing code is assigned as 2. 2) Leakage current test. Testing code is assigned as 9. 3) Standby current test. Testing code is assigned as 6. 4) Function test. Testing code is assigned as E. And there are more testing items and the testing codes not listed one by one here. Only four frequent testing failure examples are described as an practice example. For example: The power circuit test includes: When there is killer defect located in the VCC power line or Ground line. It will cause open or short failure. So, the testing result shows a Vcc or Ground line failure. In other word, the Vcc or Ground line failure in wafer sorting test can be suggested that there is a possible killer defect located in the Vcc or Ground path or zone area. Take leakage test as another example. When a killer defect just falls on the input pin or I/O pin layout pattern area. This I/O pin or input pin is used to control CMOS circuit operation. The killer defect results in abnormal circuit function, i.e. CMOS control circuit always 'On' or 'Off' state. That causes I/O pin or input pin leakage current higher than testing spec. In other word, engineer can usually suspect that there might be a killer defect falling on the input pin or I/O pin layout pattern area. In addition, there is standby current testing failure. For example: For chip enable CMOS control circuit, all the chip's circuit operation is turned off except the chip enable CMOS control circuit operation current. This is the standby current from the chip enable CMOS control circuit operation current. For normal chip function, there is only small standby current. If there is a killer defect falling on the chip enable CMOS control circuit, then chip operation current cannot be turned off because chip enable CMOS control circuit operation is kept at 'always On', not 'Off' state. That makes standby current over testing spec. In other word, engineer can safely judge that there might be killer defect falling on the chip enable CMOS control circuit layout pattern path or zone area. More, take function test as example. Function test failure of a memory product might be as follows. In row decoder, column decoder, memory array, and SRAM array locations, one or multiple killer defect will cause, for example, one row memory cell 256 bits failure, column memory cell 512 bits failure, 1 bit failure, or a few bits failure. If the wafer sort testing shows a function test failure, engineer can suspect that there might be a killer defect falling on those layout pattern circuit 1113 or layout pattern zone area. For example: If there is one row memory cell 256 bits failure, engineer can suspect that might exist a killer defect falling on this row memory related layout pattern circuit 1113 or layout pattern zone area. Since there are many wafer sort testing items, this invention stresses "Not all wafer sort testing items are described here".

Figure 14E:
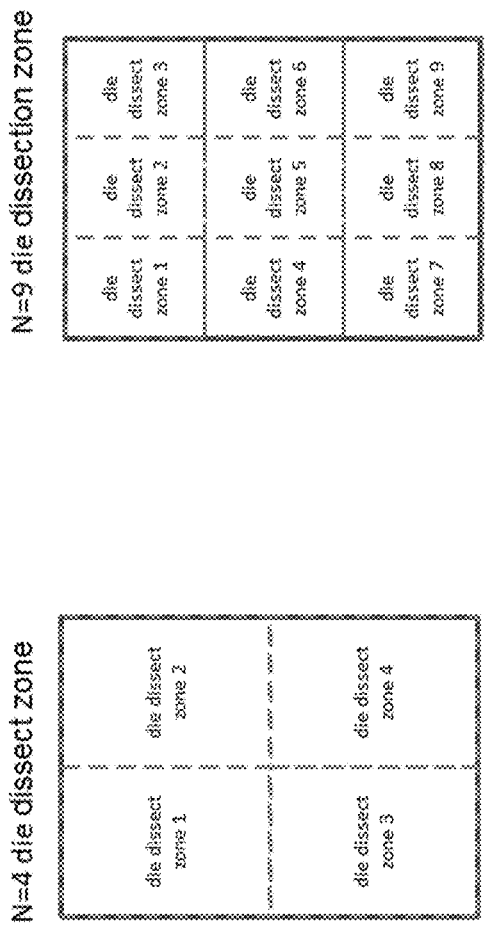
FIG. 14E is this invention's "Semiconductor Fab's Defect Operating System" chart that shows wafer yield sorting test failure in a layout pattern zone area.

Next, please refer to FIG. 14E. IC design house 30 can correlate each wafer sort testing failure item to specific zone area of a IC design layout pattern 1110. It is this invention's "Semiconductor Fab's Defect Operating System" chart that correlates wafer yield testing failure item and layout pattern zone area. IC design house 30 engineer can map the IC design layout pattern 1110 of the whole chip to the layout pattern coordinate region. Identify the coordinate zone area for pluralities of wafer sort testing items and stores into "Defect Operating System" 50. A whole chip area can be dissected into N zone area (N is an integer). Also shown in FIG. 14E, engineer can choose to define each zone area to be the same or not the same. "Defect Operating System" 50 will record 'Each wafer sort testing item maps to corresponding coordinate zone area of IC design layout pattern 1110'. Use all the information including product ID, name, and 'Each wafer sort testing item maps to corresponding coordinate zone area of IC design layout pattern 1110' to create "wafer sort testing failure zone database" and store into "Defect Operating System" 50. After executing wafer yield sorting, engineer receives the 'bad die's testing failure item' information. "Defect Operating System" 50 matches 'bad die's testing failure item' data with "wafer sort testing failure zone database". "Defect Operating System" 50 provides all the killer defects that fall on the layout pattern area for all the bad die's testing failure items. Those killer defects will be used for failure analysis. In doing failure analysis, engineer only focuses on the killer defect that locates on each specific coordinate region of IC design layout pattern 1110 and corresponding wafer sort testing failure item. If there is no setting as described above, 'N=1' means the whole chip area. It can be applied to systematic defect and random defect application. For example: When chip wafer sort testing failure is on I/O 1 pin, then engineer can extract the specific zone area for this I/O 1 pin. For example: When a chip contains 32 input pin and 64 I/O pin, systematic defect can fall on any one input pin or any I/O pin. Then, the zone area of those 32 input pin layout patterns and 64 I/O pin layout patterns will be defined by engineer first. When one input pin or one I/O pin failure, engineer can know immediately the killer defect should fall into specific coordinate zone area and layout pattern circuit 1113 of design layout 1101. Similarly, design engineer can define in advance the design layout pattern coordinate zone area that maps with each wafer yield testing failure item, for example leakage current, standby current, etc. This new invention can save a lot of time to execute failure analysis. As shown in FIG. 14E example, engineer can also dissect whole chip into four, or nine zone area in this example. How to dissect is dependent upon engineer setting and design layout function. Detail description will be explained in FIG. 15G.

Please refer to FIG. 14D. It is described in step 471. When several wafer yield can reach a pre-defined value (for example: wafer yield reaches 15~20%), then systematic defect issue is cleared. Stop the systematic defect inspection procedure as described in step 472. When several wafer yield are still zero or very low, then systematic defect still exist. Focus on those testing failure die with failure analysis (FA). It is shown in step 473. Focus especially on testing failure die 11. Analyze which pin or more pins failure. Then, trace those killers defect with possible layer and possible coordinate in the IC design layout pattern. In this invention, step 473 describes the "Defect Operating System" 50 in FIG. 14B IC design layout pattern's fix architecture. "Defect Operating System" 50 obtains a lithography layer's exposure energy/defocus matrix process window experiment and its systematic defect detection analysis data, i.e. classify wafer systematic defect data into systematic defect pattern groups classification and classify CAA analysis data into killer systematic defect pattern groups data 1170. Next, IC design house 30 obtains through "Defect Operating System" 50 the possible killer systematic defect pattern of all the mask process layers (i.e. killer systematic defect pattern group data 1170) and the killer systematic defect pattern's coordinate data for each die 11. Then, data processing unit 31 compare the above information with the corresponding circuit or coordinate zone area of the testing failure item. When data processing unit 31 matches and confirm the killer systematic defect is on the mask process layer (for example: Ground circuit failure is on metal3 layer) and the coordinate zone area. Then, perform failure analysis (FA). The failure analysis method includes de-layer process. For example: De-layer removes one layer by one layer from top down layer mode, i.e. passivation, top metal, till the expected mask process layer. For example: To verify metal 3 layer's killer systematic defect. Engineer has to know the killer systematic defect count, mask layer, and coordinate location. Then, use chemical solvent, dry etch, or chemical mechanical polishing to remove passivation layer, top metal layer, . . . , metal4 layer, inter-metal dielectric layer 3. After that, metal3 layer can be reviewed to verify the killer systematic defect. Then, take SEM images to confirm whether there exists killer systematic defect (include original predicted defect or new killer systematic defect) in the specific zone area (for example: the short circuit or open circuit failure killer systematic defect is on the area with Ground failure). Confirm the possible killer systematic defect that causes short circuit failure or open circuit failure type defect. If it is confirmed, do confirm that those killers defect 1101 caused short circuit failure or open circuit failure defect. Record those data into killer systematic defect pattern database 1170. The data includes mask layer, lot ID, wafer ID, design layout pattern coordinate, systematic defect pattern group ID, Critical Area Analysis data, etc. as shown in FIG. 14G. If engineer cannot find any killer systematic defect 1101 that causes failure, then data processing unit 31 needs to do comparison and re-confirm the possible layer for this systematic defect. After that, repeat de-layer failure analysis until engineer find short circuit failure or open circuit failure killer systematic defect 1101 from SEM images. Also record and update in to killer systematic defect pattern database 1170 (includes mask layer, lot ID, wafer ID, design layout pattern coordinate, systematic defect pattern group ID, Critical Area Analysis data).

Please refer to step 474. After data processing unit 31 confirms the short circuit or open circuit failure killer systematic defect 1101, IC design house 30 design engineer will display those defect layout pattern in the GUI of a layout editor. Based on the layout pattern 1113 coordinate location of those killers systematic defect 1101, engineer can modify or fine-tune each ID design layout pattern 1110. For example: Increase process window, increase spacing between conductor lines, or widen line width, etc. are used to improve design layout pattern. It is used to solve poor wafer yield problem due to the systematic defect. Then, IC design house 30 transfers the modified IC design layout pattern 1110 to "Defect Operating System" 50 and stores into memory unit. Further, semiconductor Fab 20 obtains data through "Defect Operating System" 50. Based on the modified IC design layout pattern 1110, semiconductor Fab 20 will modify OPC pattern and re-do new mask. Then, repeat IC design layout fix step procedures as described in FIG. 14B and FIG. 14C. When IC design house 30 executes wafer sorting and confirms the wafer yield is increased good enough (for example: yield is increased to 15% or higher). Now, the systematic defect inspection is clearly controlled and fixed. Then, stop the systematic defect detection. Obviously, this invention brings in the die testing information. "Defect Operating System" 50 can quickly and precisely find out the killer systematic defect's layer and location and solve the systematic defect issue.

Based on the above description, this invention brings in new solution to solve systematic defect issue. "Defect Operating System" 50 executes flowchart 100. Systematic defects are treated into defect pattern groups. Then, process through coordinate conversion and coordinate calibration. Perform CAA analysis through "Defect Operating System" 50. IC design house 30 can focus on layout pattern locations of the possible killer systematic defects. Modify IC design layout pattern 1110 on the GUI of a layout editor. Furthermore, integration of die testing information and killer systematic defect information provides new solution to systematic defect issue. Through "Defect Operating System" 50, wafer sort testing item maps to corresponding design layout pattern coordinate zone area analysis (for example: locate in a zone area out of the total N coordinate zone area). Match to the corresponding killer systematic defect, mask layer, and CAA data. IC design house 30 can quickly and precisely find out killer systematic defect 1101 mask layer and location. So, engineer can focus on layout pattern location of the killer systematic defect 1101. Display the layout pattern on the GUI of a layout editor and modify the IC design layout pattern 1110. In this way, systematic defect issue can be quickly solved. At same time, design engineer of IC design house 30 can modify or fine-tune IC design layout 1110 in the GUI of a layout editor. That speed up IC design house 30 the modification time IC design layout pattern 1110. Time to yield improvement can be shortened further.

Figure 14F:
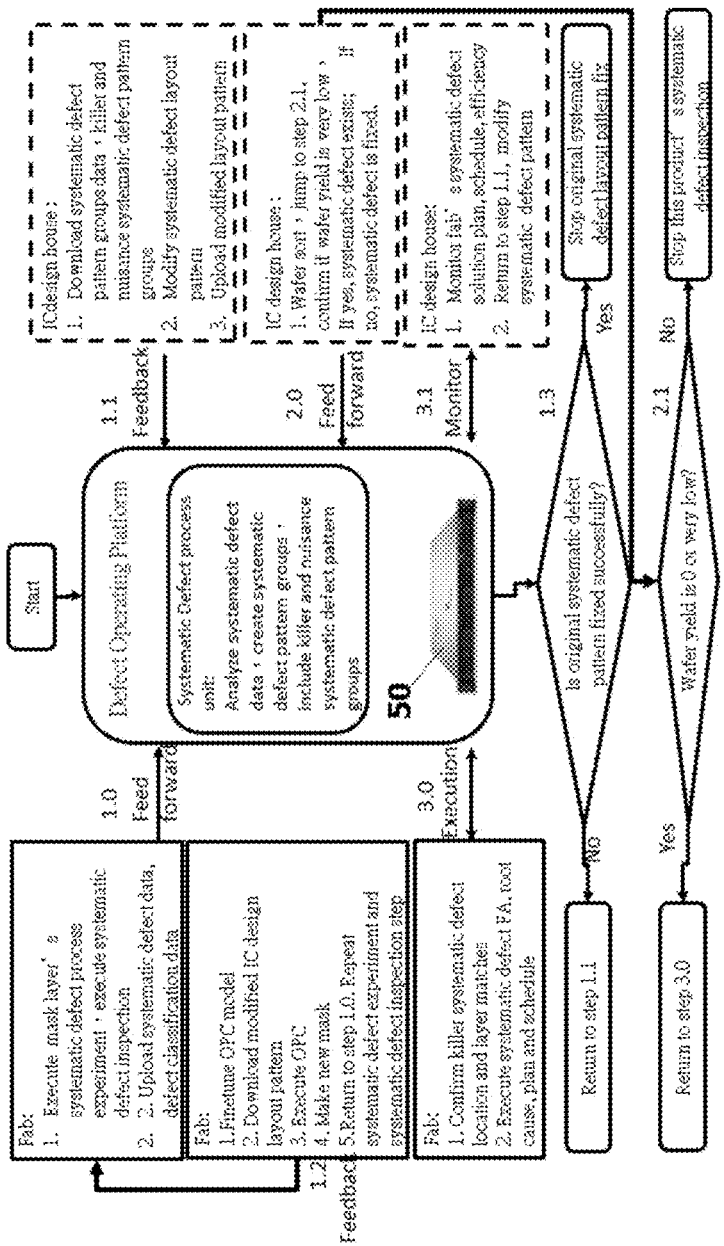
FIG. 14F is this invention's "Semiconductor Fab's Defect Operating System" main flowchart that solves systematic defect.

In the end, please refer to FIG. 14F. It is this invention's "Semiconductor Fab's Defect Operating System" main flowchart that solves systematic defect. First, it is shown in FIG. 14F. Install application software into the "Defect Operating System" 50. Based on the IC design layout pattern 1110 of IC design house 30, semiconductor Fab 20 will execute a masking layer's systematic defect process experiment, i.e. exposure energy/defocus matrix process window experiment. Then, execute systematic defect inspection and analysis. After that, all the systematic defect data and SEM images data are transferred into "Defect Operating System" 50. It is shown in 1.1 feed forward step. Please refer to step 411, 421, and 431 for detail description. Then, "Defect Operating System" 50 executes the application program of flowchart 100 to analyze systematic defect data. Create systematic defect pattern groups data and classify killer systematic defect pattern groups and nuisance systematic defect pattern groups. Furthermore, IC design house 30 download killer systematic defect pattern groups data from "Defect Operating System" 50. Focus on those killer systematic defects pattern groups and modify the corresponding layout pattern. After that, IC design house 30 uploads the modified design layout pattern file into "Defect Operating System" 50. It is shown as in the 1.1 feedback step. Please refer to step 441 for detail description. Next: Semiconductor Fab 20 downloads the modified design layout pattern file from "Defect Operating System" 50. Execute Optical Proximity Correction and manufacture new mask. Return to 1.0 feed forward step. Repeat systematic defect experiment and systematic defect inspection steps as shown in 1.2 feedback step. Please refer to step 461 for detail description. After that, check whether the original killer systematic defect pattern is fixed successfully. If yes, then stop systematic defect pattern fix flow as shown in 1.3 step. Please refer to step 471 for detail description. If not, go back to 1.0 feed forward step. In addition: If IC design house 30 executes or obtains wafer yield sorting data, then jump to step 2.1 to confirm wafer yield to be zero or very low. If yes, that suggests the killer systematic defect still exists. Need to return back to 3.0 execution step. Please refer to step 473 for detail description. If not, then it suggests that systematic defect issue is fixed. Stop systematic defect inspection on this product. Then, semiconductor Fab 20 initiates 3.0 execution step. Include: Confirm the killer systematic defect's location and layer that matches coordinate of systematic defect pattern. Execute failure analysis on killer systematic defect. Find out root cause of killer systematic defect. Then, upload the failure analysis data of killer systematic defect to "Defect Operating System" 50 as described in 3.0 execution step. Please refer to step 474 for detail description. In the end, IC design house 30 will monitor semiconductor Fab 20 the solution implementation and delivery schedule. Make sure the killer systematic defect is solved and root cause is found. Transfer the solution project to 1.1 feedback step. Execute the modification of layout pattern as in 3.1 monitor step.

Please refer to FIG. 15A to FIG. 15F. It is this invention's "Semiconductor Fab's Defect Operating System" practice example description that is used to solve random defect yield. In semiconductor Fab 20, wafer 10 is manufactured layer by layer through pluralities of equipments or tools. Then, wafer is completed with functional chips. During the manufacturing procedure, there must be random defects happened on wafer 10 through pluralities of equipments or tools. For example: Tiny particle or bubble in photoresist. Particle defect in poly layer or oxide layer. Particle defect or scratch defect in the polishing material surface for chemical mechanical polishing process. There is also particle defect in the slurry material for chemical mechanical polishing process. Multiple defect generated between plasma and etched material in a etching process. As described before, random defect can be generated from each layer's manufacturing process. The location of random cannot be predicted on each layer. However, it will cause bad die failure when random defect falls on the pattern location of any layer. For example: Short circuit type or open circuit type failure random defect. For example: In a logic design product, there are one poly layer and ten metal layers. There are 30 to 40 masks in the whole process. In total, there are several hundred process steps. For example: For advanced process 14 nm or below, it must be efficient and quickly discover random defect type for all layers. Take a major defect scan and inspection tool vendor as an example. This tool vendor selects defect sample based on defect image signal intensity and defect size to take SEM images. Obtain the random defect text and image data including location, defect size, shape, etc.

However, this tool vendor selects 100 to 200 defects out of several thousand to several ten thousand random defects to take SEM images. To confirm which random defects are killer random defects. It is very hard for this method to find out even a reasonable short circuit failure or open circuit failure random defects. (For example: Find out 20 to 30 failure killer random defect.) Actually, system can only find out 1 or 2 real short circuit or open circuit failure. Sometimes, Fab engineer cannot find any short circuit or open circuit failure. Now, semiconductor Fab 20 is responsible for random defect scan and inspection, random defect sampling, and review SEM images. Fab engineer tries to find out short circuit failure or open circuit failure random defects. Then, this is the only method to find out root cause of the failure random defect and improve wafer yield. As described before, use the similar defect sampling method. Under current defect sampling method, even though Fab can find 20~30 failure killer random defects through pluralities of defect inspection step. In reality, there are still much more failure killer random defects undiscovered by semiconductor Fab 20. Under such situation, it takes about one to two weeks to complete failure analysis of a random defect without guidance of specific location and layer information. They might repeat many times. But, wafer yield is not significantly improved. It is time consuming, and non-efficient. It is possible that no failure random defect was found. Right now, very few IC design house 30 is willing to do such random defect failure analysis.

Figure 15A:
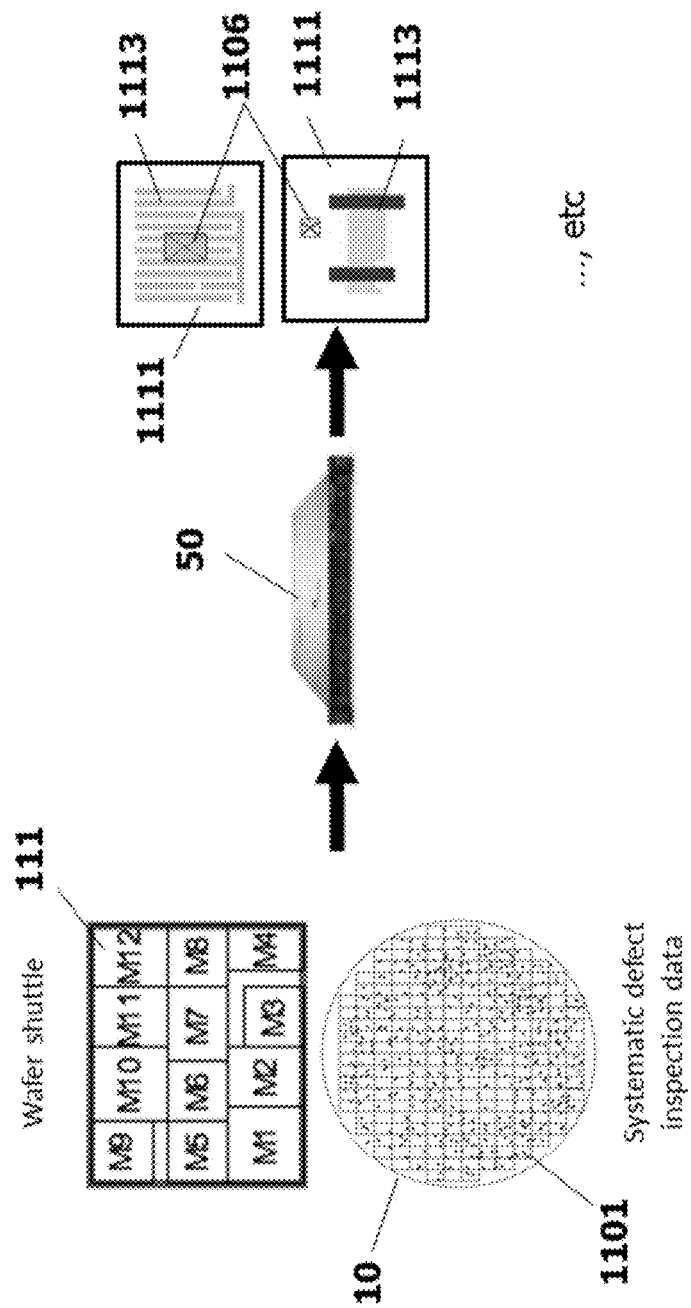
FIG. 15A is this invention's "Semiconductor Fab's Defect Operating System" practice example chart that screen out killer random defect in mass production stage.

Please refer to FIG. 15A. It is this invention's "Semiconductor Fab's Defect Operating System" practice example chart that screen out killer random defect in mass production stage. It is shown in FIG. 15A. During mass production stage, "Defect Operating System" 50 receives original random defect data file 1130 from semiconductor Fab 20. Then, execute procedures in flowchart 100. The original random defect data file 1130 is processed through coordinate conversion, coordinate calibration, defect size calibration, and Critical Area Analysis. Make sure output only the coordinate location and defect size data of killer random defect 1106 with killer random defect layout pattern 1111. Also, the killer random defect layout pattern 1111 is converted to killer random defect text and image data file 1180 as shown in FIG. 15J. Transfer the killer random defect text and image data file to the IC design house 30 via internet, FTP, etc. In killer random defect layout pattern 1111, it can display the location relationship between killer random defect image 1106 and layout pattern 1113. When IC design house 30 receives the coordinate location, and random defect size information of killer random defect 1101, i.e. killer random defect text and image data file 1180. Data processing unit 31 processes the data file. On the GUI, each killer random defect is displayed falling on the IC design layout pattern 1110 area. The defect screen procedure for killer random defect 1106 is similar to systematic defect screen procedure. After nuisance defect filter, killer random defect 1106 is about 10% of original random defect count. So, IC design house 30 can conduct failure analysis.

Figure 15B:
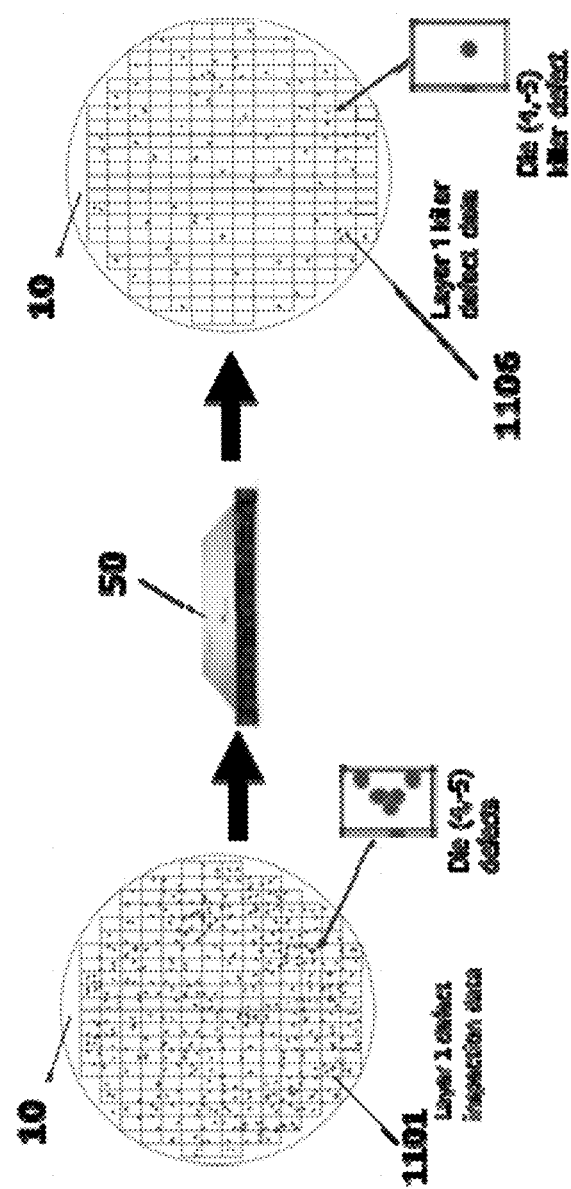
FIG. 15B is this invention's "Semiconductor Fab's Defect Operating System" another practice example chart that screens out killer random defect in mass production stage.

Please refer to FIG. 15B. It is this invention's "Semiconductor Fab's Defect Operating System" another practice example chart that screens out killer random defect in mass production stage. It is shown in FIG. 15B. During mass production stage, IC design house 30 receives each layer's original random defect data file 1130 from semiconductor Fab 20. Through "Defect Operating System" 50, executes defect screen procedure in flowchart 100. Only smaller portion and possible killer random defects 1106 are kept. Majority of nuisance random are filtered. For example: Take one 14 nm layer 1 (active layer) for explanation. In the original random defect data 1130 offered from semiconductor Fab 20, there are several thousand to several ten thousand range defects. In each die 11, there will be pluralities of random defects. For example: Layer 1 (active layer) random defect inspection is just one of the 30 to 40 defect inspection steps. After integration of all layers' random defect data into one wafer, the average defect count in die 11 will be at least several hundred random defects. For example: On each die 11, there may be several hundred (for example 300) random defects and are distributed over different layer. If engineer wants to compare bad die and random defect and do failure analysis, they need to conduct screen on several hundred random defects and find out killer random defect 1106. It is extremely inefficient and impossible to implement on several hundred random defects. But, "Defect Operating System" 50 executes defect screen procedures in flowchart 100. Conduct CAA analysis to screen several hundred defects in die 11 and decides the possible killer random defect 1106. Majority of nuisance random are filtered. Only smaller portion of killer random defects 1106 are kept. For example: A specific die 11 with die index (4,−5), there are five random defects in original defect inspection data on layer 1 (for example: active layer). After CAA defect screen, there is only one killer random defect 1106 left. Obviously, "Defect Operating System" 50 can convert killer random defect 1106 data into defect text and image data file 1190 as shown in FIG. 15I. Actually, each die 11 is manufactured through many process layers. Take 30 to 40 mask layers as example. The CAA defect screen can filter several hundred nuisance defects on each bad die. For example: Filter 270 nuisance defects out of 300 original random defects. The remaining are 30 killer random defects 1106. Obviously, the CAA defect screen method can reduce the original defect counts for each bad die to around one tenth of original defect count. The remaining random defects are killer random defects 1106. Killer random defect 1106 of each layer on wafer 10 will be recorded into killer random defect text and image data file 1180 (shown in FIG. 15J).

Figure 15C:
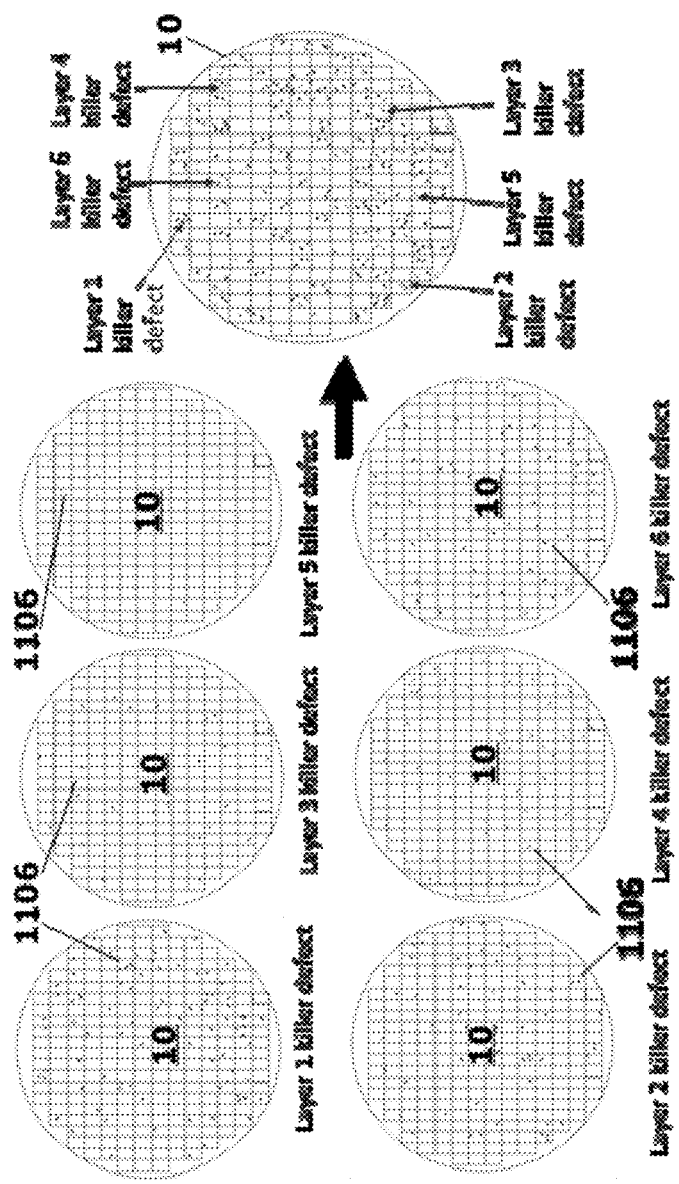
FIG. 15C is this invention's "Semiconductor Fab's Defect Operating System" another practice example chart that screens out killer random defect.

Please refer to FIG. 15C. It is this invention's "Semiconductor Fab's Defect Operating System" another practice example chart that screens out killer random defect. It is shown in FIG. 15C. During mass production stage, IC design house 30 receives each layer's original random defect data file 1130 from semiconductor Fab 20. Through "Defect Operating System" 50, executes defect screen procedures in flowchart 100. Conduct CAA defect screen method (same as in FIG. 15B defect screen procedure). Remaining and possible killer random defects 1106 of each mask layer are recorded into wafer 10 data file. In FIG. 15C, all the layer's possible killer random defect 1106 are integrated into one integrated killer random defects 1106. Different color and size can be displayed on each layer's killer random defect 1106 to show the distribution status as shown in the right hand side of FIG. 15C. On the left hand side of FIG. 15C, it is described from layer 1 to layer 6 as an example. There are 30 to 40 mask layers in actual practice case. It is not to be limited here. The random defect wafer map on FIG. 15C right hand side integrates all layers, i.e. layer 1 to layer 6 killer random defects 1106 into one wafer map as a practice example. It is mainly used to compare bad die of wafer yield sorting result with killer random defects 1106. The matched killer random defects are selected for failure analysis. "Defect Operating System" 50 also can convert defect layout pattern 1111 of all layers' killer random defects into killer random defect text and image data file 1190 as shown in FIG. 15K The data file can be transferred to IC design house through internet, FTP, etc. Furthermore, the data file is processed through "Defect Operating System" 50. When engineer use mouse to point any killer random defect 1106, the GUI will display its layer ID and the corresponding killer random defect layout pattern 1111 (shown in FIG. 15F right hand side). In killer random defect layout pattern 1111, it can display the location relationship between killer random defect 1106 and layout pattern circuit 1113. Finally, the data processing unit 31 in IC design house 30 will compare $^{\lceil}$the layer ID and distribution location of killer random defect 1106$_{\rfloor}$ with $^{\lceil}$the IC design layout pattern 1110 zone area that is mapped to bad die 11 testing failure item$_{\rfloor}$. So, the actual layer ID and the location in layout pattern 1113 for all the possible killer random defect 1106 are confirmed to conduct failure analysis. This will lead to discovery of short circuit type or open circuit type failure killer random defects.

Figure 15D:
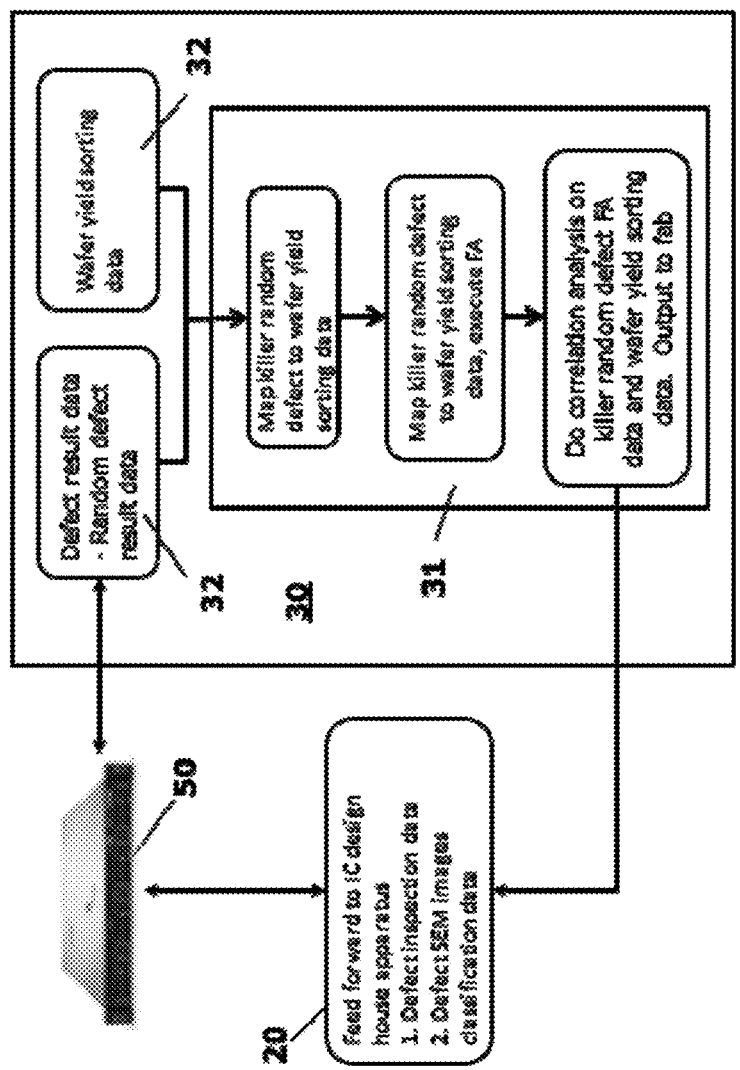
FIG. 15D is this invention's "Semiconductor Fab's Defect Operating System" system architecture chart for IC design house that solves random defect yield with killer random defect data and wafer sorting bad die's testing data.

Please refer to FIG. 15D. It is this invention's "Semiconductor Fab's Defect Operating System" system architecture chart for IC design house that solves random defect yield with killer random defect data and wafer sorting bad die's testing data. Based on the original random defect data file 1130 semiconductor Fab 20 provided to "Defect Operating System" 50, "Defect Operating System" 50 of this invention executes steps in flowchart 100. Execute coordinate conversion, coordinate calibration, and defect size calibration for each random defect data. Then, perform CAA defect screen for each random defect data. So, majority of nuisance defects can be filtered. For example: 90% nuisance defects can be filtered. Only small portion of killer random defects' data like coordinate location, defect size, etc. are kept for analysis. The data can be displayed in killer random defect layout pattern 1111.

In addition, killer random defect layout pattern 1111 can be converted to killer random defect text and image data file 1180 (display on FIG. 15J). The data file can be transferred to IC design house 30 through internet, FTP, etc. In killer random defect layout pattern 1111, it can display the location relationship between killer random defect 1106 and layout pattern circuit 1113. When IC design house 30 receives killer random defect text and image data file 1180 of those killer random defect 1106 and stores into memory unit 32. Besides, data processing unit 31 processes killer random defect text and image data file 1180. Then, the GUI can display every killer random defect 1106 that fall onto the layout pattern circuit 1113 area of the IC design layout pattern 1110. It is shown in FIG. 15A and FIG. 15D right hand side. "Defect Operating System" 50 will provide single layer's killer random defect 1106 distribution chart on wafer 10. It is shown in FIG. 15B. Next, "Defect Operating System" 50 can integrate all the different layer's killer random defect 1106 into wafer 10 and overlap on wafer 10. It is shown in FIG. 15C. After getting the killer random defect 1106 integrated pattern in FIG. 15C, the integrated pattern can be displayed in the GUI inside IC design house 30. IC design engineer can move cursor to point to any killer random defect as shown in FIG. 15F right hand side. Besides, "Defect Operating System" 50 finishes integration of all the different layer's killer random defect 1106. User can assign different color to represent different layer's killer random defect. For example: In FIG. 15C and FIG. 15F practice example, blue color represents active layer's killer random defect. Red color represents poly1 layer's killer random defect. Green color represents contact layer's killer random defect. Purple color represents metal1 layer's killer random defect. Yellow color represents via1 layer's killer random defect. Brown color represents metal2 layer's killer random defect. For other layers, it is not described here.

Next, please refer to FIG. 15D. When IC design house 30 receives wafer 10 from semiconductor Fab 20, then, IC design house will execute wafer yield sorting in house or in foundry wafer sorting Fab. Use probe card to probe wafer through wafer sorting program. The execution of testing functions in this wafer sort tester includes: 1) Open-short circuit test. Testing code is assigned as 2. 2) Leakage current test. Testing code is assigned as 9. 3) Standby current test. Testing code is assigned as 6. 4) Function test. Testing code is assigned as E. Of course, there are more testing items and the testing codes not listed one by one here. Only four frequent testing failure examples are described as a practice example.

When wafer sorting is finished, IC design house will place the wafer sort result of each die recorded and stores into "Defect Operating System" 50. The data can be displayed in the GUI as shown in FIG. 15F left hand side. Good die or pass die is assigned as code '1'. Bad die is assigned by other code. For example: Open-short circuit test failure die is assigned as code '2'. Leakage current test failure die is assigned as code '9'. Stand-by current test failure die is assigned as code '6'. Function test failure die is assigned as code 'E'.

Once "Defect Operating System" 50 receives wafer sorting result and complete all layer's killer random defect 1106 data. (On FIG. 15F left hand side is wafer sort testing result; On FIG. 15F is the design layout pattern area that each killer random defect of FIG. 15C falls onto). Next, IC design house 30 connects to "Defect Operating System" 50. In the GUI, data processing unit 31 execute comparison for each killer random defect 1106. Check whether 'the killer random defect 1106 location of each layer' matches with 'the design layout pattern area that each wafer sort testing failure item fall onto'. The detail procedure is described in FIG. 15E. When data processing unit 31 judges that 'the killer random defect 1106 location of each layer' matches with 'the design layout pattern area for the testing failure item that killer random defect 1106 should fall onto'. Then, IC design house will perform failure analysis procedure. Find out the real killer random defect's location, size, layer, and evidence of falling on design layout circuit pattern that causes bad die. De-layer method is used to perform failure analysis. Detail procedure is already described in paragraph [66]. In the end, IC design house 30 stores the evidence (failure analysis report) of each killer random defect 1106 that causes bad die failure into "Defect Operating System" 50. Then, feedback to semiconductor Fab 20. And, semiconductor Fab 20 will provide an improvement proposal to fix failure killer random defect based on the killer random defect 1106 data. Find out the process or equipment issue that is related to killer random defect 1106 and fix solution. The yield improvement proposal is kept till wafer yield reaches mass production criteria. For example: Above 80% yield, then move into mass production stage. In mass production stage, continue "Defect Operating System" 50 to improve killer random defect analysis till 95% process yield.

Figure 15E:
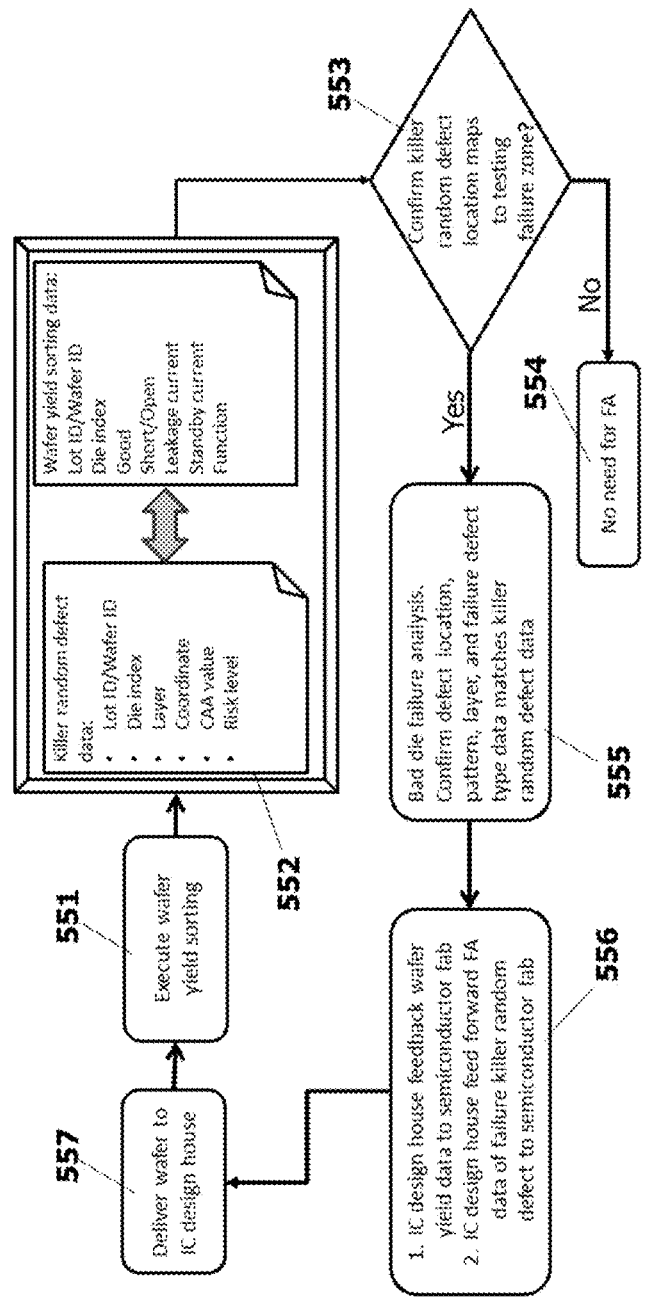
FIG. 15E is this invention's "Semiconductor Fab's Defect Operating System" flowchart that solves random defect yield.
Figure 15F:
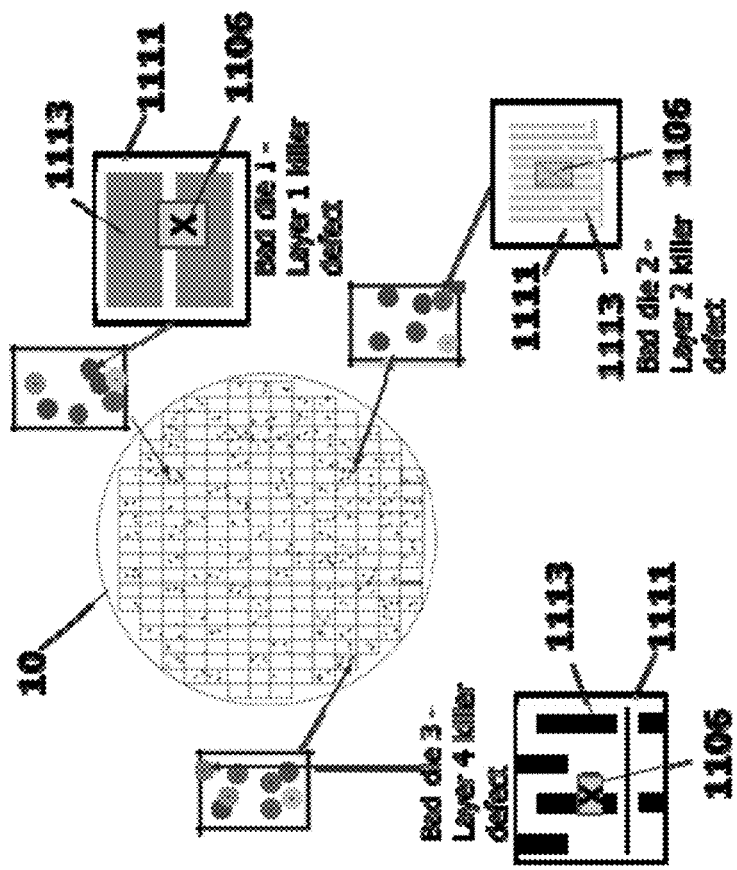
FIG. 15G is this invention's decision chart that focuses on correlation between killer random defect location and bad die failure.
FIG. 15H is this invention's "Semiconductor Fab's Defect Operating System" to be a basis for "Defect Operating System".
FIG. 15I is this invention's "Semiconductor Fab's Defect Operating System" main flowchart that solves random defect.
FIG. 15J is this invention's "Semiconductor Fab's Defect Operating System" random killer defect text and image data file.
FIG. 15K is this invention's "Semiconductor Fab's Defect Operating System" all layers' random killer defect text and image data file.
Figure 15F:
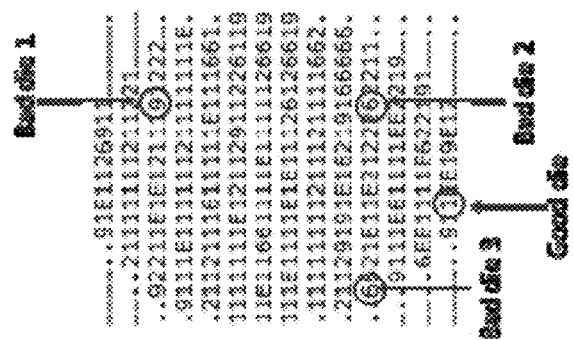

Please refer to FIG. 15E. It is this invention's "Semiconductor Fab's Defect Operating System" flowchart that solves random defect yield. As shown in FIG. 15E, it is the flowchart of this invention that describes more detail to execute FIG. 15D. After categorizing failure analysis report, IC design house 30 feedback to semiconductor Fab 20 for random defect improvement. First, IC design house 30 perform wafer sort test on wafer 10 which was manufactured in semiconductor Fab 20. It is shown in step 551. Test and judge whether die 11 is good die or bad die. Then, wafer yield sorting result is obtained. As shown in FIG. 15F left hand side, it records and stores every bad die test failure item and manufacturing information into memory unit 23. Die manufacturing information includes: lot ID, wafer ID, die index, mask layer, coordinate, etc data. Bad die test item includes: Open-short circuit test failure die is assigned as code '2'. Leakage current test failure die is assigned as code '9'. Stand-by current test failure die is assigned as code '6'. Function test failure die is assigned as code 'E'. IC design house 30 can analyze which pin is failed based on bad die and its test failure item information. IC design house can trace the possible killer random defect that falls on the IC design layout pattern 1110 area. Detail procedure is described in FIG. 14D and paragraph [0068] to [0071].

Next, it is shown in step 552. IC design house 30 receives the killer random defect information from "Defect Operating System" 50. The data includes: Every bad die's testing failure item and killer random defect text and image data file 1180 of those killer random defect 1106. Store the data into memory unit 23. Then, it is shown in step 553. After data processing unit 31 processes data, "Defect Operating System" 50 will obtain this product ID 'wafer sort testing failure layout pattern zone database'. "Defect Operating System" 50 compares automatically with 'wafer sort testing failure layout pattern zone database'. IC design house 30 will get all the mapped killer random defect 1106 that are located in the IC layout pattern 1110 zone area for the corresponding bad die testing failure item. Then, those mapped killer random defect 1106 will be used for failure analysis. For example: If there is no mapped killer random defect 1106, then skip failure analysis as described in step 554. If there is mapped killer random defect 1106, then start failure analysis as described in step 555. Find out the real killer random defect's location, size, layer, and evidence of falling on design layout circuit pattern that causes bad die. De-layer method is used to perform failure analysis.

Figure 15G:
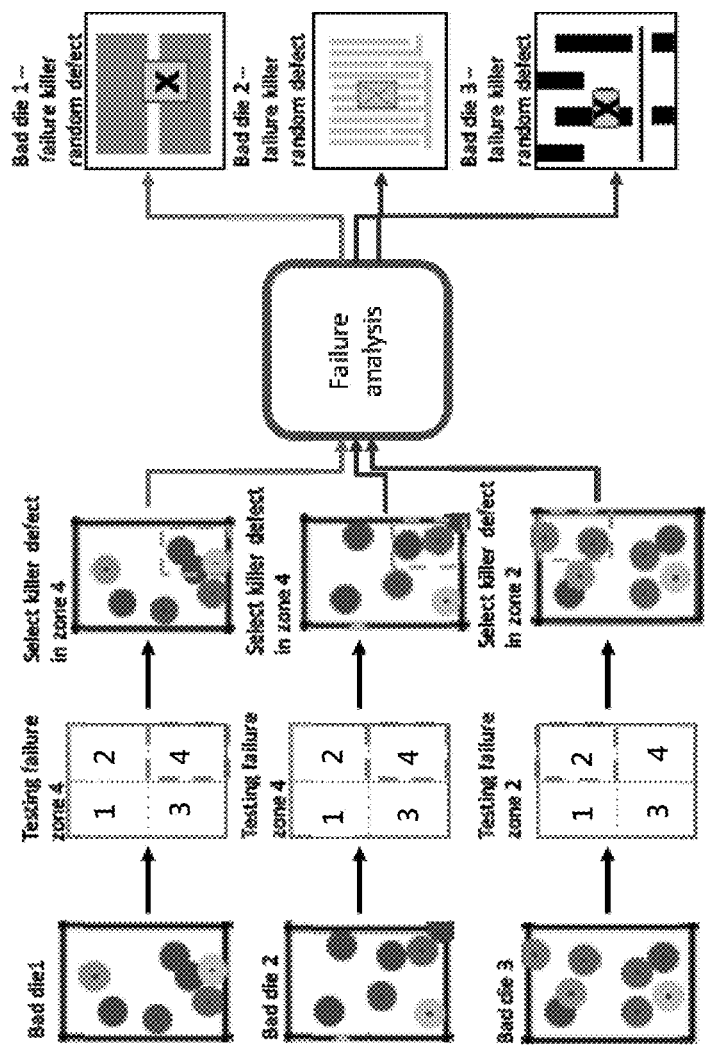

Please refer to FIG. 15G. It is this invention's decision chart that focuses on correlation between killer random defect location and bad die failure. It is shown in FIG. 15G. "Defect Operating System" 50 comprises of one memory unit 23 and one data processing unit 31. Memory unit 23 is used to store 'every process layer's defect inspection data imported from semiconductor Fab 20', and 'IC design layout pattern and wafer yield sorting result' imported from IC design house 30. Once data processing unit executes CAA analysis on every layer's defect inspection data. If IC design house 30 receives the CAA result of every layer's defect inspection data, design house can decide that a testing failure bad die has seven layer 1 to layer 6 killer random defects 1106. At same time, data processing unit 31 direct IC design layout pattern 1110 into four zones (same as shown in FIG. 14E). The bad die testing failure item will be mapped to each corresponding layout pattern zone area. After data processing unit 31 conducts testing failure item analysis for the bad die and confirms the specific zone area of IC design layout pattern 1110 that correlates to bad die's testing failure item. For example: A leakage current testing failure zone is decided to be zone 4. 101D shown in FIG. 15G is the specific zone area. Furthermore, data processing unit 31 marks bad die's testing failure item is located in one specific zone area and displays the killer random defect located in this specific zone area. Finally, IC design house 30 engineer can find on the GUI two layer 1 and one layer 5 killer random defect 1106 on the specific wafer sort testing failure zone 101D. Next, execute failure analysis on those three killer random defects 1106 that fall onto specific zone area 101D. FA result shows one layer 1 killer random defect 1106 cause failure on bad die 1. For example: There are seven layer 1 to layer 6 killer random defect 1106 on bad die 2. When standby current failure, the testing failure zone is judged on specific zone 101D, then IC design house 30 engineer can find on the GUI two layer 1 and one layer 2 killer random defect 1106. Perform failure analysis on those three killer random defects 1106. Confirm one layer 2 poly1 killer random defect causes failure. One more example: There are eight layer 1 to layer 6 killer random defects for bad die 3. The testing failure zone of this standby current failure is located in specific zone 1016. In this specific zone 1016, there are one layer 1 and one layer 4 killer random defect. Perform failure analysis on those two killer random defects. Confirm one layer 4 metal1 killer random defect that cause bad die 3 failure. Finally, it is shown in step 556. IC design house 30 collects all the failure killer random defect 1106 that caused wafer sorting failure. The evidence (i.e. failure analysis report) is stored into "Defect Operating System" 50. Feedback to semiconductor Fab 20. Then, semiconductor Fab 20 will provide random defect improvement proposal based on every failure killer random defect 1106. Find out root cause of failure killer random defect 1106 whether it is generated from process or equipment issue. After that, it is shown in step 557. Semiconductor Fab 20 improve yield based on the failure killer random defect improvement project. Produce wafer 10 with new process.

Figure 15H:
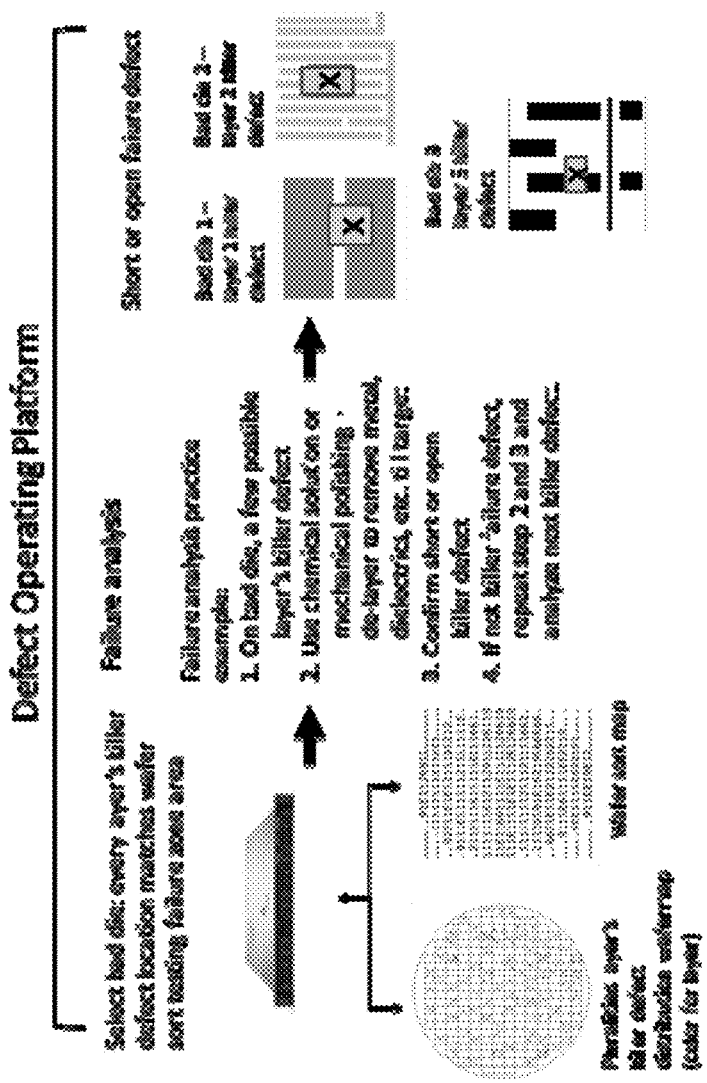
Figure 15I:
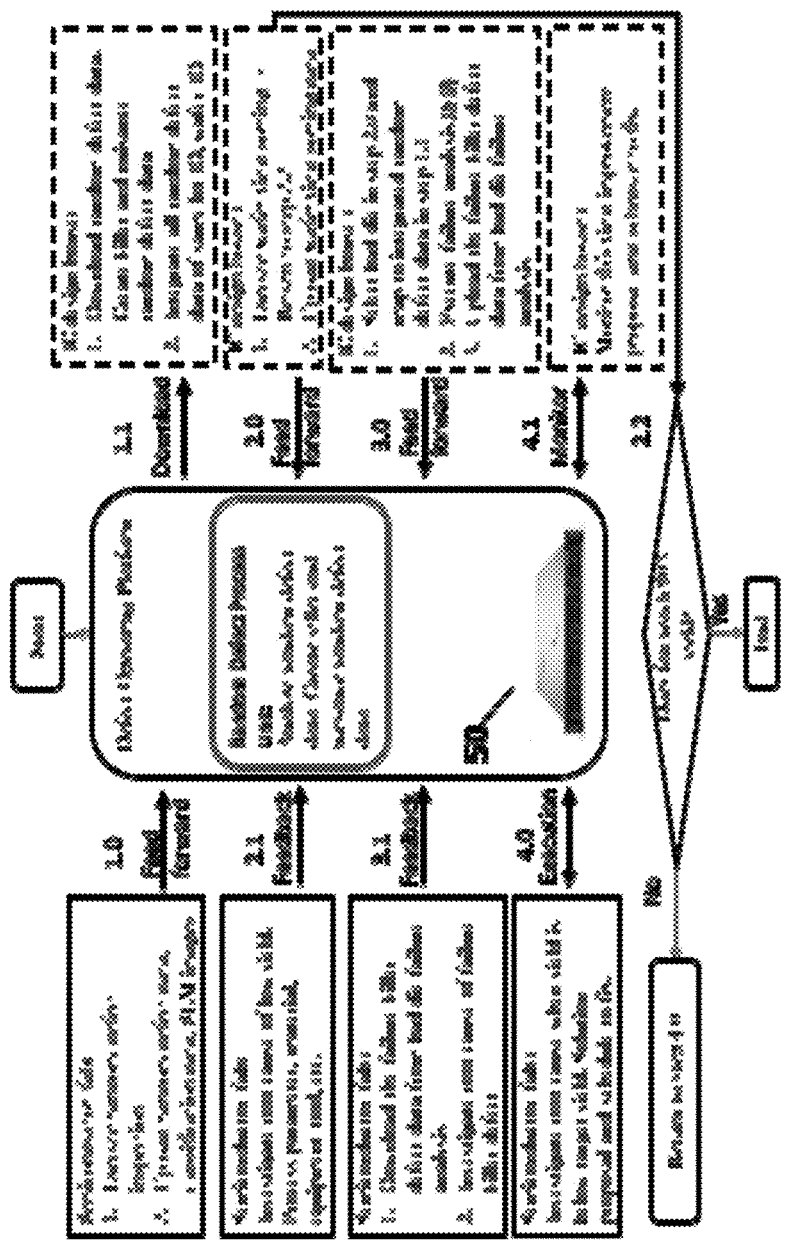

In the end, please refer to FIG. 15H. It is this invention's "Semiconductor Fab's Defect Operating System" to be a basis for "Defect Operating System". It is focused on random defect. Use defect operating system to execute failure analysis of killer defect. Confirm short circuit failure or open circuit failure random defect. It is described in the practice example. It is shown in FIG. 15H. "Defect Operating System" 50 comprises of one memory unit 23 and one data processing unit 31. Memory unit 23 is used to store 'every process layer's defect inspection data imported from semiconductor Fab 20', and 'IC design layout pattern 1110 and wafer yield sorting result' imported from IC design house 30. The characteristics are: Data processing unit 31 conducts coordinate conversion and coordinate calibration on every layer's random defect inspection data. Then, convert every random defect coordinate to IC design layout pattern coordinate 1110. Perform defect size calibration on every random defect. Obtain the data file information that each random defect locates in the IC design layout pattern 1110 coordinate region. Detail procedure is described in step 200. Data processing unit 31 executes CAA analysis on every random defect that is already process through defect size calibration. Screen random defect to get killer random defect that is in the IC design layout pattern 1110 coordinate area. Obtain this killer random defect data file information. Detail procedure is shown in step 500. Data unit 31 conducts analysis on bad die's testing failure item based on wafer yield sorting result. Then, system can get those killer random defects that should fall onto the corresponding IC design layout pattern 1110—layer and zone area. Detail procedure is shown in step 552. Data processing unit 31 compares CAA analysis to get killer defect 1106 in the defect layout pattern 1111 of IC design layout pattern 1110 coordinate area and testing failure item related killer defect 1106 in IC design layout pattern 1110 layer and zone area. Confirm the killer defect that is really located in IC design layout pattern 1110 layer and zone area. Detail procedure is shown in step 553 and step 555. Data processing unit 31 converts the defect layout pattern 1111 of those killer random defect 1106 and located really at IC design layout pattern 1110 layer and zone into killer random defect text and image data file 1180. Then, it is shown in step 556. IC design house 30 collects all the failure killer random defect 1106 that caused wafer sorting failure. The evidence (i.e. failure analysis report) is stored into "Defect Operating System" 50. Feedback to semiconductor Fab 20. Failure analysis is described in step 473. There is no need to repeat here. Then, semiconductor Fab 20 will provide random defect improvement proposal based on every failure killer random defect 1106. Find out root cause of failure killer random defect 1106 whether it is generated from process or equipment issue. After that, it is shown in step 557. Semiconductor Fab 20 improve yield based on the failure killer random defect improvement project. Produce wafer 10 with new process.

In the end, please refer to FIG. 15I. It is this invention's "Semiconductor Fab's Defect Operating System" main flowchart that solves random defect. First, it is shown in FIG. 15I. Install flowchart 100 application software into "Defect Operating System" 50. Semiconductor Fab 20 will execute random defect inspection in the defect inspection step. After that, transfer all the inspected random defect data and SEM images to "Defect Operating System" 50 as shown in 11.0 feed forward step (please refer to step 550 for detail description). Next, "Defect Operating System" 50 executes flowchart 100 application software to analyze inspected random defect data. Classify killer random defect and nuisance random defect data image file. Furthermore, IC design house downloads defect layout pattern 1111 of the killer random defect from "Defect Operating System" 50. Integrate all the killer random defect data with same lot ID and wafer ID together as shown in 11.1 download step (please refer to step 552 for detail description). Next, IC design house 30 executes or obtains wafer yield sorting data. IC design house 30 not just uploads wafer yield sorting data into "Defect Operating System" 50, but also execute judgment in step 12.2 as shown in 12.0 feed forward step (please refer to step 553 for detail description). Next, IC design house 30 judge whether wafer yield sorting data reaches yield goal (for example: reach 90% yield). If yield goal is achieved, then stop random defect fix flow as shown in 12.2 step (please refer to step 554 for detail description). If yield goal is not achieved, then goes to 14.0 execution step and provide solution plan and schedule of delivery. Besides, IC design house 30 select wafer yield sorting bad die data in step 12.0 and the integrated killer random defect data in step 11.1. Execute failure analysis to find out killer random defect that causes failure. Upload the failure killer random defect data that comes from failure analysis into "Defect Operating System" 50 as shown in 13.0 feed forward step (please refer to step 555 and step 556 for detail description). Next, semiconductor Fab 20 downloads from "Defect Operating System" 50 the failure killer random defect data that comes from failure analysis. Semiconductor Fab 20 investigates root cause of the killer random defect that cause failure. Look for process parameter, material, equipment tool problem, etc. After that, semiconductor Fab 20 uploads the root cause of the failure killer random defect into "Defect Operating System" 50 as shown in 13.1 feedback step (please refer to step 550 for detail description). Based on the root cause of failure killer random defect, semiconductor Fab 20 will propose a solution plan and delivery schedule as shown in 14.0 feedback step (please refer to step 550 for detail description). Finally, IC design house 30 will monitor the solution plan implementation efficiency and delivery schedule that semiconductor propose to fix the root cause of failure killer random defect as shown in 14.1 monitor step (please refer to step 553 for detail description).

Although specific embodiments have been illustrated and described, it will be appreciated by those skilled in the art that various modifications may be made without departing from the scope of the present invention, which is intended to be limited solely by the appended claims. in the present invention can output different frequencies according to the frequency of the testing signal. The accuracy of the testing and the safety of the using can be enhanced.

What is claimed is:

1. A Semiconductor Fab's Defect Operating System comprises a memory unit and a data processing unit, wherein the memory unit is used to store each process layer's systematic defect inspection data inputted from a semiconductor Fab and a IC design layout pattern from a IC design house, the characterized in that:
the data processing unit operates each of the process layer's systematic defect inspection data through a coordinate conversion and a coordinate calibration; after each of the process layer's systematic defect coordinate is transferred to the IC design layout pattern coordinate, executing the systematic defect pattern grouping analysis to generate a plurality of systematic defect layout pattern groups to obtain an image data file in each of the systematic defect layout pattern group in the IC design layout pattern coordinate region;
the data processing unit calibrates the size for each of the systematic defect, and then executes a critical area analysis for each of the systematic defect calibrated to obtain the image data file in the IC designed layout pattern coordinate by screening out killer defects in the systematic defects; and
the data processing unit conducts an analysis for a test-failed item which is a bad die from a wafer yield sorting data to obtain a layer and area for each of the killer systematic defect in the IC design layout pattern;
the data processing unit conducts a comparison analysis for the killer defects undergone the critical area analysis and the analysis of the test-failed item to check the layer and the area in the IC design layout pattern, where the killer systematic defects are surely located on; and
the data processing unit transfers the image data file in the IC design layout pattern coordinate of the killer defect systematic pattern group into a systematic defect text and an image data file.

2. The Semiconductor Fab's Defect Operating System of claim 1, wherein the data processing unit further conducts a defect sampling procedure and outputs the image data file in the IC design layout pattern of the sorted killer defect systematic pattern group to the semiconductor Fab for a failure analysis after the data processing unit obtain the image data file in the IC design layout pattern of the sorted killer defect systematic pattern group.

3. The Semiconductor Fab's Defect Operating System of claim 1, wherein the failure analysis is carried out through a de-layer type analysis.

4. The Semiconductor Fab's Defect Operating System of claim 3, wherein the data process unit further outputs the killer systematic defect text and image data file to IC design house and the IC design house transfers the killer systematic defect text and image data file into the layer and the coordinate location of the IC design layout pattern and to display on the Graphical User Interface (GUI).

5. The Semiconductor Fab's Defect Operating System of claim 4, the IC design house further comprising executes a modification of the design layout pattern coordinate location of the killer systematic defect layout pattern group.

6. The Semiconductor Fab's Defect Operating System of claim 5, wherein the modification of the design layout pattern coordinate location of the killer systematic defect layout pattern group includes at least one of a processed window, a spacing or a line width between two conductive wires.

7. A Semiconductor Fab's Defect Operating System comprises a memory unit and a data processing unit, wherein the memory unit is used to store each process layer's systematic random defect inspection data inputted from a semiconductor Fab and a IC design layout pattern from a IC design house, the characterized in that:
the data processing unit operates each of the random defect inspection data through a coordinate conversion and a coordinate calibration, after each of the random defect inspection data is transferred to the IC design layout pattern coordinate, executing a size calibration for each of the random defect to obtain an image data file in each of the random defect in the IC design layout pattern coordinate region;
the data processing unit executes a critical area analysis for each of the random defect calibrated to obtain the image data file in the IC designed layout pattern coordinate by screening out killer defects in the random defects;
the data processing unit conducts an analysis for a test-failed item which is a bad die from a wafer yield sorting data to obtain a layer and area for each of the killer systematic defect in the IC design layout pattern;
the data processing unit conducts a comparison analysis for the killer defects undergone the critical area analysis and the analysis of the test-failed item to check the layer and the area in the IC design layout pattern where the killer random defects are surely located on;

the data processing unit transfers the image data file in the IC design layout pattern coordinate of the killer random defect into a random defect text and an image data file.

8. A Semiconductor Fab's Defect Operating System comprises a memory unit and a data processing unit, the memory unit is used to store every process layer's systematic defect inspection data imported from semiconductor Fab and the IC design layout pattern, and a wafer yield sorting data imported from IC design house, the system comprising:

the data processing unit handles every layer's random defect inspection data through coordinate conversion and coordinate calibration, then, every random defect coordinate is converted to IC design layout pattern coordinate, execute defect size calibration for every random defect, and obtain the random defect data image file with defect in the IC design layout pattern coordinate data;

the data processing unit executes critical area analysis on every random defect with calibrated defect size, screen the killer random defects out of the whole random defect, and obtain the killer random defects data image file with defect in the IC design layout pattern coordinate area;

the data processing unit focus on the bad die from a wafer yield sorting data and conduct testing failure item's analysis, obtain the killer random defect, which causes testing failure, layer and zone area data with defect in the IC design layout pattern area;

the data processing unit compares 'the killer random defects (after critical area analysis) data image file with defect in the IC design layout pattern coordinate with the killer random defect (which causes testing failure) data file with defect in the IC design layout pattern coordinate area', confirm the killer random defect layer and zone area that actually maps in the IC design layout pattern; and the data processing unit converts the killer random defects data image file with layer and zone area in the IC design layout pattern' into a random defect text and image data file.

9. The system of claim 7, wherein the data processing unit obtains the data file information of every random defect that locates in the IC design layout pattern coordinate area, execute a defect sampling procedure, for those killer random defect samples that locate in the IC design layout pattern coordinate area, output the data file to semiconductor Fab, and semiconductor will execute failure analysis on the selected defect samples.

10. The system of claim 8, wherein the data processing unit obtains the data file information of every random defect that locates in the IC design layout pattern coordinate area, execute a defect sampling procedure, for those killer random defect samples that locate in the IC design layout pattern coordinate area, output the data file to semiconductor Fab, and semiconductor will execute failure analysis on the selected defect samples.

11. The system of claim 8, wherein the failure analysis is performed through de-layer type analysis.

12. The system of claim 11, wherein the data processing unit further comprising outputs the killer random defect text and image data file into IC design house, IC design house converts the killer random defect text and image data file into the killer random defect layer and coordinate location file in the IC design layout pattern to display on the Graphical User Interface (GUI).

13. The system of claim 11, further comprising overlaps each of the layer's killer random defects to have each of the layer's killer random defects displayed on the same plane.

14. The system of claim 12, further comprising overlaps each of the layer's killer random defects to have each of the layer's killer random defects displayed on the same plane.

15. The system of claim 13, wherein the overlap different layer's killer random defect into same plane use different color to distinguish different layer's killer random defect on the same plane.

16. The system of claim 14, wherein the overlap different layer's killer random defect into same plane use different color to distinguish different layer's killer random defect on the same plane.

* * * * *